(12) United States Patent
Sadeghi et al.

(10) Patent No.: US 11,076,380 B2
(45) Date of Patent: Jul. 27, 2021

(54) METHODS, SYSTEMS AND APPARATUSES FOR OPERATION IN LONG-TERM EVOLUTION (LTE) SYSTEMS

(71) Applicant: InterDigital Patent Holdings, Inc., Wilmington, DE (US)

(72) Inventors: Pouriya Sadeghi, San Diego, CA (US); Shahrokh Nayeb Nazar, San Diego, CA (US); Janet A. Stern-Berkowitz, Little Neck, NY (US); Nobuyuki Tamaki, Melville, NY (US); J. Patrick Tooher, Montréal (CA); Ghyslain Pelletier, Montréal (CA); Moon-il Lee, Melville, NY (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/571,507

(22) Filed: Sep. 16, 2019

(65) Prior Publication Data

US 2020/0084748 A1   Mar. 12, 2020

Related U.S. Application Data

(63) Continuation of application No. 15/393,607, filed on Dec. 29, 2016, now Pat. No. 10,420,066, which is a (Continued)

(51) Int. Cl.
*H04W 68/02*   (2009.01)
*H04W 72/04*   (2009.01)
(Continued)

(52) U.S. Cl.
CPC ............. *H04W 68/02* (2013.01); *H04L 5/003* (2013.01); *H04L 5/005* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,315,273 B2 | 11/2012 | Damnjanovic et al. | |
| 8,553,645 B2 | 10/2013 | Kuchibhotla et al. | |
| (Continued) | | | |

FOREIGN PATENT DOCUMENTS

| | | |
|---|---|---|
| CN | 101026799 A | 8/2007 |
| CN | 102036301 A | 4/2011 |
| (Continued) | | |

OTHER PUBLICATIONS

United States Final Office Action, U.S. Appl. No. 14/036,327, dated Nov 6, 2015, 17 pages.
(Continued)

*Primary Examiner* — Rasheed Gidado
(74) *Attorney, Agent, or Firm* — Julian F. Santos

(57) ABSTRACT

Methods, systems and apparatuses for operation in long-term evolution (LTE) systems are provided, including a method implemented in a base station that may include receiving, from a wireless transmit/receive unit (WTRU) via a first interface, a first message including radio capability information associated with the WTRU; transmitting, to a mobility management entity (MME) via a second interface, a second message including the radio capability information; receiving, from the MME via the second interface, a paging message including the radio capability information; and determining whether to page the WTRU in idle mode based on the radio capability information. Also provided is another method implemented by a WTRU in a vicinity of a dormant cell. This method may include any of: receiving, from a
(Continued)

dormant cell, a signal; receiving, from a serving cell, a trigger to initiate measurement of one or more dormant cells; and measuring the signal.

17 Claims, 24 Drawing Sheets

Related U.S. Application Data continuation of application No. 14/036,327, filed on Sep. 25, 2013, now Pat. No. 9,553,701.

(60) Provisional application No. 61/706,122, filed on Sep. 26, 2012, provisional application No. 61/753,375, filed on Jan. 16, 2013, provisional application No. 61/807,952, filed on Apr. 3, 2013, provisional application No. 61/863,090, filed on Aug. 7, 2013.

(51) Int. Cl.
*H04L 27/26* (2006.01)
*H04L 5/00* (2006.01)
*H04W 72/00* (2009.01)
*H04L 5/14* (2006.01)

(52) U.S. Cl.
CPC ....... *H04L 27/2649* (2013.01); *H04W 72/042* (2013.01); *H04W 72/048* (2013.01); *H04L 5/001* (2013.01); *H04L 5/0023* (2013.01); *H04L 5/0092* (2013.01); *H04L 5/14* (2013.01); *H04W 72/005* (2013.01)

(56) References Cited

U.S. PATENT DOCUMENTS

| | | | |
|---|---|---|---|
| 8,577,342 | B2 | 11/2013 | Muniere et al. |
| 8,837,358 | B2 * | 9/2014 | Lunttila ............... H04L 5/0057 370/328 |
| 8,837,362 | B2 | 9/2014 | Vartiainen et al. |
| 8,929,306 | B2 | 1/2015 | Lee et al. |
| 8,995,395 | B2 | 3/2015 | Frenne et al. |
| 9,204,373 | B2 | 12/2015 | Arora et al. |
| 9,253,782 | B2 | 2/2016 | Xu et al. |
| 9,445,425 | B2 * | 9/2016 | Chapman .......... H04W 72/1215 |
| 9,533,701 | B2 | 1/2017 | Cymbal et al. |
| 2004/0005870 | A1 | 1/2004 | Yla-Jaaski et al. |
| 2005/0286495 | A1 * | 12/2005 | Menon ................ H04W 68/02 370/352 |
| 2006/0146861 | A1 | 7/2006 | Maeda |
| 2008/0095088 | A1 | 4/2008 | Ryu et al. |
| 2008/0130519 | A1 | 6/2008 | Bahl et al. |
| 2008/0259912 | A1 * | 10/2008 | Wang .................. H04W 68/12 370/356 |
| 2008/0287129 | A1 | 11/2008 | Somasundaram et al. |
| 2009/0029710 | A1 | 1/2009 | Ochiai et al. |
| 2009/0052376 | A1 * | 2/2009 | Cave ..................... H04W 8/24 370/328 |
| 2009/0170426 | A1 * | 7/2009 | Jung ..................... H04W 8/24 455/7 |
| 2009/0196261 | A1 | 8/2009 | Sambhwani et al. |
| 2009/0259910 | A1 | 10/2009 | Lee et al. |
| 2009/0318170 | A1 * | 12/2009 | Lee ..................... H04W 68/02 455/458 |
| 2010/0014468 | A1 | 1/2010 | Lee et al. |
| 2010/0202382 | A1 | 8/2010 | Park et al. |
| 2010/0260081 | A1 | 10/2010 | Damnjanovic et al. |
| 2010/0311349 | A1 | 12/2010 | Koo et al. |
| 2011/0026450 | A1 | 2/2011 | Kuchibhotla et al. |
| 2011/0176530 | A1 * | 7/2011 | Vikberg .................. H04W 8/04 370/338 |
| 2012/0044910 | A1 | 2/2012 | Maeda et al. |
| 2012/0099515 | A1 | 4/2012 | Chen et al. |
| 2012/0172063 | A1 | 7/2012 | Lee et al. |
| 2012/0252472 | A1 * | 10/2012 | Nakahara .............. H04W 76/10 455/450 |
| 2012/0307774 | A1 | 12/2012 | Zhao et al. |
| 2012/0327894 | A1 | 12/2012 | Axmon et al. |
| 2013/0039299 | A1 | 2/2013 | Papasakellariou et al. |
| 2013/0044664 | A1 | 2/2013 | Nory et al. |
| 2013/0083753 | A1 | 4/2013 | Lee et al. |
| 2013/0170438 | A1 * | 7/2013 | Nishida ............... H04W 68/005 370/328 |
| 2013/0223395 | A1 | 8/2013 | Warken et al. |
| 2014/0010183 | A1 | 1/2014 | Mcnamara et al. |
| 2014/0086173 | A1 | 3/2014 | Sadeghi et al. |
| 2014/0357272 | A1 | 12/2014 | Axmon et al. |

FOREIGN PATENT DOCUMENTS

| | | | | |
|---|---|---|---|---|
| EP | 2071882 | A2 | 6/2009 | |
| EP | 2278830 | A1 | 1/2011 | |
| EP | 2369883 | A1 | 9/2011 | |
| JP | 2011511509 | A | 4/2011 | |
| JP | 2012523773 | A | 10/2012 | |
| JP | 2014526159 | A | 10/2014 | |
| JP | 2015523767 | A | 8/2015 | |
| WO | WO-2009072956 | A1 * | 6/2009 | ............ H04W 12/10 |
| WO | 2010016726 | A2 | 2/2010 | |
| WO | 2010125769 | A1 | 11/2010 | |
| WO | 2011097767 | A1 | 8/2011 | |
| WO | 2011120030 | A1 | 9/2011 | |
| WO | 2012051303 | A1 | 4/2012 | |
| WO | 2012104635 | A1 | 8/2012 | |

OTHER PUBLICATIONS

English Language Abstract, Chinese Patent Application No. 101026799, dated Aug. 29, 2007, 1 page.
Notice of Allowance, U.S. Appl. No. 13/632,037, dated Jul. 6, 2017, 8 pages.
3rd Generation Partnership Project; Technical Specification Group Core Network and Terminals; Non-Access-Stratum (NAS) protocol for Evolved Packet System (EPS); Stage 3 (Release 10), 3GPP TS 24.301 V10.4.0, Sep. 2011, 321 pages.
3rd Generation Partnership Project; Technical Specification Group Radio Access Network; Evolved Universal Terrestrial Radio Access Network (E-UTRAN); X2 application protocol (X2AP) (Release 11), 3GPP TS 36.423 V11.0.0, Mar. 2012, 134 pages.
3rd Generation Partnership Project; Technical Specification Group Radio Access Network; Evolved Universal Terrestrial Radio Access (E-UTRA); Radio Resource Control (RRC); Protocol specification (Release 8), 3GPP TS 36.331 V8.15.0, Sep. 2011, 213 pages.
Considerations on RAN overload control, 3GPP Tdoc R2-102894, 3GPP TSG-RAN WG2 Meeting #70, Montreal, Canada,, May 10-14, 2010, 7 pages.
Official Notice of Rejection (English Translation), Japanese Patent Application No. 2014-533458, dated Jun. 7, 2016, 6 pages.
Ipwireless Inc. et al., Proposal for a study item in support of low complexity LTE devices for MTC, 3GPP Tdoc R2-112974; 3GPP TSG-RAN WG2 Meeting #74, Barcelona, Spain, May 9-13, 2011, 5 pages.
United States Office Action, U.S. Appl. No. 14/036,327, dated Apr. 1, 2016, 14 pages.
Invitation to Pay Additional Fees; Partial Search Report, International Application No. PCT/US2013/061617, dated May 22, 2014, 8 pages.
NEC Group, Requirements and necessary enhancements for Rel-12 NCT, 3GPP Tdoc R1-124856, 3GPP TSG RAN WG1, Meeting #71, New Orleans, USA, Nov. 12-16, 2012, 6 pages.
CATT, Considerations on Paging in Carrier Aggregation, 3GPP Tdoc R2-095486; 3GPP TSG RAN WG2 Meeting #67bis; Miyazaki, Japan, Oct. 12-16, 2009, 2 pages.
Notice of Rejection, Japanese Patent Application No. 2015-534620, dated Oct. 10, 2017, 4 pages.
3rd Generation Partnership Project, Technical Specification Group Radio Access Network, Evolved Universal Terrestrial Radio Access

(56) References Cited

OTHER PUBLICATIONS (E-UTRA), User Equipment (UE) procedures in idle mode (Release 11), 3GPP TS 36.304 V11.3.0, Mar. 2013, 34 pages.
3GPP, TS36.321 v8.10.0, Evolved Universal Terrestrial Radio Access, Medium Access Control (MAC) protocol specification (Sep. 28, 2011).
United States Office Action, U.S. Appl. No. 14/036,327, dated May 28, 2015, 13 pages.
3rd Generation Partnership Project, Technical Specification Group Radio Access Network, Evolved Universal Terrestrial Radio Access (E-UTRA), Multiplexing and channel coding (Release 11), 3GPP TS 36.212 V11.3.0, Jun. 2013, 84 pages.
3rd Generation Partnership Project, Technical Specification Group Radio Access Network, Evolved Universal Terrestrial Radio Access (E-UTRA), Physical channels and modulation (Release 11), 3GPP TS 36.211 V11.4.0, Sep. 2013, 120 pages.
Huawei Et Al.,PSS/SSS collisions with DM-RS, 3GPP Tdoc R1-122518, 3GPP TSG RAN WG1, Meeting #69, Prague, Czech Republic, May 21-25, 2012, 5 pages.
Taiwanese Office Action, Taiwanese Patent Application No. 102134525, dated Dec. 14, 2016, 3 pages.
3rd Generation Partnership Project; Technical Specification Group Radio Access Network; Evolved Universal Terrestrial Radio Access (E-UTRA); Requirements for support of radio resource management (Release 12), 3GPP TS 36.133 V12.0.0, Jul. 2013, 732 pages.
ST-Ericsson Ericsson, New WI proposal: New Carrier Type for LTE, 3GPP Tdoc RP-121415, 3GPP TSG-RAN Meeting#57, Chicago, USA, Sep. 4-7, 2012, 6 pages.
Other design aspects of the new carrier type, 3GPP Tdoc R1-120485, TSG RAN WG1 Meeting #68, Dresden, Germany, Feb. 190, 2012, 2 pages.
Official Notice of Rejection, Japanese Patent Application No. 2014-533458, dated Jun. 6, 2016, 5 pages.
3rd Generation Partnership Project, Technical Specification Group Radio Access Network, Evolved Universal Terrestrial Radio Access (E-UTRA), Physical layer procedures (Release 11), 3GPP TS 36.213 V11.4.0, Sep. 2013, 182 pages.
U.S. Appl. No. 13/632,037, filed Sep. 30, 2012, Apr. 4, 2013.
Orange et al., eMBMS support in New Carrier Type, 3GPP Tdoc R1-130658, 3GPP TSG-RAN WG1 #72, St. Julian's, Malta, Jan. 28-Feb. 1, 2013, 1 page.
Taiwanese Office Action (English Translation), Taiwanese Patent Application No. 102134525, dated Dec. 14, 2016, 5 pages.
Ipwireless Inc., Review of approaches for bandwidth reduction for low complexity MTC LTE UEs, 3GPP Tdoc R1-114267, 3GPP TSG RAN WG1 Meeting #67, San Francisco, USA, Nov. 14-18, 2011, 5 pages.
Vodafone, Proposed SID: Provision of low-cost MTC UEs based on LTE, 3GPP Tdoc RP-111112; 3GPP TSG RAN Meeting #53, Fukuoka, Japan, Sep. 13-16, 2011, 6 pages.
CATT, Paging in Carrier Aggregation, 3GPP Tdoc R2-094320; 3GPP TSG RAN WG2 Meeting #67; Shenzhen, China (Update of R2-093718), Aug. 24-28, 2009, 3 pages.
Notice of Rejection (English Translation), Japanese Patent Application No. 2015-534620, dated Oct. 10, 2017, 5 pages.
English Language Abstract, Chinese Patent Application No. 102036301, dated Apr. 27, 2011, 1 page.
3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 11), 3GPP TS 36.300 V11.3.0, Sep. 2012, 205 pages.
3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.3.0, Sep. 2011, 254 pages.
Chen et al.,Machine-to-Machine Communication in LTE-A, Vehicular Technology Conference Fall, IEEE 72nd, Sep. 6-9, 2010, 4 pages.
Fujitsu, On support of low-cost MTC terminals with reduced Tx/Rx bandwidths, 3GPP Tdoc R1-112669, 3GPP TSG-RAN WG1 Meeting #66, Athens, Greece, Aug. 22-26, 2011, 2 pages.
3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.3.0, Sep. 2011, 54 pages.
Random access design for MTC, 3GPP Tdoc R1-104015, 3GPP TSG RAN WG2 #70bis, Stockholm, Sweden, Jun. 28-Jul. 2, 2010, 3 pages.
Change Request, 3GPP Tdoc R2-085181, 3GPP-TSG RAN WG2 #63bis, Prague, Czech Republic, Sep. 2008, 6 pages.

\* cited by examiner

2100

┌─────────────────────────────────────────┐
│ RECEIVE EPBCH INFORMATION FROM ANY OF A FIRST │ ─ 2102
│ ANTENNA PORT AND/OR A SECOND ANTENNA PORT │
└─────────────────────────────────────────┘
                    ↓
┌─────────────────────────────────────────┐
│ SELECT ONE OR BOTH OF THE EPBCH INFORMATION │ ─ 2104
│ RECEIVED FROM THE FIRST ANTENNA PORT AND/OR │
│         THE SECOND ANTENNA PORT         │
└─────────────────────────────────────────┘
                    ↓
┌─────────────────────────────────────────┐
│      DECODE THE SELECTED EPBCH INFORMATION      │ ─ 2106
└─────────────────────────────────────────┘

┌─────────────────────────────────────────┐
│  TRANSMIT A FIRST SET OF EPBCH-RELATED  │ ─ 2202
│     INFORMATION ON A FIRST DMRS PORT    │
└─────────────────────────────────────────┘
                    ↓
┌─────────────────────────────────────────┐
│ TRANSMIT A SECOND SET OF EPBCH-RELATED  │ ─ 2204
│    INFORMATION ON A SECOND DMRS PORT    │
└─────────────────────────────────────────┘

FIG. 22

METHODS, SYSTEMS AND APPARATUSES FOR OPERATION IN LONG-TERM EVOLUTION (LTE) SYSTEMS

CROSS REFERENCE TO RELATED APPLICATIONS

This application is a continuation of U.S. patent application Ser. No. 15/393,607 filed 29 Dec. 2016, which is a continuation of U.S. patent application Ser. No. 14/036,327, filed 25 Sep. 2013, now U.S. Pat. No. 9,553,701, which claims the benefit of U.S. Provisional Patent Application Nos. 61/706,122 filed 26 Sep. 2012, 61/753,375 filed 16 Jan. 2013, 61/807,952 filed 3 Apr. 2013 and 61/863,090 filed 7 Aug. 2013; all of which are incorporated herein by reference.

BACKGROUND

Field

This application is related to wireless communications.

Related Art $3^{rd}$ Generation Partnership Project (3GPP) long-term evolution (LTE) Release 8 and/or 9 (LTE Rel-8/9) may support up to 100 Mbps in a downlink (DL), and 50 Mbps in an uplink (UL) for a 2×2 configuration. The LTE DL transmission scheme is based on an Orthogonal Frequency-Division Multiple Access (OFDMA) air interface.

LTE Rel-8/9 and/or release 10 (collectively "LTE Rel-8/9/10") systems support scalable transmission bandwidths (e.g., for purposes of flexible deployment, etc.). Such scalable transmission bandwidths may include, for example, bandwidths of 1.4, 2.5, 5, 10, 15 and 20 megahertz (MHz).

In LTE Rel-8/9 and as applicable to LTE Rel-10, each radio frame has a duration of 10 milliseconds (ms), and consists of 10 sub-frames; each of which is 1 ms. Each sub-frame consists of 2 timeslots of 0.5 ms each. There can be either seven (7) or six (6) orthogonal frequency-division multiplexing (OFDM) symbols per timeslot. The seven (7) symbols per timeslot are used with a normal cyclic prefix length, and the six (6) symbols per timeslot are used with an extended cyclic prefix length. Sub-carrier spacing for the LTE Rel-8/9 system is 15 kHz. A reduced sub-carrier spacing mode using 7.5 kHz is also possible.

A resource element (RE) corresponds to one (1) sub-carrier during one (1) OFDM symbol interval. Twelve (12) consecutive sub-carriers during a 0.5 ms timeslot constitute one (1) resource block (RB). Therefore, with seven (7) symbols per timeslot, each RB consists of 1*7=84 REs. In single-carrier configuration, a DL carrier can range from six (6) RBs up to one-hundred ten (110) RBs corresponding to an overall scalable transmission bandwidth of roughly 1 MHz to 20 MHz.

A basic time-domain unit for dynamic scheduling is one sub-frame, which consists of two consecutive timeslots. This is sometimes referred to as a resource-block pair. Certain sub-carriers on some OFDM symbols are allocated to carry pilot signals in the time-frequency grid. A number of sub-carriers at edges of the transmission bandwidth are generally not transmitted so as to comply with spectral mask requirements.

In LTE Rel-8/9, and in Rel-10 in single carrier configuration where the network may assign a user equipment (UE) only one pair of UL and DL carriers in a frequency division duplexing (FDD) mode or one carrier time shared for UL and DL in a time division duplexing (TDD) mode, for any given subframe there may be a single Hybrid Automatic Repeat reQuest (HARQ) process active for the UL and a single HARQ process active in the DL.

LTE-Advanced with Carrier Aggregation (LTE CA Rel-10) is an evolution that aims to improve single carrier LTE data rates using, among other solutions, bandwidth extensions also referred to as carrier aggregation (CA). With CA, a UE may transmit and receive simultaneously over a physical uplink shared channel (PUSCH) and a physical downlink shared channel (PDSCH) (respectively) of multiple serving cells. For example, up to four secondary serving cells (SCells) may be used in addition to a primary serving cell (PCell), thus supporting flexible bandwidth assignments up to 100 MHz. Uplink control information (UCI), which may include HARQ acknowledgment and/or non-acknowledgement (ACK/NACK) feedback and/or channel state information (CSI), may be transmitted either on a physical uplink control channel (PUCCH) resources of the PCell or on PUSCH resources available for a serving cell configured for UL transmissions.

Control information for scheduling of PDSCH and PUSCH may be sent on one or more physical downlink control channel(s) (PDCCH). In addition to LTE Rel-8/9 scheduling using one PDCCH for a pair of UL and DL carriers, cross-carrier scheduling may also be supported by a given PDCCH; allowing the network to provide PDSCH assignments and/or PUSCH grants for transmissions in one or more other serving cells.

For a FDD LTE Rel-10 UE operating with CA, there may be one HARQ entity for each serving cell. Each HARQ entity may have up to 8 HARQ processes, e.g., one per subframe for one round-trip time (RTT). Further, for the FDD LTE Rel-10 UE operating with CA, there may be more than one HARQ process active for the UL and for the DL in any given subframe, but there may be at most one UL and one DL HARQ process per configured serving cell.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 21 is a flow diagram illustrating an example method for supporting reception of ePBCH information in accordance with an embodiment;

FIG. 22 is a flow diagram illustrating an example method for supporting transmission of ePBCH-related information in accordance with an embodiment;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Example Architecture

Figure 1A:
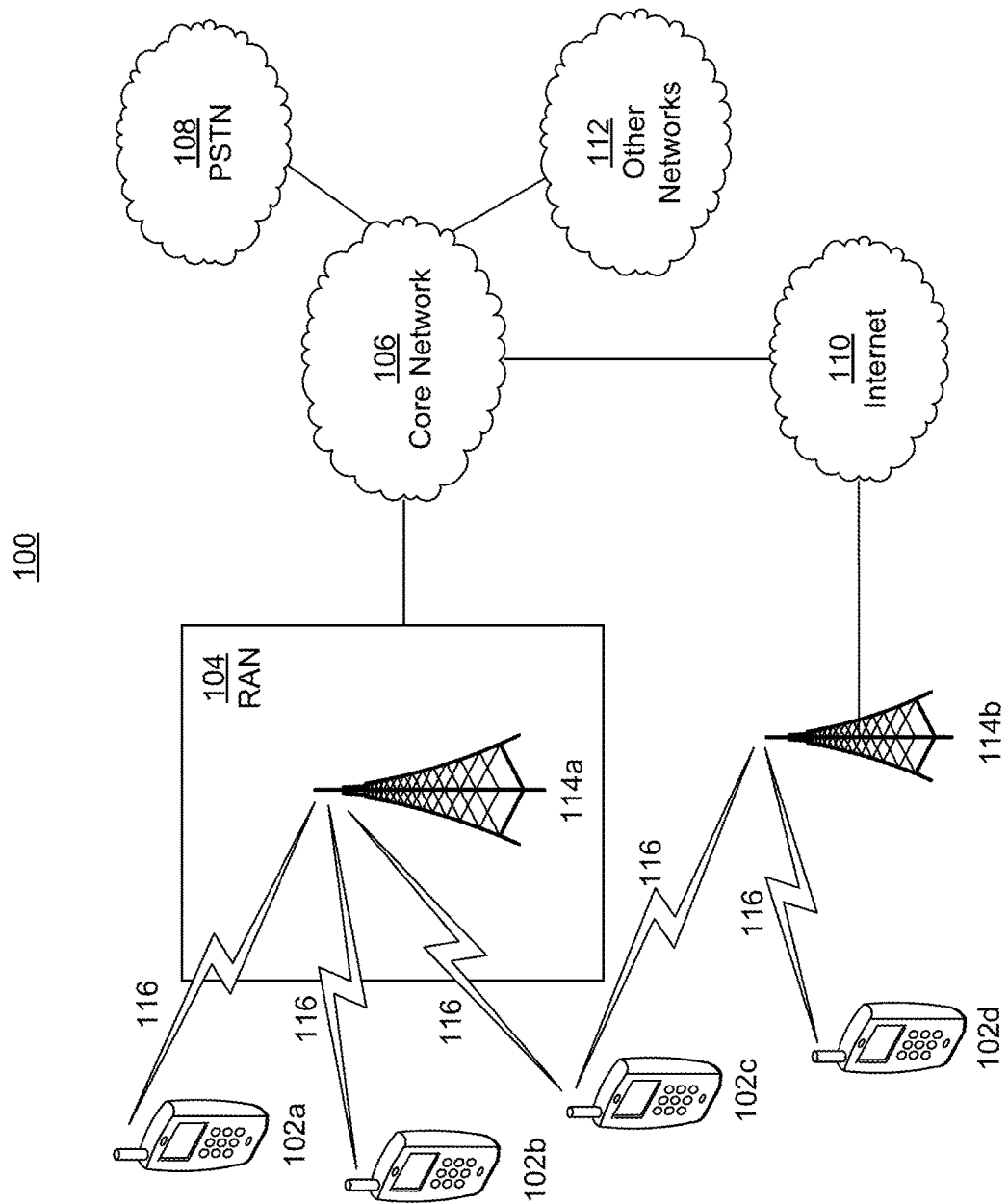
FIG. 1A is a diagram of an example communications system in which one or more disclosed embodiments may be implemented.

FIG. 1A is a diagram of an example communications system 1100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a tablet computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
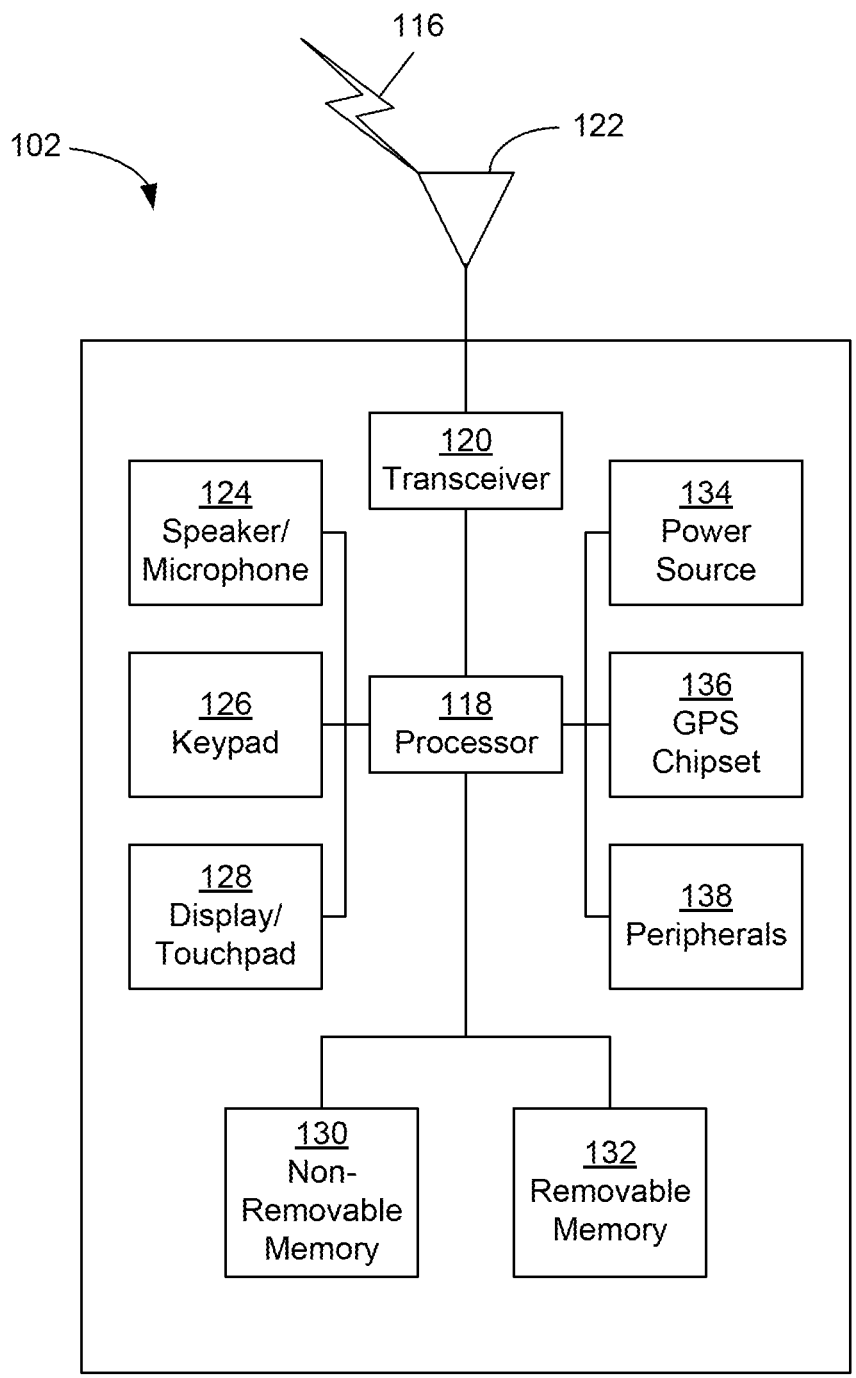
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/ touchpad 128, non-removable memory 19, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 19 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
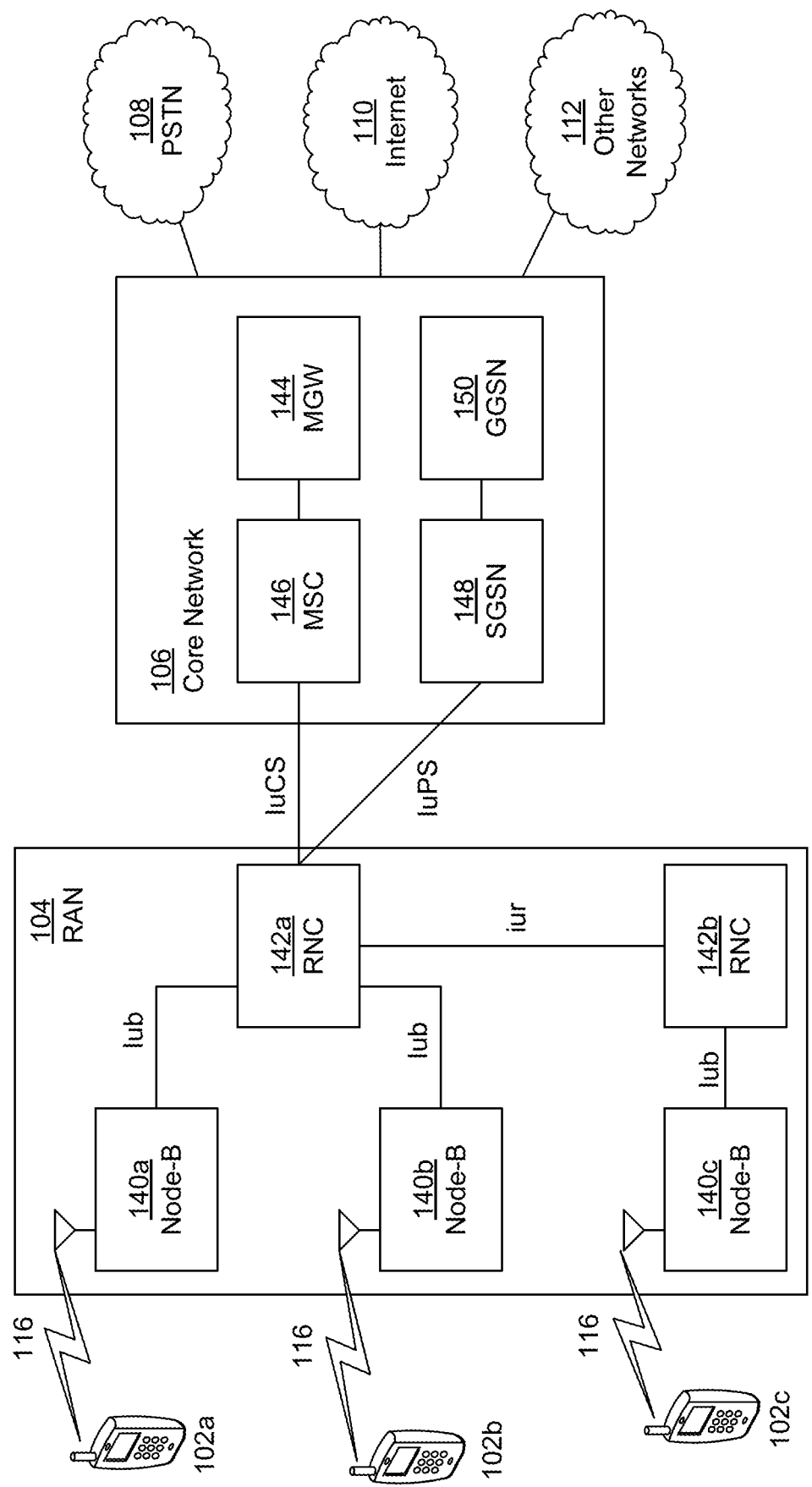
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
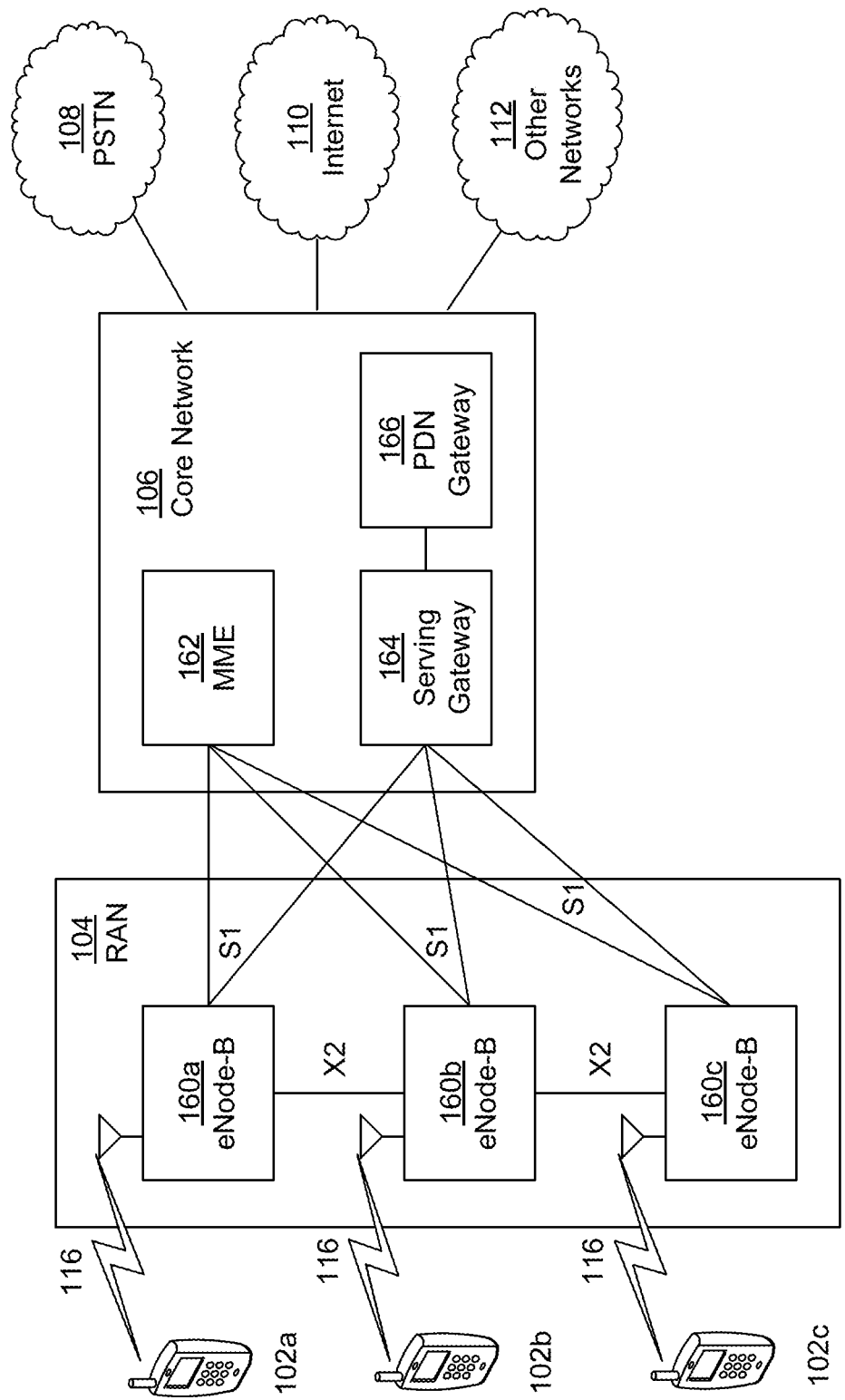
FIG. 1D is a system diagram of another example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
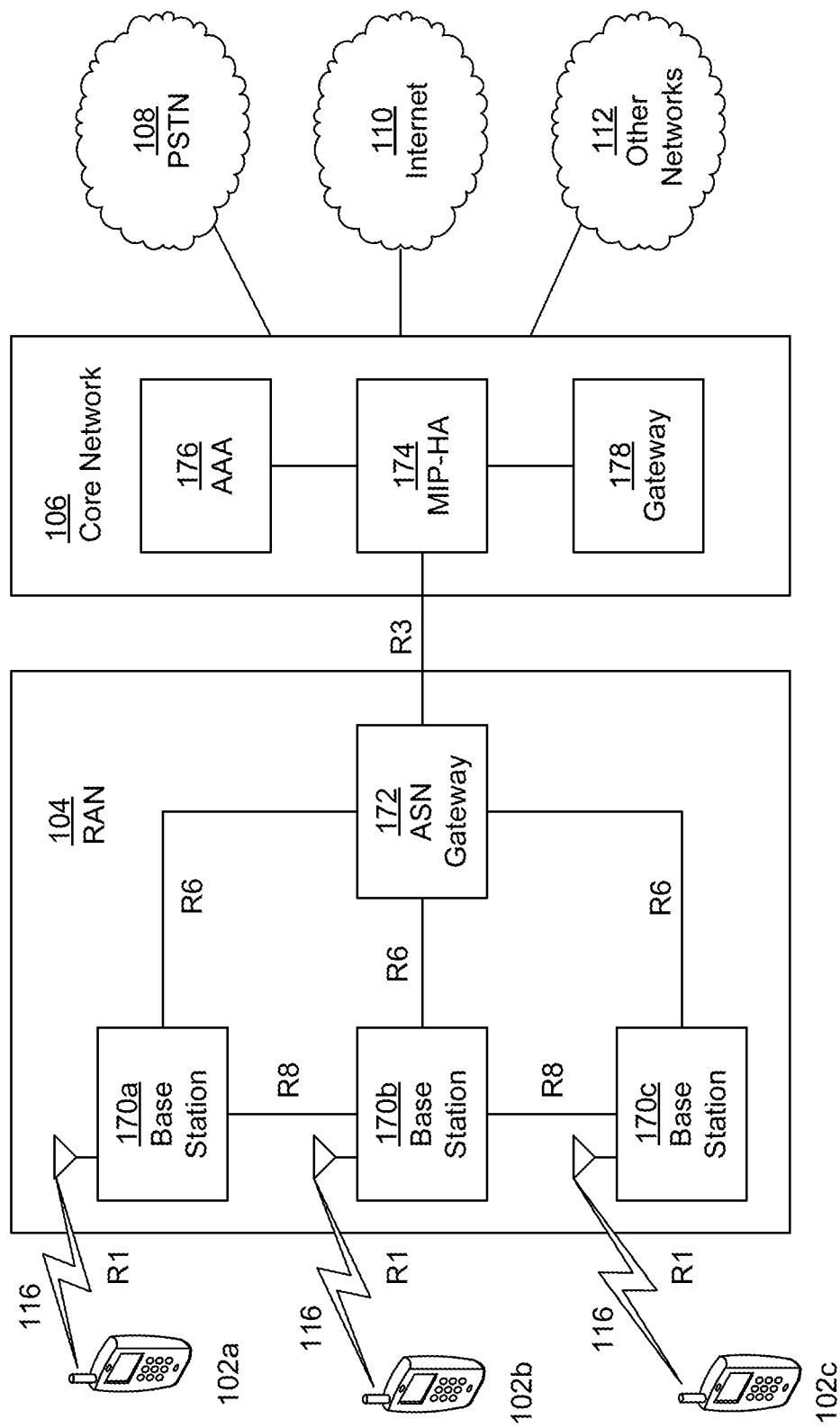
FIG. 1E is a system diagram of another example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 142, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, 170c may be defined as an R8 reference point that includes protocols for facilitating WTRU handovers and the transfer of data between base stations. The communication link between the base stations 170a, 170b, 170c and the ASN gateway 142 may be defined as an R6 reference point. The R6 reference point may include protocols for facilitating mobility management based on mobility events associated with each of the WTRUs 102a, 102b, 102c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 11, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

System Information Acquisition

A WTRU 102 in connected mode that is configured to perform measurements on a frequency that corresponds to a neighbor cell might not (or might not be required to) read master information block(s) ("MIB(s)") and/or system information blocks ("SIB(s)") of neighbor cells unless the WTRU 102 is explicitly instructed to read such information for associated measurement reportConfig (e.g., using an si-RequestForHO parameter). Cell global identity ("CGI") detection may require acquisition of the MIB and/or the SIB1, however.

Measurements in Connected Mode

Measurements are typically used for mobility control, for radio link monitoring and for power settings. A WTRU 102 may make a number of measurements of and/or using cell-specific (or common) reference signals (CRS). The WTRU 102 may use the measurements to, for example, determine radio quality of one or more LTE cells. Examples of the measurements include any of a reference signal received power (RSRP) measurement, a reference signal received quality (RSRQ) measurement, a receive strength signal indicator (RSSI) measurement and a DL pathloss (PL) estimation (which may be based on an RSRP measurement). The WTRU 102 may make the measurements in accordance with requirements that specify a certain level of accuracy. In accordance with such requirements, the WTRU 102 may assume that the CRS are present in every DL subframe and at least one DL subframe can be measured per radio frame using at least those CRS. The WTRU 102 may be configured with a parameter that restricts the DL subframes on which to perform measurements for a frequency of a serving cell. An example of such parameter may be measSubframePattern-ConfigNeigh parameter.

Layer 3 (L3) filtering may be configured per measurement quantity, e.g., per RAT type. A filtering period applied typically serves to adjust (e.g., on a sliding scale) an amount of instances a handover can occur and/or handover delay. Such filtering period may be a function of a velocity of the WTRU 102. A short filtering period may lead to a low handover delay, but to a high handover rate. A long filtering period (e.g., longer in duration that the short filtering period) may lead to high handover delay and/or low handover rate. A higher number of samples per measurement (e.g. within a measurement gap, if configured) may improve the measurement accuracy, and may contribute to lower the rate of handover. A filter coefficient may be configured per measurement type (e.g., for a RSRP measurement, a RSRQ measurement, a RSSI measurement, DL PL estimation, etc.).

The RSRP and/or RSRQ measurements are typically needed by the WTRU 102 to detect a cell. For DL PL estimation, filtering may also be configured and applied per serving cell.

Radio Link Monitoring (RLM) and Measurements in Connected Mode

For a Pcell, a WTRU 102 may perform radio link monitoring (RLM). The WTRU 102 may do so by estimating a problem error rate for reception of a hypothetical PDCCH, including Physical Control Format Indicator Channel (PC-FICH) errors. The WTRU 102 may perform measurements over a 200 ms period, and may set the error rate at 2% for $Q_{in}$ and at 10% for $Q_{out}$. The WTRU 102 may apply any subframe restrictions in time for RLM measurements. The WTRU 102 might require at least one measurable subframe per radio frame for RLM.

Measurements and Cell Re-Selection

In idle mode, a WTRU 102 may perform measurements of a current serving cell on which it has camped, and of neighboring cells on both (i) the same carrier frequency, e.g., intra-frequency, and (ii) different carrier frequencies, e.g., inter-frequency.

A serving eNode-B 160 may provide information concerning neighboring cell information for measurements in its system broadcast information and/or via dedicated signaling, such as, for example, radio resource control (RRC) signaling. The serving eNode-B 160 may provide dedicated priority information (e.g., by cell list) through the dedicated RRC signaling. The WTRU 102 may detect and measure cells that are not part of a provided cell list. To limit the amount of measurements that the WTRU 102 has to carry out and/or to minimize battery consumption during a DRX cycle of the WTRU 102, for example, the WTRU 102 may use the priorities assigned to certain frequencies when determining when to measure and which cells to measure for inter-frequency and intra-frequency neighbor cell measurements. The WTRU 102 may make neighbor measurements as follows or as set forth in at least one of the following: (i) for frequencies assigned a higher priority than a current frequency, the WTRU 102 may perform inter-frequency measurements on cells in that higher priority frequency; (ii) for frequencies assigned a priority equal or lower than a current frequency, the WTRU 102 may perform inter-frequency measurements after RSRP and/or RSRQ measurement(s) of the current cell fall below respective specified thresholds; and/or (iii) the WTRU 102 may perform intra-frequency measurements after the RSRP and/or RSRQ measurement(s) of the current cell fall below respective specified thresholds.

The measurements of neighboring cells may be monitored and evaluated by the WTRU 102 in idle mode. The WTRU 102 may decide to perform cell re-selection to another cell when one or more cell re-selection criteria are satisfied. Such cell re-selection criteria may be based on one or more thresholds. These thresholds may be provided in system information.

DRX/Paging

The network may use a paging message to reach or communicate with the WTRU 102 when in idle mode. The paging message may include information that may be specific to the WTRU 102 (WTRU-specific information) and/or general indicators.

The WTRU-specific information may be and/or include information for establishing a connection to the network. The general indicators may be and/or include indicators for notifying the WTRU 102 (and other WTRUs) of changes to broadcast information of the cell. This broadcast information may include, e.g., earthquake and tsunami warning system (ETWS) information, commercial mobile alert system (CMAS) information, etc. To minimize an amount of time the WTRU 102 needs to look for a possible page, a DRX cycle and paging occasions may be assigned to the WTRU 102 through cell system information and/or through parameters specified by higher layer specified.

Paging information may be sent on certain subframes on a PDSCH. Resource locations on the PDSCH for the paging information may be sent on a PDCCH masked with paging radio network temporary identifier(s) (P-RNTI). Assuming a single P-RNTI is assigned to a cell, a single paging message may be sent on the certain (e.g., pre-assigned) subframes. This paging message may include the paging information for one or more of the WTRUs.

LTE Operation Modes

In a FDD mode of operation, different carriers may be used for UL and DL transmissions. A WTRU 102 may simultaneously receive in the DL and transmit in the UL. In a TDD mode of operation, UL and DL transmissions may be carried on the same carrier frequency separated in time. For a given carrier, the WTRU 102 operating under TDD does not simultaneously receive in the DL and transmit in the UL.

Figure 2A:
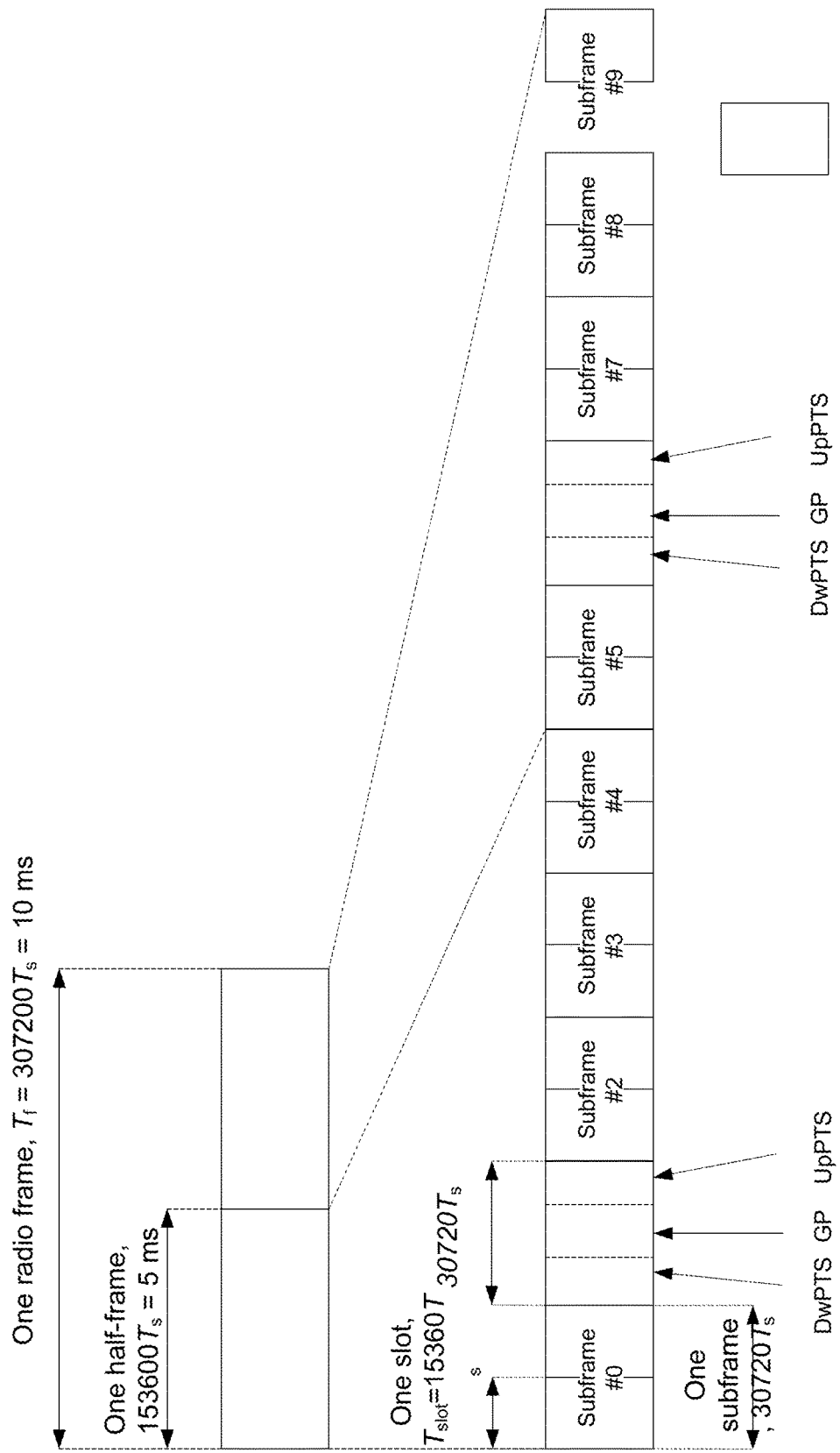
FIG. 2A is a block diagram illustrating a TDD radio frame.

FIG. 2A is a block diagram illustrating a TDD radio frame. The TDD radio frame may have a duration of ten (10) ms, and may include ten (10) subframes; each of which may have a duration of one (1) ms. The TDD radio frame may have a particular type of structure type, such as, e.g., a frame structure type 2 (for a five (5) ms switch-point periodicity, for instance).

The TDD radio frame may be configured in accordance with one of various configurations (each a "TDD UL/UL configuration") for the subframes. Each TDD UL/UL configuration may specify which (e.g., an amount and/or arrangement of) the subframes are DL subframes and UL subframes. In accordance with the TDD UL/UL configuration shown, the ten (10) subframes may be divvied up into six (6) DL subframes, two (2) UL subframes and two (2) special subframes arranged as (i) subframe numbers ("nos.") 0, 3-5, and 8-9, (ii) subframe nos. 2 and 7, and (iii) subframe nos. 1 and 6; respectively. The ten (10) subframes may be divvied up and arranged in other ways, as well (e.g., any of the other TDD UL/UL configurations).

Figure 2B:
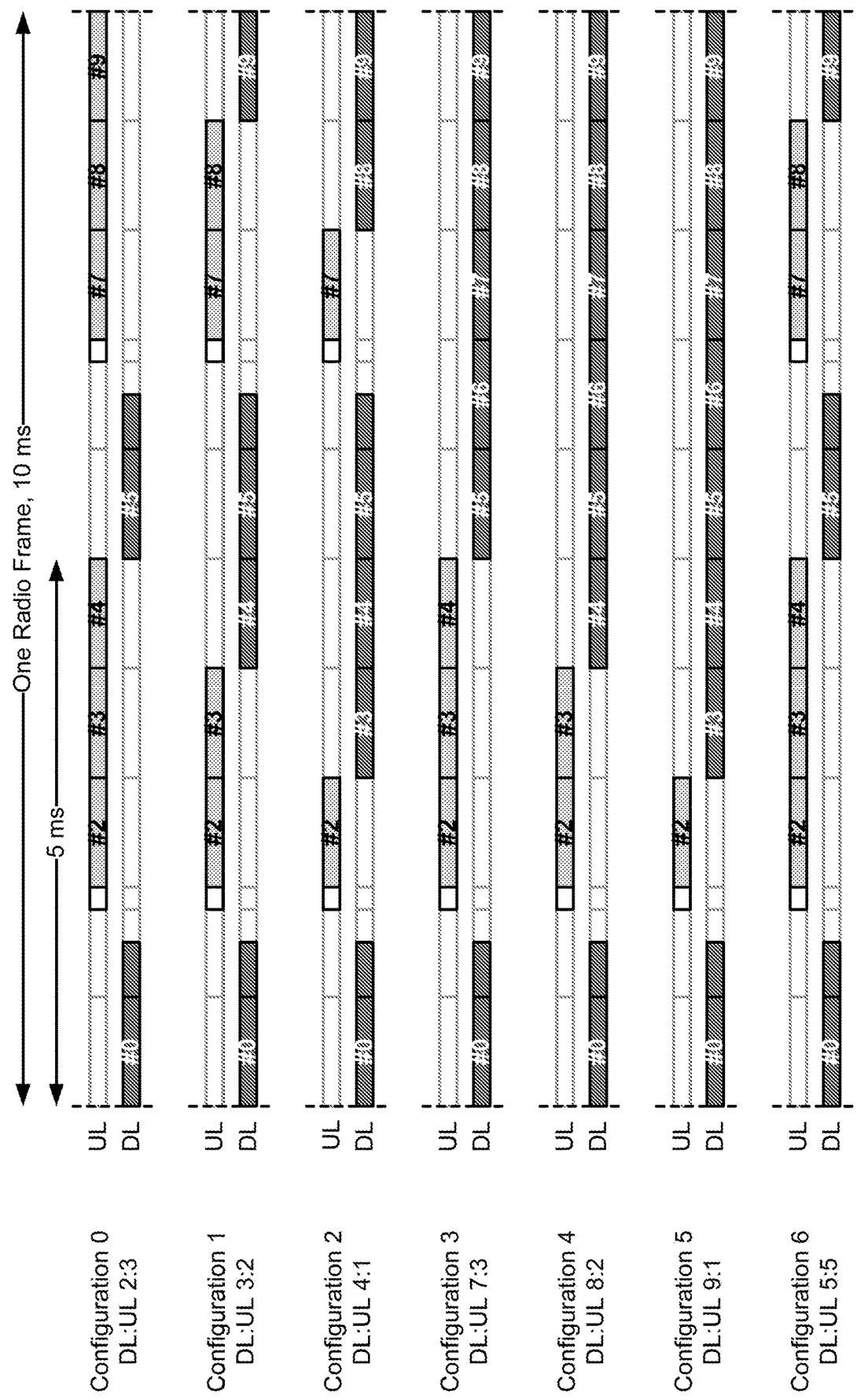
FIG. 2B is a block diagram illustrating various TDD radio frames formed in accordance with respective TDD UL/DL configurations

FIG. 2B is a block diagram illustrating seven TDD radio frames formed in accordance with respective TDD UL/DL configurations that are supported in LTE REL-10. Table 1 (below) lists UL-to-DL switching point periodicity of the seven (different) TDD UL/DL configurations.

TABLE 1

TDD UL/DL Configurations with Respective UL-to-DL Switching-point Periodicity

| Uplink-downlink Configuration No. | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As set forth in Table 1, the TDD radio frames shown in FIG. 2B and/or the TDD radio frame shown in FIG. 2A, subframe nos. 1 and 6 are special subframes used for switching from DL subframes to UL subframes. As special subframes, each includes a DL part (e.g., a DL pilot time slot ("DwPTS")), a guard period, and an UL part (e.g., a WL pilot time slot ("UpPTS")).

To avoid generating severe interference on the neighboring cells, each cell within a given neighborhood typically uses the same TDD UL/DL configuration. In general, changing from one TDD UL/DL configuration to another does not occur often (e.g., to limit disruption to connections that may be caused by changing configurations), and may be considered static or semi-static.

Evolved Multimedia Broadcast Service (eMBMS)

A WTRU 102 that supports evolved multimedia broadcast multicast services (eMBMS) may receive broadcast/multicast data simultaneously from a group of cells within a multimedia broadcast multicast services (MBMS) single-frequency network (SFN) (collectively "MBSFN") area.

From a physical layer perspective, MBMS transmission(s) may occur in MBSFN subframes. For a given radio frame, up to 6 subframes may be allocated to MBSFN subframes; leaving the rest of the subframes for allocation to other subframe types. Which subframe numbers are allocated to the MBSFN subframes may depend on a subframe pattern specified (e.g., may be included) in one or more SIBs, including, for example, SIB2. As an example, the subframe pattern may indicate that MBSFN subframes are not to be allocated to, and/or transmitted in, subframe nos. 0, 4, 5 and 9. The MBSFN subframes may not be allocated to, and/or transmitted in subframe nos. 0, 4, 5 and 9, for example, because cell signals and channels, such as primary synchronization signal and/or secondary synchronization signal (PSS/SSS), physical broadcast channel (PBCH), and/or paging may occur in subframes allocated to, and/or transmitted in subframe nos. 0, 4, 5 and 9.

A MBSFN subframe may consist of, or may include (i) one or more non-MBSFN regions, and (ii) one or more MBSFN regions. The non-MBSFN regions may be provided in the first two symbols of the subframe. The non-MBSFN regions may be used for transmission of control channels, such as a PDCCH, a physical Hybrid-ARQ indicator channel (PHICH) and/or PCFICH. A normal cyclic prefix (CP) may be used for transmissions of such control channels. The MBSFN regions may be provided in the remaining symbols of the MBSFN subframe. The MBSFN regions may be used for transmission of a physical multicast channel (PMCH). The PMCH may carry MBMS related traffic and control data. The MBSFN regions may include one or more reference signals (MBSFN-RS). These MBSFN-RS may be used for demodulation of the PMCH. Extended CP may be used for the MBSFN regions. By using the extended CP, the 10 symbols may be available in the MBSFN regions.

An eNode-B 160 may provide, to WTRUs 102 that support transmission mode 9 or 10, one or more DL grants for unicast PDSCH transmission in instances where MBSFN subframes are not scheduled for PMCH transmission. The WTRUs 102 provided with the grants may receive the PDSCH with a normal CP.

For the WTRUs 102 interested in receiving eMBMS services, configuration and information related to eMBMS may be transmitted in and/or acquired from the (i) SIB2, (ii) SIB13, (iii) SIB15 and/or MCCH. For example, a MBSFN subframe configuration of the cell and MBSFN area may be transmitted in and/or acquired from the SIB2. Multicast Control Channel (MCCH) configuration information may be transmitted in and/or acquired from the SIB13, for instance. Alternatively and/or additionally, MBMS service continuity related information may be transmitted in and/or acquired from the SIB15. Multicast Traffic Channel (MTCH) configuration, MBMS scheduling information, carrying RRC MBMSAreaConfiguration and/or MBMSCountingRequest messages be transmitted in and/or acquired from the MCCH, for example.

Control information transmitted in the MCCH in general remains relatively static. In instances when a change in or to the MCCH configuration is forthcoming, the WTRUs 102 may be notified of the change by the PDCCH using DL control information (DCI) format 1C scrambled with an MBMS radio network temporary identifier (M-RNTI). By reading the 8-bit bitmap transmitted in the PDCCH, the WTRUs 102 become aware of the change in the MCCH configuration to occur in a forthcoming MCCH modification period.

Scheduling of MBMS services may be indicated to the WTRU 102 in the various ways. For example, the WTRU 102 may be advised of the scheduling of the MBMS services by a common subframe allocation (CSA). The CSA may indicate a periodic pattern of MBSFN subframes that may be occupied by a PMCH in the MBSFN area. The CSA may be transmitted to and/or received by the WTRU 102 via the MCCH.

The WTRU 102 may be advised of the scheduling of the MBMS services by a multicast channel (MCH) scheduling allocation/period (MSA/MSP). The MSA/MSP may indicate an allocation of MBSFN subframes for a specific MTCH (e.g. for a particular service) and the periodicity of such allocation. The MSA/MSP may be transmitted to and/or received by the WTRU 102 via the MCCH. Alternatively and/or additionally, the WTRU 102 may be advised of the scheduling of the MBMS services by MCH scheduling information (MSI). The MSI may be transmitted to and/or received by the WTRU 102 via the MSP. The MSI may be sent at a beginning of MSP to indicate the MBSFN subframes that may be allocated for the MTCH in a given MSP. It is contemplated that not all allocated MBSFN subframes may be used during this MSP (e.g., those that are sent via Media Access Control (MAC) Control Element (CE)). Actual usage of MBSFN subframes for PMCH transmission may be determined by the MSI.

Methods, systems and apparatuses directed to WTRU and network operation in advanced long-term evolution (LTE) systems are disclosed. Among the methods, systems and apparatuses are methods, systems and apparatuses directed to advances in WTRU and network operation in view of a new carrier type (NCT) carrier and/or cells that employ the NCT carrier (hereinafter "NCT cells"). At least some of such methods, systems and apparatuses are directed to defining, configuring and/or performing advanced procedures for carrying out WTRU and/or network operation in support of the NCT carrier and/or NCT cells. The method, systems and apparatuses provided herein may define, configure and/or perform advanced procedures for carrying out paging, cell re-selection and measurements, radio link monitoring, system information acquisition and/or cell type detection in support of the NCT carrier and/or NCT cells.

Among the methods, systems and apparatuses directed to advances in WTRU and network operation is a method that may include selectively mixing an NCT subframe with one or more other subframe types in a carrier (e.g., the same carrier). The carrier may be an NCT carrier or a conventional carrier.

The conventional carrier may be an FDD or TDD carrier adapted to carry UL and/or DL transmissions in accordance with a first set of rules and/or protocols (collectively "protocols"). The conventional carrier may be, for example, a legacy carrier, a carrier that is backward compatible with the legacy carrier ("backward-compatible carrier") and/or any other carrier that is not an NCT carrier ("non-NCT carrier"). For the legacy carrier, the first set of protocols may be in accordance with at least one release of 3rd generation partnership project (3GPP) technical specification(s) (TS(s)) directed to LTE prior to release twelve (12) of the 3GPP TSs (collectively "3GPP LTE pre-Rel-12"), such as at least one of 3GPP LTE Rel 8/9/10/11. For the backward-backward compatible carrier, the first set of protocols may be in accordance with at least one release of 3GPP TS(s) subsequent to 3GPP LTE pre-Rel-12 ("3GPP Rel-12+"), and compatible with 3GPP LTE pre-Rel-12. In various embodiments, the non-NCT carrier may operate in a mode other than FDD and/or TDD modes.

The NCT carrier may be a carrier adapted to carry UL and/or DL transmissions in accordance with a second set of protocols; the second set of protocols having at least one protocol (e.g., a physical (PHY) layer protocol) different from the first set of protocols. The second set of protocols, for example, may be in accordance with 3GPP Rel-12+, and incompatible with 3GPP LTE pre-Rel-12. The NCT carrier may be an FDD, TDD or other (e.g., duplexing) mode carrier.

The NCT subframe may be, or include at least a portion of, a subframe defined according to at least one protocol different from conventional subframe types. The NCT subframe, for example, may be a CRS-less subframe, a CRS-limited subframe, a limited port CRS subframe, a DM-RS subframe, a non-backward compatible subframe and a mixed NCT subframe.

The other subframe types may be non-NCT subframes. The non-NCT subframes may include the conventional subframe types. The conventional subframe types may be defined in accordance with 3GPP LTE pre-Rel-12. Examples of the non-NCT subframes may include a normal (e.g., UL and/or DL) subframe, a special subframe, a multimedia broadcast multicast services (MBMS) single-frequency network (SFN) ("MBSFN") subframe and an almost-blank subframe (ABS).

The term "conventional cell", as used herein, refers to a cell that employs the conventional carrier. Examples of the conventional cell include a cell that employs the legacy carrier ("legacy cell"), and a cell that employs the backward-compatible carrier ("backward-compatible cell"). Further, the term "cell", as used herein, implies a carrier, and for ease of exposition, the terms "cell" and "carrier" may be used interchangeably herein.

In a legacy cell, a PDCCH, a PHICH and CRS may be transmitted in every DL subframe. In an NCT cell, one or more control channels, such as a PDCCH, a PHICH, a PCFICH or equivalents thereof, might not be transmitted, and/or CRS may be transmitted in a limited number of subframes (as compared to a conventional cell), if at all. As an example, the CRS may only be transmitted in subframes nos. 0 and 5 of a radio frame.

For WTRUs 102 that may support NCT cells ("NCT-capable WTRUs"), processes and/or procedures are provided herein for performing measurements and enabling idle mode and/or connected mode operation in view of NCT cells being serving and/or neighbor cells. For WTRUs 102 that do not support NCTs ("non-NCT-capable WTRUs" or "conventional WTRUs"), camping on and/or handing over to NCT cells may or may not be possible. In view of this, processes and/or procedures are provided herein to avoid unnecessary actions, e.g., measurements, by such non-NCT-capable WTRUs and by eNode-Bs 160 with respect to these non-NCT-capable WTRUs in view of the NCT cells.

In various embodiments, the WTRUs 102 may support NCT cells only in idle mode or only in connected mode. For simplicity of exposition, such WTRUs will be referred to herein below as "NCT-capable WTRUs" unless a distinction needs to be made. In which case, the WTRUs 102 that support NCT cells only in idle mode will be referred to as "im-NCT-capable WTRUs", and the WTRUs 102 that support NCT cells only in connected mode will be referred to as "cm-NCT-capable WTRUs". When referred to herein with regards to idle mode, any act, operation, process, procedure, method, etc. carried out by, and/or in connection with, an NCT-capable WTRU may be likewise carried out by, and/or in connection with, a im-NCT-capable WTRU, unless otherwise noted. When referred to herein with regards to connected mode, any act, operation, process, procedure, method, etc. carried out by, and/or in connection with, an NCT-capable WTRU may be likewise carried out by, and/or in connection with, a cm-NCT-capable WTRU, unless otherwise noted.

When referred to herein with regards to idle mode, the terms "non-NCT-capable WTRUs" or "conventional WTRUs" may refer to the WTRUs 102 that support NCT cells only in connected mode. When referred to herein with regards to connected mode, the terms "non-NCT-capable WTRUs" or "conventional WTRUs" may refer to the WTRUs 102 that support NCT cells only in idle mode.

Conventional LTE Idle Mode Related Operations in View of NCT Cells or Carriers

Paging

When an eNode-B 160 is directed by the network to send a page to a WTRU 102, the eNode-B 106 is informed of a location of the WTRU 102. The location of the WTRU 102 may be expressed in terms of one or more tracking areas (TAs) of the WTRU 102 registered with the network. The eNode-B 160 may page the WTRU 102 in some or all the cells of such registered TAs. The eNode-B 160 might not page the WTRU 102 in CSG cells that the WTRU 102 is known to not belong to.

If, at the time of paging the WTRU 102, the eNode-B 160 lacks knowledge as to whether the WTRU 102 supports NCT cells or carriers, the eNode-B 160 may page a conventional WTRU in NCT cells if NCT cells are in the registered TA(s) of the conventional WTRU. This may result in wasting resources on NCT cells. Processes and/or procedures provided herein below are directed to avoiding paging of non-NCT-capable WTRUs in NCT cells, and/or directed to paging NCT-capable WTRUs in an NCT cell and/or another carrier type cell.

Cell Selection/Re-Selection

NCT cells, such as those with reduced CRS transmissions, may be more energy efficient by DTXing non-CRS subframes, and may potentially be used with more advanced transmission modes while reducing the interference to other cells caused by CRS transmission. In addition, use of NCT cells to page NCT-capable WTRUs may reduce the paging load of conventional cells. In view of this, it may be desirable and/or preferable for NCT-capable WTRUs to camp on NCT cells, e.g., while in idle mode. As described in detail below, methods and procedures provided herein are accordingly directed to enabling NCT-capable WTRUs to measure and/or camp on NCT cells when available (such as when performing cell selection and re-selection).

Conventional LTE Connected Mode Related Operations in View of NCT Cells or Carriers Handover A non-NCT-capable WTRU that may be camped on or connected to a conventional cell may report RSRP and/or RSRQ measurements of an NCT cell. The reported measurements may be sufficient to cause a corresponding eNode-B to trigger handover (HO) to the NCT cell. Given that the non-NCT-capable WTRU does not support NCT cells, a HO failure is likely to occur at some point in the HO process. The HO failure may result in the WTRU returning to the original conventional cell or radio link failure, both of which may result in dropped or delayed packets. Processes and/or procedures provided herein below are accordingly directed to avoiding unnecessary HOs or attempts of HOs of non-NCT-capable WTRUs to NCT cells.

RLM and Measurements

RLM and certain other measurements may rely on existence of CRS in every DL subframe. In absence of CRS in some subframes, accuracy of RLM and the certain other measurements may be considerably reduced. Processes and/or procedures provided herein below are accordingly directed to handling RLM and measurements in cells that lack CRS in every DL subframe.

Handling of NCT Subframes with Other Subframe Types

A single type of subframe ("subframe type") or mixture of different subframe types may be used in a carrier according to a network configuration. As noted above, for example, TDD radio frame of FIG. 2A may include normal (e.g., UL and/or DL) subframes and special subframes. Other subframe types may include, for example, a multimedia broadcast multicast services (MBMS) single-frequency network (SFN) ("MBSFN") subframe, an almost-blank subframe (ABS), and an NCT subframe. In a conventional cell, the different subframe types other than the NCT subframes may be mixed in the same carrier. Processes and/or procedures provided herein below are accordingly directed to (i) mixing NCT subframe with other subframe types in the same carrier and/or (ii) operation and/or integration of the NCT subframes with other subframe types. Mixing the NCT subframe with other subframe types in the same carrier may provide better utilization of (e.g., downlink) time/frequency resources (when compared to, e.g., not mixing such frames) in view of CRS being considered as overhead.

Conventional LTE System Information Acquisition and Cell Detection in View of NCT Cells or Carriers Cell Detection Given signals, such as control and/or reference signals transmitted by NCT cells, may have differences from similar type signals transmitted by conventional cells, delays and inefficiencies in certain procedures may occur if a WTRU 102 does not know whether a cell is an NCT cell or a conventional cell. Processes and/or procedures provided herein below are accordingly directed to determining whether a cell is a conventional cell or an NCT cell. At least some of these processes and/or procedures are directed to determining whether the cell is a conventional cell or an NCT cell before or in early stages of carrying out the methods and procedures. Examples of such processes and/or procedures include processes and/or procedures for carrying out measurements, handover, and/or acquisition of system information. Determining whether the cell is a conventional cell or an NCT cell before or in early stages of carrying out the processes and/or procedures may reduce latency and/or minimize complexity of such processes and/or procedures.

Enhanced PBCH

The detection performance of a conventional PBCH may be impacted or significantly impacted for the NCT carrier. This may be due to the NCT carrier having different structure than the conventional carrier. As an example, if CRS ports are not used for demodulation in the NCT carrier, detection of the conventional PBCH, which may depend on the existence of the CRS, may not be detected robustly. Processes and/or procedures provided herein below are accordingly directed to delivering PBCH information to NCT-capable WTRUs.

Conventional LTE MBMS Related Operation in view of NCT Cells or Carriers

Additional MBSFN Subframes

Additional MBMS subframes, e.g., subframes nos. 0, 4, 5, and/or 9, may conflict with paging occasions on NCT cells and/or carriers. Processes and/or procedures provided herein below are accordingly directed to deriving an allocation of paging occasions for an NCT-capable WTRU that is capable of supporting MBMS. Such processes and/or procedures may be useful when additional MBSFN subframes have been configured in the NCT cell.

MCCH Modification Notification

In various embodiments, procedures to notify a WTRU 102 of a MCCH modification in an upcoming modification period are implemented. These procedures might not be used the PDCCH if the PDCCH is not supported in NCT cells or carrier. In addition, an enhanced PDDCH (ePDCCH) might not be used because the non-MBSFN region may not be large enough, and the ePDCCH might not be used in the MBSFN region because it has extended CP. Processes and/or procedures provided herein below are accordingly directed to providing a MCCH modification notification on NCT cells for an NCT-capable WTRU that is capable of supporting MBMS.

Extended MBSFN Region

Given that an NCT carrier may not support control signals, such as PDCCH, PHICH and PCFICH, as part of the normal operation, two symbols in a non-MBSFN region of MBSFN subframe may be unused if an NCT carrier follows conventional eMBMS operation. Further, control channels in the MBSFN subframe may be needed or may be used to address non-MBMS WTRUs, whether to indicate UL grants, power control information, as in conventional MBMS operation, or to provide DL grants, in case of use of the MBSFN subframe for normal PDSCH transmissions. The extended MBSFN region, including the non-MBSFN region, may provide a means to fully utilize the available resources in MBSFN subframes, for PMCH and/or PDSCH transmission.

MBMS Support for Non-NCT-Capable WTRUs

Non-NCT-capable WTRUs that support MBMS service reception may not be able to access MBMS transmissions from NCT cells. In an effort to maximize the support of MBMS receiving WTRUs in MBMS service area including NCT cells, processes and/or procedures provided herein below are accordingly directed to supporting MBMS reception by all MBMS capable WTRUs.

Idle Mode Related Operation

Paging

Based on registered Tracking Areas TAs of a WTRU to be paged, an MME 162 may send a S1 paging message to certain eNode-Bs 160. These eNode-Bs 160 may be, e.g., some or all of the eNode-Bs 160, of the registered TAs. The S1 paging message may include, for example, one or more of LSBs of an IMSI of the WTRU 102, and an S-TMSI (or IMSI) of the WTRU 102. The S1 paging message may also include a WTRU-specific DRX cycle. The eNode-B 160 may send an RRC paging message, addressed by P-RNTI, on paging occasions for the WTRU 102. The paging occasions may be derived from one or more of the WTRU-specific DRX cycle, a default DRX cycle of a cell, a frequency of available paging occasions of the cell, and the LSBs of the IMSI of the WTRU 102. The RRC paging message sent in the given cell on a particular paging occasion may contain the S-TMSI or IMSI of each WTRU 102 to be paged in such cell that share the same paging occasion.

Processes and/or procedures directed to avoiding paging of non-NCT-capable WTRUs in NCT cells and/or directed to paging NCT-capable WTRUs in an NCT cell and/or another carrier type cell follow.

Provide MME with NCT-Capability Information

In an embodiment, information indicative of whether a WTRU 102 (either NCT-capable or non-NCT capable) supports NCT cells (NCT-capability information) may be provided to an MME 162. The NCT-capability information may be included in capability information of the WTRU 102 (WTRU-capability information). This WTRU-capability information may be and/or include, for example, radio capability information associated with the WTRU 102. Examples of such WTRU-radio-capability information include WTRU-EUTRA-Capability information and/or information element (1E) for the WTRU-EUTRA-Capability information ("WTRU-EUTRA-Capability 1E"). The WTRU capability information (e.g., any of the WTRU-radio-capability information, WTRU-EUTRA-Capability information, WTRU-EUTRA-Capability 1E, etc.) may be provided to and/or stored by the MME 162. The MME 162 may be, for example, the MME to which the WTRU 102 may be registered or to which the WTRU 102 may have been previously or last registered).

One or more of the following may apply in connection with transfer and/or storage of the NCT-capability information.

1. An RRC WTRU capability transfer procedure may be triggered by an eNode-B 160. Such RRC WTRU capability transfer procedure may be triggered and/or carried out, for example, after or in response to receiving a message from the MME 162. This message may be, for example, an S1 Initial Context Setup Request message for a WTRU that does not contain a WTRU Radio Capability 1E.

2. The WTRU 102 may explicitly signal the NCT-capability information. This may be carried out via higher layer signaling, such as, for example via an RRC WTRUCapabilityInformation message. An NCT-capable WTRU may provide the NCT-capability information always. Alternatively, the NCT-capable WTRU may provide the NCT-capability information based on a type of its serving cell, such as if the serving cell (e.g., only if the serving cell) of the NCT-capable WTRU is an NCT cell and/or an NCT aware cell (collectively "NCT cell").

3. The WTRU 102 may include the NCT-capability information and/or an indication of the NCT-capability information with its radio capability information, such as its WTRU-EUTRA-Capability information or 1E.

4. The eNode-B 160 may provide the NCT-capability information and/or an indication of the NCT-capability information to the MME 162.

5. The WTRU radio capability may be uploaded by the eNode-B 160 to the MME 162. This may occur, for example, after an RRC WTRU capability transfer procedure, via an S1 WTRU CAPABILITY INFO INDICATION message that may include the NCT-capability information and/or the indication of the NCT-capability information.

6. The MME 162 may store the NCT-capability information and/or the indication of the NCT-capability information. The MME 162 may store the NCT-capability information and/or the indication of the NCT-capability information, for example while the WTRU 102 is in an EMM_IDLE state.

7. The MME 162 may store the NCT-capability information and/or the indication of the NCT-capability information as part of its stored radio capabilities for the WTRU 102.

8. The MME 162 may store the WTRU radio capability, which may include the NCT-capability information and/or the indication of the NCT-capability information. The MME 162 may store the WTRU radio capability, for example, while the WTRU 102 is in EMM_IDLE state.

In various embodiments, if a WTRU 102 registers via a conventional cell, the conventional cell might not recognize inclusion or exclusion the NCT-capability information and/or the indication of the NCT-capability information in its capabilities. In such instances, the WTRU 102 may send to the MME 162 the capabilities excluding the NCT-capability information and/or the indication of the NCT-capability information.

The MME 162 may maintain one or more states of NCT support. Such states may include support, no support, and/or unknown support. When receiving WTRU capabilities from eNode-Bs 160 of conventional cell (e.g., using older version signaling), the MME 162 may consider the state of NCT support for the WTRU 102 as being any of unknown support and no support of NCT cells.

In various embodiments, a conventional cell or an eNode-B of a conventional cell may accept WTRU capabilities, including the NCT-capability information and/or the indication of the NCT-capability information, and may pass such information to the MME 162. This may be done via a S1 WTRU CAPABILITY INFO INDICATION message. The eNode-B might not read the WTRU capabilities, but it may pass them to the MME 162. The MME 162 might not read the capabilities, but it may store them.

A TA update (TAU) may be used to assist the MME 162 or other network node in determining whether a WTRU 102 is an NCT-capable WTRU or a non-NCT-capable WTRU.

The WTRU 102, for example, may include the NCT-capability information and/or the indication of the NCT-capability information when performing a TAU. The WTRU 102 may identify whether it supports, e.g., that it supports, NCT cells when it reports the TAU.

Alternatively and/or additionally, the WTRU 102 may perform a TAU or send a TAU message when re-selecting from a conventional cell to an NCT cell, or the first time it re-selects from the conventional cell to the NCT cell. Such re-selection may be independent of whether the TA actually changed.

In various embodiments, the NCT-capability information may include and/or the indication of the NCT-capability information may indicate support for NCT in idle mode, connected mode or both. The WTRU 102 may provide separate NCT-capability information and/or separate indications of the NCT-capability information for idle mode and for connected mode.

The WTRU 102 may provide NCT-capability information and/or a single indication of the NCT-capability information representing support for NCT cells in both idle mode and connected mode. Alternatively, the NCT-capability information and/or the single indication of the NCT-capability information may indicate support for NCT cells in connected mode, and no support for NCT cells in idle mode (and vice-versa).

Excluding the NCT-capability information and/or the indication of the NCT-capability information in a particular mode (e.g., excluding an 1E from a message, such as when reporting capabilities) may be the same as indicating lack of support for NCT or for NCT in the particular mode.

The indication of the NCT-capability information may be multiple indications.

Configure NCT with a Tracking Area Identity (TAI) Different from the Conventional Cells NCT cells may be configured with a TA identity (TAI) or identities ("NCT-cells TAIs") different from that or those of backward-compatible cells. Given that non-NCT-capable WTRUs may not or would not report the NCT-cells TAIs when reporting the TA(s) in which the non-NCT-capable WTRUs can be found in the network may not or would not page non-NCT-capable WTRUs on NCT cells.

Given a separation of TA between NCT and conventional cells, in various embodiments, the TAI list that the MME 162 provides to a WTRU 102 (e.g., in response to a TAU Request and/or in a TAU Accept Message) may depend on the cell from which the TAU Request has been received.

In various embodiments, when the MME 162 receives a TAU Request message from a TA, or a WTRU 102 in a TA, configured for NCT cells (NCT-cell TA), the TAU Request message may include TAIs of NCT-cell TA(s) and TAs of backward compatible cells. This may reduce performance of the WTRU with respect to tracking update procedures when the WTRU 102 moves between NCT cells and backward compatible cells, and thus, changes TAs.

In various embodiments, when the MME 162 receives a TAU Request message from a TA, or a WTRU 102 in a TA, configured for backward-compatible cells, the TAU Request message may only include TAIs of TAs of backward compatible cells.

The MME 162 may not know that the separation among TAIs is based on NCT or not based on NCT. The MME 162 may know that a first set of rules apply for one set of TAs or TAIs, and as second set of rules for another set of TAs or TAIs, and to apply the rules accordingly.

If the MME 162 never previously received a TAU Request for an NCT-cell TA, then the MME 162 may not include any NCT-cell TAI in the TAI list it sends to WTRUs 102. This may apply for some or all WTRUs 102, and/or may be specific to a certain WTRU 102. For example, if the MME 162 never received a TAU Request for a certain WTRU 102 for a TA of an NCT cell, then the MME 162 might not include TAI for NCT TAs in a TAI list sent to the WTRU 102 (e.g., in a TAU Accept message).

Alternatively and/or additionally, the MME 162 might not include an NCT-cell TAI in the TAU Accept message to any WTRU 102, if, for example, the MME 162 has never received a TAU message from the NCT-cell TA.

If the MME 162 has a record of a prior TAU from an NCT-cell TA for a WTRU 102, and the WTRU 102 is known to be NCT-capable WTRU, the MME 162 may include the NCT-cell TAI in the TAI list along with the TA of the compatible cell. This may be independent of the TA from which the TAU message is received or the last visited TAI of the WTRU 102.

Extending S1 Paging Message to Include the WTRU Radio Capability

During the EMM_IDLE state of a WTRU 102, a WTRU-radio-capability may be stored in an MME 162 to which the WTRU 102 previously registered. The eNode-B 106 may obtain the WTRU-radio capability from the MME 162. The WTRU-radio capability may be obtained, e.g., via an initial context setup request message after the WTRU 102 responds to a page (and may not have the WTRU-radio capability at the time of paging).

If the NCT-capability information and/or the indication of the NCT-capability information was signaled previously and stored by the MME 162, for example as part of the WTRU radio capability, the S1 paging message may be extended to include the WTRU radio capability of NCT support information.

Based on the NCT-capability information and/or the indication of the NCT-capability information, which may be included in the WTRU radio capability, the eNode-B 160 may determine the WTRU 102 being paged is not an NCT-capable WTRU or not NCT-capable in idle mode. The eNode-B 160, based on the determination, might not transmit, in the NCT cell, RRC paging messages with an identity of the WTRU 102.

For WTRUs 102 for which NCT support is unknown, an eNode-B 160 may page such WTRUs 102 in NCT cells. Alternatively, the eNode-B 160 may consider the WTRUs 102 as not supporting NCT cells, or not supporting NCT cells in idle mode, and not page such WTRUs 102 in NCT cells.

In various embodiments, an eNode-B 160 may page WTRUs 102 in cells under its control. An eNode-B that controls NCT cells may page a WTRU 102 in NCT cells, and such eNode-B 102 may understand signaling from MMEs 162 that provide the NCT-capability information and/or the indication of the NCT-capability information.

Although an MME 162 may not be capable of knowing WTRU radio capability, the MME 162, in various embodiments, may be configured through OA&M, such that the MME 162 includes (e.g., only includes) the WTRU radio capability in S1 Paging message to certain eNode-Bs 160 (e.g., eNode-Bs controlling NCT cells).

Cell Selection/Re-Selection

Processes and/or procedures directed to selection and/or re-selection to and/or from NCT cells follow.

In various embodiments, an NCT-capable WTRU may prioritize and/or re-prioritize one or more NCT cells over at least one or more conventional cells for cell selection and/or cell re-selection. The NCT-capable WTRU may carry out such prioritization and/or re-prioritization in accordance with one or more of the embodiments described herein.

The NCT-capable WTRU may, responsive to detection of one or more NCT cells, select for re-selection, and/or re-select to, one of the detected NCT cells. The NCT cell that the NCT-capable WTRU selects for re-selection may be, for example, a suitable NCT cell, which may be on a different frequency from that of the cell that the NCT-capable WTRU is currently camped on. The NCT-capable WTRU may carryout selection of the NCT cell, and/or re-selection to the selected NCT cell, irrespective of frequency priority of the cell the NCT-capable WTRU is currently camped on ("camped-on cell"). Additionally and/or alternatively, the NCT-capable WTRU carryout selection of the NCT cell, and/or re-selection to the selected NCT cell, for example, if (or only if) the concerned NCT cell is the highest ranked cell or NCT cell on that frequency. Alternatively and/or additionally, the NCT-capable WTRU may select for re-selection, and/or re-select to, a detected NCT on the same frequency as the camped-on cell.

The NCT-capable WTRU may prioritize or re-prioritize NCT cells over conventional cells autonomously. The autonomous prioritization or re-prioritization of NCT cells over conventional cells may be carried out, for example, when performing cell re-selection and/or cell selection. In various embodiments, the NCT-capable WTRU may be pre-configured and/or semi-statically configured (e.g., with rules) for carrying out the autonomous prioritization and/or re-prioritization.

Prioritization and/or re-prioritization of NCT cells over conventional cells may be based, for example, on certain criteria and/or values being met. The certain criteria and/or values on which the certain criteria may be based may be, for example, signaled to the NCT-capable WTRU via an eNode-B 160. The signaling carrying the certain criteria and/or values may received by the NCT-capable WTRU and/or transmitted from the eNode-B 160 via broadcast and/or dedicated signaling, such as RRC signaling.

In various embodiments, the prioritization and/or reprioritization of NCT cells over conventional cells may be based on signal strength and/or quality of a target NCT cell (e.g., a detected NCT cell to which re-selection is being considered). In various embodiments, the prioritization and/or reprioritization of NCT cells over conventional cells may be based on at least one of a signal strength threshold or quality threshold. For example, the re-selection to a target NCT cell by the NCT-capable WTRU may occur if, or only if, the signal strength and/or quality of the target NCT cell satisfy (e.g., have better values than) a threshold and/or respective thresholds (value(s)). One or more threshold values (e.g., signal strength and/or quality threshold values) may be received by the NCT-capable WTRU and/or transmitted from (via) the eNode-B 160. The threshold values may be carried in signaling. This signaling may be broadcast and/or dedicated signaling, such as RRC signaling.

In various embodiments, one or more of the thresholds (and/or values) may be different from threshold(s) (and/or value), if any, the NCT-capable WTRU may use for other types of re-selection, e.g., conventional, inter-frequency re-selection. The NCT-capable WTRU may apply the same thresholds to any detected and/or suitable NCT cells, and/or to any detected and/or suitable NCT cells on a different carrier frequency than the camped-on cell. In various embodiments, the thresholds may be associated with a specific carrier frequency and/or physical cell id. The NCT-capable WTRU may apply, or only apply, such thresholds to the NCT cell or NCT cells having the specific carrier frequency and/or physical cell id.

In various embodiments, the prioritization or reprioritization of NCT cells over conventional cells may be based on at least signal strength and/or quality offset between a target NCT cell and the camped-on cell. For example, the re-selection to an NCT cell by an NCT-capable WTRU may occur, or only occur, if at least one of the signal strength and/or quality of the target cell is at least an offset different than, and/or satisfies an offset threshold value associated with, the signal strength and/or quality of the camped-on cell. The offset value and/or offset threshold value (e.g., signal strength offset, quality offset and/or offset threshold value) may be received by the NCT-capable WTRU from the eNode-B 160. The offset value and/or offset threshold value may be carried in signaling. The signaling may be broadcast and/or dedicated signaling, such as RRC signaling). The NCT-capable WTRU may apply the same offset or offset threshold to any detected and/or suitable NCT cells, and/or to any detected and/or suitable NCT cells on a different carrier frequency than the camped-on cell. In various embodiments, the offset or offset threshold may be associated with a specific carrier frequency and/or physical cell id. The NCT-capable WTRU may apply, or only apply, such offset or offset threshold to the NCT cell or NCT cells having the specific carrier frequency and/or physical cell id.

In various embodiments, the serving cell signal strength and/or quality threshold above which the NCT-capable WTRU may not need to search for, and/or measure, neighboring NCT cells may be different from a serving cell signal strength and/or quality threshold above which the NCT-capable WTRU may not need to search for, and/or measure, intra-frequency and/or inter-frequency conventional cells.

The serving cell signal strength and/or quality threshold below which the NCT-capable WTRU may be required to search for, and/or measure, neighboring NCT cells may be different from a serving cell signal strength and/or quality thresholds below which the NCT-capable WTRU may be required to search for, and/or measure, intra-frequency and/or inter-frequency conventional cells.

In various embodiments, the NCT-capable WTRU may receive, from an eNode-B 160, an indication that camping on and/or re-selection to an NCT cell is preferred. This indication may be provided in broadcast or dedicated signaling, such as RRC signaling. The NCT-capable WTRU may prioritize and/or re-prioritize NCT cells over conventional cells, for example, if, or only if, the NCT-capable WTRU receives this indication.

In various embodiments, the WTRU 102 may perform neighbor cell measurements. The WTRU 102 may use the neighbor cell measurements for making cell re-selection decisions, and/or for performing cell selection or re-selection. Making the cell re-selection decisions and/or performing cell selection or re-selection may be based on and/or in accordance with at least one of the following.

NCT cells may be deployed on a frequency (or frequencies) different from conventional cells. The frequency (or frequencies) on which NCT cells may be deployed may be referred to herein as an NCT frequency. The NCT frequency (or frequencies) and/or priority (or priorities) of the NCT frequency (or frequencies), such as for re-selection, may be signaled to the WTRU 102. If signaled via broadcast (e.g., from a cell supporting LTE Rel-12 or later signaling), then the NCT frequency (or frequencies) and/or priority (or priorities) may be signaled in an extension 1E (or IEs) that may not be visible or otherwise unbeknownst to conventional WTRUs. In various embodiments in which the NCT-capable WTRU is receives such signaling, such NCT-capable WTRU may measure at least one cell on at least one of the frequencies. The NCT-capable WTRU may use at least one of the measured frequencies and/or at least one of the priorities when determining which cells to measure and/or when and/or in what order to measure the cells for cell re-selection or cell re-selection decisions.

In various embodiments, a conventional WTRU might not be able to receive the signaling carrying the NCT frequencies and/or priorities of the NCT frequencies. In various embodiments, a conventional WTRU that is not able to receive the signaling might not include the NCT frequencies in its measurements for cell re-selection, and/or may not detect cells on these frequencies. A conventional WTRU that is able to receive the signaling might not include the NCT frequencies in its measurements for cell re-selection, and/or may not detect cells on these frequencies.

The signaled priority value for a corresponding NCT frequency may or may not be comparable to one or more of the priority values for respective frequencies for conventional cells. For example, though a re-selection priority value for an NCT frequency may be the same as the re-selection priority for one of the conventional-cell frequency, the priority value for the NCT frequency (which may be in a separate space) may be, or only be, used for comparison between NCT frequencies. In various embodiments, all frequencies that may be used for NCT cells, some of which may have the same priority as frequencies used for conventional cells, may have priority higher than the frequencies for the conventional cells.

In various embodiments, the WTRU 102 may, or may be required, to camp on or connect to a cell that may not be an NCT cell, but that may provide information regarding neighboring NCT cells.

In various embodiments, an NCT-capable WTRU may receive signaling from an eNode-B 160 or other network entity (e.g., via a serving cell or the cell the NCT-capable WTRU is camped on) that may, for example, explicitly identify NCT cells or NCT frequencies to measure for cell re-selection. The serving cell or camped on cell may be an NCT cell or a non-NCT cell. The NCT-capable WTRU may, or may only, search for and/or measure the NCT cells or NCT frequencies identified. The NCT-capable WTRU may receive this information via broadcast and/or dedicated signaling. Such dedicated signaling may be, for example, dedicated prioritization information. Alternatively and/or additionally, the NCT-capable WTRU may receive the information, for example, in a RRC connection release message.

In various embodiments, the NCT-capable WTRU may not be required to autonomously distinguish between an NCT cell and a backward-compatible cell, for example, when making measurements (such as idle mode measurements), and/or for cell re-selection. In various embodiments, the NCT-capable WTRU may measure some or all cells as if they were conventional cells unless receiving, e.g., from the eNode-B of the serving or camped on cell, information indicating otherwise.

In various embodiments, the NCT-capable WTRU may or may only re-select to an NCT cell if the current serving or camped on cell is an NCT cell and/or if the current serving or camped on cell provides information indicating certain cells, e.g., neighbor cells, as NCT cells.

In various embodiments, the NCT-capable WTRU may, or may only, select or re-select to an NCT cell if the NCT-capable WTRU has prior information that the cell is an NCT cell.

In various embodiments, a conventional cell may include neighboring NCT cells in one or more blacklists to avoid measurements of NCT cells by non-NCT-capable WTRUs in idle or connected mode. In various embodiments, an NCT-capable WTRU (e.g., one which may detect NCT cells or which may receive indications from the network identifying NCT cells) may ignore one or more restrictions associated with some or all of the NCT cells set forth in at least one of the blacklists. In various embodiments, the NCT-capable WTRU may use a different blacklist from non-NCT-capable WTRUs, and may ignore some or all of the restrictions in blacklist(s) used by non-NCT-capable WTRUs. A non-NCT-capable WTRU that understands the presence of NCT cells may use the conventional blacklist similar to a non-NCT-capable WTRU.

A non-NCT-capable WTRU that understands a presence of NCT cells may use signaling relating to NCT cells to avoid at least one of searching for, measuring, or attempting re-selection to a frequency or cell such non-NCT-capable WTRU knows to be an NCT cell.

In various embodiments, an NCT-capable WTRU may, or may be required to, determine whether a cell is an NCT cell before measuring the cell and/or comparing the measurement results and/or measurement quality among certain cells. For example, the NCT-capable WTRU, which may be in idle mode, may, or may be required to, determine whether at least a certain cell is an NCT cell. The NCT-capable WTRU may do so, for example, by reading a MIB of the cell before determining a ranking of the neighbor cells and/or a highest ranked neighbor, and/or as otherwise described herein below.

In various embodiments, an NCT-capable WTRU may determine, based on allowedMeasBandwidth, whether it has neighboring NCT cells on a particular carrier frequency. For example, the NCT-capable WTRU may determine that there are no neighboring NCT cells to measure in a particular carrier frequency if allowedMeasBandwidth is less than a minimum required for the measurements of NCT cells.

In various embodiments, the NCT-capable WTRU may obtain the neighboring NCT cells of the serving cell or camped-on cell from a list. This list may be, e.g., a whitelist. The whitelist may be provided by the serving or camped-on cell. The list may contain a set of physical cell identities (PCIs) corresponding to NCT cells. The cells in the set may be explicitly identified. Alternatively, the cells in the set may be a consecutive range of PCIs, such that only one PCI is specified and the number of consecutive PCIs is specified enabling the NCT-capable WTRU to determine the PCI range for NCT. The list may be used for both idle and connected modes. Alternatively, separate lists may be provided for use in idle mode and connected mode.

Connected Mode Related Operation
Handover

An NCT cell might not be accessible by a non-NCT-capable WTRU. It may be desirable to prevent NCT cells from being considered as target cells for handover, e.g., connected mode HO, for the non-NCT-capable WTRU.

The network may provide restrictions such that an NCT cell may not be considered a target cell for connected mode HO for any non-NCT-capable WTRU. These restrictions may be provided via signaling. The restrictions may be provided to the non-NCT-capable WTRU and/or from one network node to another.

An MME 162 may provide to an eNode-B 160, for example, as part of a HO restriction list information, an indication that a WTRU 102 is a non-NCT-capable WTRU (or non-NCT-capable WTRUs such as certain non-NCT-capable WTRUs or all non-NCT-capable WTRUs), may not access cells in certain TAs, such as TAs that are used for NCT cells, or TAs that may include NCT cells along with conventional cells.

In various embodiments, one eNode-B 160a may inform another eNode-B 160b that one or more of its cells are NCT cells. The eNode-Bs 160 may exchange this information, for example, via X2 signaling.

In various embodiments, an eNode-B 160 may keep track of whether a neighbor is a conventional cell or an NCT cell. The eNode-B 160 may memorialize the tracking of neighbors by storing tracking information in its automatic neighbor relationship (ANR) information. An eNode-B 160 may obtain the ANR information by at least one of information from OA&M or other network configuration entities, another eNode-B (such as an eNode-B controlling the neighbor cell), and measurement reports from WTRUs that may include the NCT indication in the measurement reports.

In various embodiments, an eNode-B 160 may restrict (or block) one or more non-NCT-capable WTRUs from HO to a neighbor cell based on its knowledge of the neighbor cell being an NCT cell. Such knowledge may be based on the ANR information. Restricting (or blocking) HO to a certain cell for a certain WTRU may mean that the eNode-B 160 may not attempt to HO that certain WTRU 160 to that certain cell or that the HO of that certain WTRU to that certain cell is not permitted.

In various embodiments, an eNode-B 160 may update its restrictions for non-NCT-capable WTRUs with respect to HO to a neighbor cell. The update to the restrictions may be based on knowledge of the neighbor cell being an NCT cell; which knowledge may be based on the ANR information. Restriction for a WTRU with respect to HO may mean that the eNode-B 160 may not attempt to HO that certain WTRU to that certain cell or that the HO of that certain WTRU to that certain cell is not permitted.

A "No_HO" parameter in ANR for neighboring cells may be used, and/or may be expanded to indicate no HO (e.g., no handover is permitted to the certain cell or cells associated with a certain parameter) for non-NCT-capable WTRUs and/or for some or all WTRUs. As an example, if an attempted HO to an NCT cell for a non-NCT WTRU fails or is rejected by a target eNode-B, it may be indicated by the source eNode-B using the No_HO parameter being set to true) for non-NCT-capable WTRUs, but is not set to true for NCT-capable WTRUs. As another example, the No_HO parameter provided from the eNode-B may be set to true for non-NCT-capable WTRUs for a certain neighbor cell after or responsive to a certain number of attempted HO to that certain neighbor fail or are rejected for non-NCT-capable WTRUs.

The HO rejection clause, which may be part of a handover preparation procedure (e.g., according to 3GPP TS 36.300 or a modification thereof in accordance with the teaching herein), may include a new failure clause related to incompatibility such as between a WTRU to be handed over and the target cell. The failure clause may indicate, for example, that a HO failed due to WTRU compatibility issues. The failure clause may indicate, for example, that the HO to the NCT cell was attempted for a non-NCT-capable WTRU. The source eNode-B may use such indication to update its ANR information for the target cell. For example, if a source eNode-B receives this failure clause as a result of attempted HO to a certain cell, then the eNode-B may indicate in its ANR information that this cell is NCT cell. The eNode-B may then restrict (e.g., block or not attempt) HO to that cell for non-NCT-capable WTRUs.

In various embodiments, an eNode-B 160 may be advised of, and/or maintain, whether a WTRU 102 is an NCT-capable WTRU based on one or more of the following: (i) the eNode-B 160 receiving from the MME 162 (e.g., as part of the WTRU radio capability information) NCT-capability information associated with the WTRU 102; (ii) the WTRU 102 accessing and/or connecting to an NCT cell (e.g., one under the control of the eNode-B 160); (iii) the WTRU 102 reporting a measurement of a neighboring NCT cell, e.g., in EMM_CONNECTED state (assuming having mechanisms in place to prevent or distinguish from a non-NCT-capable WTRU from reporting/recognizing an NCT cell); and/or (iv) the WTRU 102 reporting a measurement of a neighboring cell, for example in EMM_CONNECTED state along with an explicit indication that the neighbor is an NCT cell (assuming having mechanisms in place to prevent or distinguish from a non-NCT-capable WTRU from reporting/recognizing an NCT cell).

RLM and Measurements

Aspects of the operation of a WTRU 102 in RRC connected mode are provided herein below. In various embodiments, an NCT-capable WTRU may handle measurements in accordance with at least one of the processes and procedures described herein.

RSRP Measurements

The NCT-capable WTRU may re-initialize and restart its RSRP measurement and/or RSRQ measurement and/or DL PL estimation for a given cell when it determines that the carrier is an NCT carrier. The NCT-capable WTRU may filter out from the measurement any subframe used for measurements that correspond to a subframe for which no CRS is expected for the NCT carrier (e.g., subframes other than subframe nos. 0 and 5).

Measurement Configuration and Detection of NCT Cells

The NCT-capable WTRU may be configured with a measurement object, for which the purpose for the associated report configuration is to detect NCT cells. For example, the NCT-capable WTRU may be configured with a measurement object with a measurement identity, measID, in a list of configured measurements such that a purpose for an associated reportConfig is set to report of NCT cell, e.g., reportNCT. Alternatively, if the carrier type may only be determined from acquisition of MIB, SIB1 and/or any other SIB, the reporting configuration, reportConfig, may also be configured such that the NCT-capable WTRU is requested to acquire at least part of the system information (e.g., by using parameter si-RequestForHO).

The NCT-capable WTRU may implicitly determine whether or not a cell is an NCT cell from a configuration of a range of PCIs, such that PCIs in the concerned range are for NCT cells or carriers. For example, the NCT-capable WTRU may determine that the PCI range measSubframe-CellList indicated with a subframe measurement restriction measSubframePatternConfigNeigh may correspond to NCT carriers. Such determination may be made, for example, only if the subframe restriction matches the restriction for CRS transmission on the NCT carrier (e.g., only subframe nos. 0 and 5 may be measured).

The NCT-capable WTRU may not have a priori knowledge of whether the cell is of a conventional cell or an NCT cell. In such case, the NCT-capable WTRU may determine whether the cell is a conventional cell or an NCT cell while it performs measurements, such as, for example, by acquiring MIB and/or SIB1. Acquisition of the MIB and/or SIB1 may be carried out, for example, by performing blind detection of a BCH and/or by acquiring an ePDCCH. Once the NCT-capable WTRU determines the type of cell, the NCT-capable WTRU may perform the necessary adjustments to its measurement result (such as filtering out any subframe that does not correspond to a subframe meeting certain criteria, such as being a subframe expected to carry CRS or such as being subframe no. 0 or subframe no. 5, if the NCT-capable WTRU determines that the cell is an NCT cell).

In various embodiments, the NCT-capable WTRU may first assume that the cell is a conventional cell and perform measurements according to conventional procedures. If the NCT-capable WTRU determines that the cell is not a suitable cell based on measurement results using the conventional procedure, the NCT-capable WTRU may subsequently attempt measurements using procedures for an NCT cell. For example, the NCT-capable WTRU may implicitly apply a timing subframe restriction, and perform measurements on certain subframes (e.g., only on certain subframes), such as, for example, subframes expected to carry CRS or subframe no. 0 and/or subframe no. 5, among others. Alternatively or additionally, the NCT-capable WTRU may maintain, in parallel or otherwise, different measurement results. For example, the NCT-capable WTRU may perform conventional measurements for the concerned cell using any subframe, while also (e.g., at the same time) performing measurements for the NCT cell (for example using certain (e.g., only certain) subframes, such as subframe no. 0 and/or subframe no. 5 or other subframes expected to carry CRS).

In various embodiments, the NCT-capable WTRU may determine that a cell is not suitable (or not detect the cell) based on measurement results if (e.g., only if) measurements taken according to conventional procedure and measurements taken for NCT cell or carrier are both deemed not suitable. In various embodiments, the NCT-capable WTRU may implicitly determine the type of carrier from the measurement results. The NCT-capable WTRU may report the implicitly determined type of carrier to the eNode-B 160. For example, if (or only if) measurements performed for an NCT cell or carrier are deemed suitable, then the NCT-capable WTRU may report that the cell detected is an NCT cell.

Measurement Configuration and Subframe Restrictions

A measurement configuration may be extended such that subframe restrictions may be applied to a measurement object that corresponds to a frequency that differs from the serving frequency (i.e. inter-frequency measurements). As an example, in various embodiments, the NCT-capable WTRU may be configured with a measurement object for inter-frequency measurement, wherein the measObject may include the parameter measSubframePatternConfigNeigh. The NCT-capable WTRU may then perform corresponding measurements of neighboring cells for the same RAT type as for the serving cell (e.g., LTE) on some or all applicable frequencies indicated in the concerned measObject, applying for neighboring cells each frequency the time domain measurement resource restriction in accordance with meas-SubframePatternConfigNeigh (if so configured in the concerned measObject). Alternatively, the subframe restriction may be configured per measurement identity.

Measurements Gaps

In various embodiments, the NCT-capable WTRU may be configured with a measurement gap. This measurement gap may be of length different than the conventional measurement gap, which is 6 ms. The length may be a fixed value, and may be, e.g. sufficiently large or different to allow a WTRU to determine whether a carrier is a conventional carrier or an NCT carrier. Alternatively, the length may be configurable. The measurement gap may be specific to a type of measurement (e.g. intra-frequency and/or inter-frequency), to a measurement object measObject and/or to a measurement identity measId of the WTRU measurement configuration of the NCT-capable WTRU. In various embodiments, it may be specific to a configured measurement that is associated to a report configuration reportConfig set to report whether or not a cell is an NCT cell.

In various embodiments, the NCT-capable WTRU may be configured with such gaps as well as with conventional gaps, concurrently. The gaps may have a period similar to a period of conventional measurement gaps. As an alternative, the gaps may be interspersed in time with conventional gaps. In various embodiments, the NCT-capable WTRU may use a specific gap type (or length) for a subset of measurements corresponding to the concerned gap type.

Layer 3 Filtering

In various embodiments, the NCT-capable WTRU may be configured with L3 filtering (e.g., filterCoeffcient) that is applicable per carrier type. For example, for a quantity configuration applicable to EUTRA (QuantityConfigEUTRA) additional filter coefficient entries (e.g., one for RSRP—filterCoefficientRSRP-NCT—and/or RSRQ—filterCoefficientRSRQ-NCT) may be provided for (and/or applied to) measurements for NCT carriers. Alternatively, a coefficient applicable to the existing RSRP and/or RSRQ coefficient may be introduced. Alternatively, this may be achieved by specifying alternative quantity configuration for the LTE NCT in the QuantityConfig information element.

In various embodiments, an NCT-capable WTRU operating in connected mode with a PCell that is an NCT cell, may apply timing subframe restrictions to measurements for RLM according to the transmission of CRS. For example, the NCT-capable WTRU may perform RLM measurements in subframes (e.g., only in subframes expected to carry CRS, for example subframes no. 0 and/or subframe no. 5).

In various embodiments, the NCT-capable WTRU operating in connected mode with a PCell that is an NCT cell, may use a hypothetical ePDCCH reception, for example including ePCFICH errors (if ePCFICH is applicable), for the RLM procedure for the serving cell. In various embodiments, the NCT-capable WTRU may re-initialize and restart RLM-related measurements upon reconfiguration of an ePDCCH applicable to the concerned NCT-capable WTRU.

In various embodiments, processes and/or procedures described herein may be applicable to any SCell of the WTRU configuration that is an NCT cell, if the concerned process and/or procedure are applicable to the concerned cell.

NCT Subframe

As described in detail below, processes and/or procedures provided herein are accordingly directed to (i) mixing NCT subframes with other subframe types in the same carrier, and/or (ii) operation and/or integration of the NCT subframes with other subframe types. In various embodiments, mixing NCT subframes with other subframe types in the same carrier may be applicable for any type of duplex modes, including TDD and FDD. For ease of exposition in the description that follows, such other subframe types may be referred to generically as "non-NCT subframes" (each a "non-NCT subframe") regardless of subframe type.

Among the various embodiments of the NCT subframe are a CRS-less subframe, a CRS-limited subframe; a limited port CRS subframe, a DM-RS subframe, a non-backward compatible subframe and a mixed NCT subframe. For ease of exposition in the description that follows, the NCT subframe and the various embodiments thereof may be referred to interchangeably.

CRS-Less Subframe

The CRS-less subframe may include multiple REs, none of which are reserved and/or occupied for CRS (unlike non-NCT subframes that have REs reserved for CRS). The CRS-less subframe does not include CRS irrespective of a number of antenna ports detected in a PBCH. The REs that would be otherwise reserved and/or occupied for CRS (as in the non-NCT subframes) may be used for other signals, including, for example, PDSCH, DM-RS, PRS, and CSI-RS (if available).

CRS-Limited Subframe

The CRS-limited subframe may include multiple REs, some of which are reserved and/or occupied for CRS, but limit CRS overhead (and in turn, the RE reservation and/or occupancy for CRS) to a given level; such level being set to (i) minimize RE reservation and/or occupancy for CRS (while, e.g., supporting wideband CRS transmission), and/or (i) cause the CRS overhead to be less than a CRS overhead associated with a normal subframe, for instance.

In various embodiments, the CRS-limited subframe may be formed so as to limit CRS overhead in a time domain. As an example, either the first slot or the second slot (but not both) of the CRS-limited subframe may include a set of OFDM symbols for CRS. In this case, the CRS overhead of the CRS-limited subframe may be limited at a level half of a CRS overhead associated with a normal subframe. In various embodiments, the set of OFDM symbols may be predefined as a number of OFDM symbols and location and/or as a slot number. In various embodiments, the set of OFDM symbols may be configured by higher layers or broadcasted via a MIB or a SIB-x.

In various embodiments, the CRS-limited subframe may be formed so as to limit CRS overhead in a frequency domain. In various embodiments, a subset of PRB-pairs of the CRS-limited subframe may include CRS. For example, even-numbered PRB-pairs of the CRS-limited subframe may include CRS and the odd-numbered PRB-pairs may not or do not. Alternatively, odd-numbered PRB-pairs of the CRS-limited subframe may include CRS and the even-numbered PRB-pairs may not or do not. In various embodiments, the subset of PRB-pairs may be predefined with a bitmap, even/odd PRB-pairs, RBGs, etc. In various embodiments, the subset of PRB-pairs may be configured by higher layers or broadcasted via a MIB or a SIB-x.

In various embodiments, the CRS-limited subframe may be formed so as to limit CRS overhead in an antenna port domain. In various embodiments, a subset of antenna ports for CRS (e.g., port 0-3) may be used. In various embodiments, a minimum set of antenna ports may be used in the CRS-limited subframe irrespective of the antenna port detected in a PBCH. For instance, a single antenna port (e.g., antenna port 0) may be used in the CRS-limited subframe notwithstanding detecting more than a single antenna port (e.g., detecting 4 antenna ports (0~3)) in a PBCH. In various embodiments, the single antenna port may be tied with a cell (e.g., antenna port 3 may be used as the single antenna port).

In this way, the differentiation of cells may be made using different antenna port numbers.

In various embodiments, a maximum antenna ports may be used in the CRS-limited subframe. The maximum antenna ports may be, for example, a predefined maximum number of antenna ports. As an example, the predefined maximum number of antenna ports may be defined as N, and if the number of antenna port detected in a PBCH is larger than N, then N antenna ports are used in the CRS-limited subframe. Otherwise, the number of antenna ports for CRS may follows the number of antenna ports detected in the PBCH.

In various embodiments, CRS-less and CRS-limited subframes may be distributed among the NCT subframes; a first subset of NCT subframes may be CRS-less subframes and a second subset of NCT subframes may be CRS-limited subframes. In this case, one or more of the following may apply: (i) a subframe configuration for selectively conveying CRS-less and CRS-limited subframes may be predefined according to the existence of PSS/SSS in the NCT subframe, and (ii) a subframe number may be tied with NCT subframe types. With respect to the former, in one or more embodiments, if an NCT subframe contains PSS/SSS, a CRS-limited subframe may be used; otherwise, a CRS-less subframe may be used. With respect to the latter, the subframe nos. 0 and 5 may use CRS-limited subframes and subframe nos. 1, 2, 3, 4, 6, 7, 8, and 9 may use CRS-less subframes, if defined as NCT subframes, for example. The subframe numbers for the CRS-limited subframe is not limited to the example mentioned above. In various embodiments, any subsets of subframe numbers may be respectively used for CRS-limited and CRS-less subframes as long as the subsets do not have overlapping elements.

Mixed NCT Subframe

In various embodiments, the NCT subframe may be a mixed NCT subframe. The mixed NCT subframe may include a plurality of parts; at least some of which may include elements of a non-NCT subframe. For example, the mixed NCT subframe may include GP and UpPTS parts (like a special subframe), but not a DwPTS part (unlike a special subframe). The mixed NCT subframe may also include parts be configured as any of a CRS-less subframe, CRS-limited subframe, and any other NCT subframe.

In various embodiments, the mixed NCT subframe may replace a special subframe in TDD (to increase downlink throughput, for example).

In various embodiments, the mixed NCT subframe may include a set of OFDM symbols defined in accordance with non-NCT subframes and a set of OFDM symbols defined in accordance with an NCT subframe. As an example, one set of 7 OFDM symbols may be defined in accordance with a non-NCT subframe and the other set of 7 OFDM symbols may be defined in accordance with an NCT subframe. In various embodiments, the one (e.g., the first) set of 7 OFDM symbols include CRS in accordance with a non-NCT subframe and the other (e.g., second) set of 7 OFDM symbols do not include CRS.

In various embodiments, a slot-level configuration for the parts in accordance with a non-NCT subframe and the parts in accordance with the NCT subframe may be used.

In various embodiments, a subset of PRB-pairs may be in accordance with a non-NCT subframe and the other PRB-pairs may be in accordance with an NCT subframe.

Mixed Subframe Configuration

Mixed Subframe Configurations for FDD

In various embodiments, an NCT subframe configuration for FDD may have one or more following properties.

1. A subframe lacking PSS/SSS and/or a PBCH may be considered for NCT subframe configuration. In certain embodiments, subframe 0 and 5 might not be configured for NCT subframes.

2. A subframe lacking paging channels may be considered for NCT subframe configuration.

3. A subset of the HARQ-processes may be configured as NCT subframes. Given 8 H-ARQ processes may be used, the 8 H-ARQ processes may correspond to subframes having 8 ms duty cycle for retransmission and new transmission. If, for instance, the eight (8) HARQ process is used, a subset of the HARQ processes thereof may be carried by NCT subframes. As an example, if the first and second HARQ processes are used for NCT subframes, then the first and second subframes in every eight (8) downlink subframes may be configured as NCT subframes.

In various embodiments, the NCT subframe may be configured by higher layer and/or broadcasting channel(s). One or more of the following may apply: (i) the NCT subframe may be configured with a duty cycle, x, and a bitmap may be used (for full flexibility, for example), and (ii) the NCT subframe may be configured with an on/off indication. In various embodiments, the duty cycle x may be, for example, one of 8, 10, 20, 40, and 100 ms. In various embodiments, the NCT subframe configuration may be predefined, and whether the NCT subframe is used within a carrier is configured and/or broadcasted with an on/off indicator. This on/off indicator may be, e.g., one or more bits.

Subframe Configurations for TDD

In various embodiments, an NCT subframe configuration for TDD may have one or more following: (i) an uplink subframe in a cell-specific UL/DL subframe configuration, (ii) a special subframe, and (iii) a DL subframe. In various embodiments, a specific special subframe configuration with DwPTS and UpFTS, may be (e.g., only) allowed for NCT subframe configuration, for example. In various embodiments, a subset of DL subframes may be restricted to non-NCT subframes if it contains PSS/SSS and/or a PBCH, for example.

In various embodiments, the NCT subframe may be configured by higher layer or broadcasting channel(s). One or more of the following may apply: (i) among the uplink subframes, a subset may be configured for downlink NCT subframe via higher layer signaling or broadcasting channel(s); and (ii) among the uplink subframes and special subframes, a subset may be configured for downlink NCT subframe via higher layer signaling or broadcasting channel(s).

Reception of Control and Data Channels

Control Channels

Both PDCCH and ePDCCH may be used according the subframe and/or search spaces. The PDCCH and ePDCCH reception behavior may be defined according to non-NCT subframe and/or NCT subframe configurations. One or more of the following may apply.

1. A PDCCH may be used for both WTRU-specific search space and common search space in a non-NCT subframe, and ePDCCH may be used for WTRU-specific search space in an NCT subframe. Since the common search space might not be supported in an NCT subframe with EPDCCH, broadcasting, paging, and PRACH may be supported in a non-NCT subframe only. And, a WTRU may receive a DL/UL grant in the NCT subframe;

2. A PDCCH may be used for both WTRU-specific and common search spaces in a non-NCT subframe, and an ePDCCH may be used for both WTRU-specific and common search spaces in an NCT subframe.

3. In a non-NCT subframe, either a PDCCH or an ePDCCH may be used for WTRU-specific search space according to a configuration, and the PDCCH may be used for a common search space. The ePDCCH may be used for an NCT subframe for WTRU-specific search space. And, a WTRU may (e.g., only) receive DL/UL grant in the NCT subframe.

4. In a non-NCT subframe, either a PDCCH or an ePDCCH may be used for WTRU-specific and/or common search spaces according to the configuration. The ePDCCH may (e.g., only) be used for the NCT subframe for WTRU-specific and/or common search space.

In various embodiments, an ePDCCH configuration may be different according to subframe type. One or more of the following may apply.

1. If a WTRU is configured to monitor an ePDCCH in non-NCT subframes, the ePDCCH parameters for a WTRU-specific search space may be independently configured for the non-NCT subframes and/or NCT subframes. In this regard, the number of ePDCCH resource sets, the number of PRBs per ePDCCH set, and/or localized and distributed transmissions may be independently configured for the non-NCT subframes and NCT subframes.

2. If two different ePDCCH configurations are used for a non-NCT subframe and an NCT subframe, an ePDCCH starting symbol indicator may be configured independently. Alternatively, the starting symbol for the NCT subframe may be fixed to zero (0) or other symbol number.

3. The same ePDCCH configurations may be used irrespective of the subframe type.

Data Channels

In various embodiments, a transmission scheme may be adapted according to the subframe types. In this regard, at least one of the following may be used: (i) in a non-NCT subframe, a WTRU may receive a PDSCH with a configured transmission scheme according to a Downlink Control Information (DCI) format; (ii) in an NCT subframe, a WTRU may receive a PDSCH with a predefined transmission scheme which may be fixed regardless of a (e.g., configured) transmission mode; (iii) in a non-NCT subframe, a WTRU may receive a PDSCH with a configured transmission scheme according to a DCI format; and (iv) transmission schemes for a PDSCH that may be tied with corresponding control channel type (as the control channel type may be correlated with a demodulation type).

In various embodiments in which a WTRU may receive, in an NCT subframe, a PDSCH with a predefined transmission scheme that may be fixed regardless of a transmission mode, if the NCT subframe is CRS-less subframe, for example, the transmission scheme may be based on DM-RS, such as, antenna ports 7~14 or an equivalent to LTE Transmission Modes (TMs) 9/10. Alternatively and/or additionally, if the NCT subframe is CRS-limited subframe, the transmission scheme may be based on DM-RS, such as, antenna ports 7~14 or an equivalent to LTE Transmission Modes 9/10.

In various embodiments in which a WTRU may receive, in a non-NCT subframe, a PDSCH with a configured transmission scheme according to a DCI format, the non-NCT subframe may be a CRS-limited subframe. In which case, the transmission scheme may be based on the transmission scheme used for a non-NCT subframe, but the number of antenna ports may be reduced, accordingly. For instance, if a 4 Tx transmission mode (TM) 3 ("TM3") is used in a non-NCT subframe, then a 2Tx TM3 may be used in an NCT subframe (assuming that 2 CRS ports may be used as a maximum in an NCT subframe and 4 CRS ports are detected in a PBCH).

In various embodiments in which transmission schemes for a PDSCH that may be tied with corresponding control channel type, if a WTRU receives PDSCH in a subframe and a corresponding DCI is transmitted via a PDCCH, then the WTRU may receive a PDSCH with a specific transmission scheme that is tied with the PDCCH, for example. Alternatively, if a WTRU receives a PDSCH in a subframe and a corresponding DCI is transmitted via an ePDCCH, then the WTRU may receive a PDSCH with a specific transmission scheme that is tied with ePDCCH. As an example, given that a TxD may be configured/tied with a PDCCH and the antenna port 7 may be configured/tied with an ePDCCH, a WTRU may receive a PDSCH respectively with either the TxD or the antenna port 7 according to the reception of the PDCCH and the ePDCCH.

System Information Acquisition and Cell Detection

Processes and procedures provided herein below are directed to determining the type of carrier for a LTE cell and/or to acquire system information for the corresponding cell. In various embodiments, once or otherwise after a WTRU 102 has determined the type of the carrier for a given cell, the WTRU 203 may perform a different set of procedures as a function of the detected type of carrier.

Type of Carrier as a Function of Physical Cell Identity (PCI) Value and Allocated Range In various embodiments, a WTRU 102 may be configured with at least one of the following: (i) one or more physical cell identity (PCI) values that may correspond to a specific type of carrier; (ii) one or more ranges of PCI values that may correspond to a specific type of carrier; and (iii) one or more cell-identity groups (e.g., having 168 alternatives) that may correspond to a specific type of carrier.

In various embodiments in which the WTRU 102 may be configured with PCI values that may correspond to a specific type of carrier, the WTRU 102 may receive signaling that indicates a specific PCI value corresponding to a cell on a given frequency is a specific type of cell, e.g. an NCT cell. In various embodiments, the WTRU may receive such indication in a RRC Connection reconfiguration message with mobilityControlInformation (e.g., HO command).

In various embodiments in which the WTRU 102 may be configured with ranges of PCI values that may correspond to a specific type of carrier, the WTRU 102 may receive signaling that indicates that the range of PCI values may correspond to a specific type of carrier, e.g. the corresponding cell(s) may be NCT cells. In various embodiments, the WTRU 102 may receive such indication, for example, for purposes of facilitating mobility-related measurements, idle mode measurements, and/or selection and/or re-selection procedures.

In various embodiments in which the WTRU 102 may be configured with one or more cell-identity groups that may correspond to a specific type of carrier, the WTRU 102 may receive such indication, for example, for purposes of facilitating mobility-related measurements, idle mode measurements, and/or selection and/or re-selection procedures.

The WTRU 102 may receive such configuration and/or indications according to at least one of the following: (i) broadcasted RRC signaling (e.g., reception of system information such as in the list of neighbor cells); and (ii)_ dedicated RRC signaling. The dedicated RRC signaling may include, (i) reception of RRC Connection Reconfiguration (e.g. for measurement configuration, e.g., in a list of neighbor cells for a given carrier frequency); (ii) reception of RRC Connection Reconfiguration with mobility control information (e.g., for handover command); or (iii) reception of RRC Connection Release with Redirection (for redirection to another cell), e.g., as part of the cellInfoList or reception of the idle mode Mobility Control Information (for prioritization for the cell (re-) selection procedure) (e.g., as part of a FreqPriorityEUTRA 1E.

Alternatively, the PCI value(s) and/or PCI range(s) may be specified for a WTRU of a given 3GPP release, or in general to be configured to a WTRU without the use of RRC signaling (e.g., programmed at the time of manufacturing or subsequently configured via an OMA-DM managed object). Separate broadcast and/or dedicated RRC signaling may be sent to signal whether such configuration is valid for the current network.

For the purpose of redirection, cell selection, cell (re-) selection and/or handover control, conventional cells and NCT cells may be considered as inter-RAT carriers in the concerned procedures.

If not yet known, the WTRU 102 may subsequently determine a cell identity within a cell-identity group by acquiring a primary synchronization signal (PSS), and may determine the cell-identity group from acquisition of a secondary synchronization signal (SSS) which position is known once or otherwise after the PSS is detected, as the SSS has a fixed offset relative to the PSS. When the WTRU 102 determines the PCI of a cell on a given carrier, it may determine the type of the cell by comparing the configured PCIs, PCI ranges and/or PCI group with the PCI of the cell. Once, or otherwise after the WTRU 102 has determined the type of the carrier for a given cell, the WTRU 102 may perform a different set of procedures as a function of the detected type of carrier.

In various embodiments in which the serving cell may be a conventional cell, for the NCT-capable WTRUs, the PCI within the range or the values for NCT cells invalidates an identical blacklisted PCI signaled in SIB4 and SIB5, for example. This may facilitate the non-NCT-capable WTRUs from measuring and/or detecting the NCT cells by black listing the NCT cells, without affecting the NCT-capable WTRUs.

In various embodiments, the PCI range or the values for NCT cells, may be valid within the TA of the serving cell, within a list of TAs, or within the entire PLMN, such that the PCI detection criteria for the corresponding NCT cell is still valid after WTRU 102 moves to a conventional cell (which, in turn, may be unable to signal the reserved PCI range for the NCT cells). A validity timer may be applied to the association of the NCT PCI range and TA/TAI list/PLMN, such that the association/PCI range is no longer valid upon timer expiry. This may facilitate the operator to reconfigure the association and PCI range. The validity time/area can be signaled by either broadcast or dedicated signaling, such as RRC messages and/or the configuration of an OMA-DM managed object.

PSS/SSS Acquisition

In various embodiments, the WTRU 102 may determine the type of carrier based on a timing offset between the PSS and the SSS. For example, the WTRU 102 may acquire PSS and attempt acquisition of the SSS using timing offset specific to carrier types that are not conventional carriers (e.g., NCT) carriers. Such offset may be known (e.g. specified and/or hard-coded) by the WTRU 102 or, alternatively, signaled to the WTRU 102 as part of mobility procedures and/or idle mode control procedures.

In various embodiments, the WTRU 102 may attempt acquisition of PSS and SSS according to timing associated with a conventional carrier, and if unsuccessful, blindly perform one or more additional attempts using a different timing offset. This different timing offset may, e.g., correspond to an NCT carrier. If successful, the WTRU 102 may determine that the cell is an NCT cell, and consequently it may perform a different set of procedures as a function of the detected type of carrier.

Type of Carrier as a Function of CRS Density Detection

In various embodiments, the WTRU 102 may determine the type of a carrier based on detection of the CRS density. The WTRU 102, for example, may determine whether CRS reception corresponds to CRS detected in any subframe (such as for conventional carriers or only in a known or determined subset of subframes, e.g., in subframes nos. 0 and 5, associated with NCT carriers.

In various embodiments, the type may be determined as a function of difference between received signal strength exceeding a given threshold. In various embodiments, detection may be validated based on the related measurements exceeding one or more specific thresholds, e.g., in terms of received signal strength, RSRP, RSRP and/or RSSI.

Assuming NCT cells may carry CRS in different subsets of the subframes, the WTRU 102 may determine such subframes by measurement and/or detection and/or known rules or relationships among the subframes in which it may be transmitted. For example, if the CRS are transmitted in subframes n and n=5, e.g., subframes 0 and 5 or 1 and 6 or 2 and 7, etc in a given NCT cell, then the WTRU 102 may attempt to measure and/or detect CRS in every DL subframe (e.g., to first determine if it is a backwards compatible cell). Further, if not found in every DL subframe, the WTRU 102 may determine if CRS is in any pair of subframes n and n+5. Based on finding such a pair, the WTRU 102 may determine or conclude that the cell is an NCT cell.

Type of Carrier as a Function of Blind Detection of BCH for MIB Reception

For conventional LTE carriers, reception of a BCH (BCH reception) is characterized by antenna ports {0}, {0,1} or {0,1,2,3}, QPSK, center 72 REs, first four symbols of second slot in subframe #0 on a PBCH. A transport block (TB) of the BCH is mapped to four subframes at 40 ms interval and is self decodable. The BCH has a fixed predefined transport format.

For NCT carriers, antenna port {0} (e.g., only antenna port {0}) may be used. However, this in itself might not be sufficient to allow the WTRU to determine whether the carrier is a conventional carrier or an NCT carrier.

In various embodiments, the WTRU 102 may perform blind detection for BCH reception to determine the type of carrier for the cell. For example, the WTRU may attempt reception of MIB on BCH according to at least one of the following: (i) decoding the BCH using a transport format that differs from an MIB reception on a BCH for a conventional carrier; (ii) decoding the BCH using a scrambling sequence and/or a scrambling sequence initialization that differs from an MIB reception on a BCH for a conventional carrier; (iii) decoding the BCH using a layer mapping and/or a precoding function that differs from an MIB reception on a BCH for a conventional carrier; (iv) decoding the BCH using a mapping of the resource elements of the carrier that differs from an MIB reception on a BCH for a conventional carrier; and (v) decoding the BCH using a timing that differs from an MIB reception on a BCH for a conventional carrier. In various embodiments in which the WTRU decode the BCH using a timing that differs from an MIB reception on a BCH for a conventional carrier, symbols (i.e., a timing) to which the BCH is mapped may be, e.g., in the first slot and/or in subframe no. 5 (a subframe with CRS).

Once reception of an MIB on the BCH according to any (or a combination of the above) is successful, the WTRU 102 may determine that the carrier is an NCT carrier. In all examples above, the parameters that are critical, necessary or otherwise needed for successful MIB reception on the BCH, if any, and that differ(s) from like parameters of a conventional carrier may be specified such that it is known to the WTRU 102. Consequently, for a carrier where the transmission/reception of an MIB on the BCH is according to the above: (i) a WTRU 102 performing MIB acquisition according to conventional procedures may fail to acquire the MIB, and may consider the cell as barred, and, for example, re-select to a different cell (e.g., intra-frequency); and (ii) an NCT-capable WTRU may attempt to acquire the MIB according to the procedure for conventional carriers, fail to successfully decode the MIB on BCH using such procedure, and then perform MIB acquisition according to a procedure corresponding to an NCT carrier.

Type of Carrier as a Function of the MasterInformationBlock Format and/or Content For conventional LTE carriers, a MasterInformationBlock (MIB) provides system bandwidth (4 bits), PHICH configuration (3 bits), SFN (7 bits) and ten spare bits. It includes 16 bits of CRC, which is used to validate decoding of the MIB.

Based on, for example, an assumption that backward compatibility for conventional WTRU operation may not be implemented or required (and/or may or may not be possible) for NCT carriers, the MIB format and/or its content may differ from that of the conventional MIB. The NCT-capable WTRU may receive and decode a MIB on an NCT carrier where the MIB includes parameters necessary to determine the location in terms of PRBs of a downlink control channel, e.g. an ePDCCH (or a subset of the total PRBs used for ePDCCH in the cell). If applicable, the MIB may also include parameters for determining the location of the ePHICH, in particular if there is a dependency between ePDCCH reception and the location of the ePHICH.

The NCT-capable WTRU may receive the MIB on the BCH according to at least one of the following: (i) decoding the received MIB according to conventional methods, but determine that while the CRC verification succeeds, the content of the MIB is incorrect and consequently, attempt decoding of the MIB using an alternative format; and (ii) the decoding the MIB such that the PHICH-config 1E and/or at least some of the 10 spare bits according to the conventional format have an alternate meaning, such as, for example, an ePDCCH configuration and/or an ePHICH configuration.

An impact to non-NCT-capable WTRUs of receiving an alternate format for the MIB may depend on the modification to the content of the MIB. For example, the non-NCT-capable WTRU may either detect the "incorrect" format or may simply get incorrect values and, for example, continue with an attempt to acquire SIB. In either case, the non-NCT-capable WTRU may fail to acquire SIB1 and other SIBs as critical system information. The non-NCT-capable WTRU may consider the cell as barred, and, for example re-select to a different cell (e.g., intra-frequency).

In various embodiments, an NCT-capable WTRU may detect whether the MIB is a conventional MIB or a MIB corresponding to an NCT carrier. This may be based on, e.g., detecting that one or more of the spare bits (according to the conventional format) are non-zero, or using an alternate CRC calculation that upon success may indicate that the MIB is for an NCT carrier. The MIB for an NCT carrier may have a different number of bits than that of a conventional carrier.

Type of Carrier as a Function of Timing of System Information Block 1 Reception

For conventional LTE carriers, SIBs are transmitted as System Information Messages; a WTRU 102 may receive SIB in subframe no. 5, with an 80 ms periodicity and SIB may not be multiplexed with other system information. A PDCCH may be used to determine the number of RBs to be used to receive SIB1, which number of RBs may vary based on scheduling information.

In various embodiments, an NCT-capable WTRU may detect whether the carrier is a conventional carrier or an NCT carrier as a function of timing of the reception of SIB1. Such NCT-capable WTRU may attempt decoding of SIB1 in a subframe other than in subframe no. 5 (and, for example, known a priori, e.g., at a fixed subframe).

Once or otherwise after the NCT-capable WTRU has acquired MIB, the NCT-capable WTRU may determine the type of carrier by attempting blind decoding of SIB1 in a different subframe than a subframe in which it would expect SIB1 for conventional carrier. In various embodiments, the NCT-capable WTRU may be configured to decode scheduling information using ePDCCH for SIB1 reception. The NCT-capable WTRU may determine the type of carrier as soon as it successfully decodes SIB1 either in subframe no. 5 (accordingly setting the type to a conventional carrier or in another subframe (implying an NCT carrier). In various embodiments, the NCT-capable WTRU may determine (e.g., may only determine) that it is missing critical system information after failing to acquire SIB1 following attempts using both methods and/or after a certain delay while performing such attempts. In such failure case, the NCT-capable WTRU may consider the cell as barred, and, for example, re-select to a different cell (e.g., intra-frequency).

Type of Carrier as a Function of Blind Decoding of PDCCH and/or ePDCCH

In various embodiments, if a WTRU 102 has not determined the type of carrier after acquiring PSS, SSS, decoding BCH and receiving MIB, and if the WTRU 102 has knowledge of the possible location or more generally how to decode ePDCCH for an NCT carrier, then the WTRU 102 may determine the type of carrier when it acquires DL control signaling channel for the cell.

In various embodiments, an NCT-capable WTRU may detect whether the carrier is a conventional carrier or an NCT carrier by blind attempts at decoding ePDCCH. Blind decoding of ePDCCH may be performed while also attempting to acquire PDCCH according to conventional methods. In various embodiments, the NCT-capable WTRU may make decoding attempts in parallel, in the same subframe or in sequence in different subframes. If the NCT-capable WTRU successfully acquires ePDCCH (for example, from the reception of SIB1 and/or the reception of control signaling), then it may determine that the carrier is an NCT carrier. The NCT-capable WTRU may also stop blind decoding attempts for PDCCH at this point. Alternatively, if the NCT-capable WTRU successfully acquires PDCCH (for example, from the reception of SIB1 or of control signaling there for), then it may determine that the type of carrier is a conventional carrier. The NCT-capable WTRU may also stop blind decoding attempts for ePDCCH at this point. The period during which the NCT-capable WTRU attempts to acquire the control channel may be bounded, such that the NCT-capable WTRU determines that it has failed to acquire the cell if none of the blind decoding attempts have succeeded before the end of the period. In this failure case, the NCT-capable WTRU may consider the cell as barred, and, for example, re-select to a different cell (e.g., intra-frequency).

A non-NCT-capable WTRU that acquires an NCT cell on a carrier (e.g., with ePDCCH as control channel) may fail to decode PDCCH, and may fail to acquire SIB1 and other SIBs as critical system information. The non-NCT-capable WTRU may consider the cell as barred, and re-select to a different cell (e.g., intra-frequency).

In various embodiments, an NCT-capable WTRU may fail to decode PDCCH and/or may succeed decoding ePDCCH. In turn, the NCT-capable WTRU may then successfully decode SIB1 and other SIBs—using similar scheduling methods as for the conventional PDCCH, but on the ePDCCH. Once or otherwise after the WTRU determines that ePDCCH is present, and can be decoded, and that the cell is an NCT cell, the non-NCT-capable WTRU may stop attempting to decode for PDCCH. If the non-NCT-capable WTRU fails to acquire both the PDCCH and the ePDCCH, then the non-NCT-capable WTRU may apply the conventional error handling (and may consider the cell as barred, and may re-select to a different cell (e.g., intra-frequency).

Type of Carrier as a Function of PCFICH Detection

As part of cell search procedure, once or otherwise after a WTRU acquires essential system information on the BCH, then it may configure the receiver to read the remaining part of system information, namely SIBs (e.g., beginning with SIB1), transmitted on the DL shared channel (DL-SCH). At this point, a non-NCT-capable WTRU needs to detect PCFICH in order to determine the size of the control channel to be able to proceed to PDCCH detection to acquire the SIBs. In case of NCT, the conventional control region may not exist and PCFICH may not be needed. In addition, the CRS transmitted for an NCT cell, e.g., in subframe nos. 0 and 5 may not be intended for use in demodulation.

In various embodiments, if the WTRU fails to detect PCFICH, it may assume that the carrier is an NCT carrier, and may proceed to ePDCCH detection rather than PDCCH blind detection. The PCFICH is inherently a very reliable physical channel; and therefore, the failure to detect PCFICH by the WTRU may automatically result in the failure of WTRU in detection of other conventional control channels (e.g., PHICH and PDCCH) that, in principle, are less reliable than PCFICH. One of the advantages of the above mentioned technique is that the number of blind decoding required for concurrent detection of PDCCH and ePDCCH may be considerably reduced since in a given subframe the WTRU may search for system-information grants in one common (e.g., only one common) search space which is the one that contains ePDCCH.

MBMS Operation on New Carrier Type Cell

In various embodiments, processes and procedures are implemented for support of MBMS operations on an NCT cell. The NCT cell may operate as part of a MBSFN area that may include conventional cells, or may consist of, or may include, NCT cells (e.g., only NCT cells). From the perspective of the MBMS supporting WTRU, the NCT cell may be a PCell or a SCell, or, for example, a standalone cell for MBMS services. In certain instances, the number of possible MBSFN subframes may be changed, for example, from 6 to 8 for NCT(s) supporting MBMS.

Additional MBSFN Subframes

In various embodiments, a representative method may include a WTRU that may determine its allocated paging frame and occasion as a function of a MBSFN subframe configuration of the NCT cell and extension of the MBSFN subframes to include subframes nos. 0, 4, 5, and/or 9.

For example, the WTRU may determine, with the extension of the MBSFN subframe configuration to include subframes 4 and 9, that its allocated paging occasion (subframe) may be subframe no. 0 or 5, depending on the output of a calculation based on the WTRU ID, as defined in 3GPP TS 36.304: "Evolved Universal Terrestrial Radio Access (E-UTRA); User Equipment (UE) procedures in idle mode," the contents of which are incorporated herein by reference.

The WTRU may receive the extended MBSFN subframe configuration as part of an RRC SIB2 message from the NCT cell, for example, as a bitmap of additional subframes for either or both of one frame or four frame MBSFN subframe patterns. Each bit may represent subframes nos. 0, 4, 5, 9, respectively, in the extended bitmap. Although MBSFN subframe patterns of different sizes are disclosed (e.g., 1 and 4 frame sizes), other sizes are possible.

MCCH Change Notification

In various embodiments, a representative method may include a WTRU that may receive notification for an upcoming MCCH change in the PDCCH or the ePDCCH in a non-MBSFN subframe. The WTRU may receive DCI format 1C scrambled with an M-RNTI in the non-MBSFN subframe. For example, a WTRU that may be receiving MBMS services on a SCell may receive the change notification on the PDCCH/ePDCCH of the PCell in a non-MBSFN subframe.

The WTRU may be scheduled to receive the MCCH change notification in a non-MBSFN subframe based on the MBMS-NotficationConfig-r9 in the SIB13 in the RRC, which may indicate the subframe index of a non-MBSFN subframe.

The WTRU may derive the possible MCCH change notification schedule by monitoring the PDCCH/ePDCCH for the closest non-MBSFN subframe before or after the MBSFN subframe for which a MCCH change notification may be scheduled to occur, according to conventional SIB13 configurations.

Extension of MBSFN Subframe Region

For an NCT cell or NCT cells that may not support transmission of the PDCCH, the PCFICH and/or the PHICH, the first two symbols of the conventional MBSFN subframe, in the non-MBSFN region may be unused.

Extended MBSFN Subframe in Extended CP

In various embodiments, a representative method may include a MBSFN subframe that may be extended to include the entire subframe for possible PMCH transmission. The MBMS WTRU may receive PMCH with an extended CP in the entire MBSFN subframe. The WTRU may receive the MBSFN RS for demodulation of the PMCH that may also be extended into the first two symbols of the MBSFN subframe.

The MBMS supporting WTRUs may monitor the ePDCCH with the extended CP for the entire subframe, along with receiving the PMCH in the extended MBSFN subframe. In various embodiments, non-MBMS WTRUs, for example, WTRUs supporting transmission mode 9 or 10, and/or an NCT specific transmission mode, may receive PDSCH transmissions in the extended MBSFN subframe. In various embodiments, for unicast PDSCH transmission, the WTRU may receive data with a normal CP. The non-MBMS WTRU may determine whether the upcoming MBSFN subframes may be used for unicast PDSCH, instead of for PMCH transmission with one or more of the following operations:

1. Non-MBMS WTRUs may read MCH scheduling: the WTRUs not receiving the PMCH may read MCH transmission schedules, including CSA, MSP in the MCCH, and may also read the MSI in the MAC CE of the MCH in first scheduled (e.g., each first scheduled) subframe of each MTCH. The WTRU may be then fully aware of the MBSFN subframes that are scheduled for the PMCH and those that are not and may be scheduled for the PDSCH transmission. For the MBSFN subframes used for the PDSCH transmission, the non-MBMS WTRU may monitor the ePDCCH with the normal CP.

2. Use of DCI format 1C with M-RNTI: the WTRU may be indicated with the upcoming MBSFN subframe schedule for transmission of the PMCH and/or the PDSCH by use of DCI format 1C scrambled with an M-RNTI on the ePDCCH in a non-MBSFN subframe. The WTRU may receive a bitmap (for example, re-using the 8-bit bitmap currently defined in DCI format 1C or extending the bitmap), which indicates the upcoming MBSFN subframes use for the PMCH transmission and/or the PDSCH transmission. For example, the WTRU may receive the M-RNTI scrambled DCI format 1C in subframe #0 at the beginning of the MBSFN subframe pattern, as indicated in the SIB2, (e.g., as a one-frame pattern or a four-frame pattern). The WTRU may then read each bit as a MBSFN subframe, and may interpret/determine a first logic level (e.g., a "0") as a MBSFN subframe for the PMCH transmission, and may interpret/determine a second logic level (e.g., a "1") as the PDSCH transmission, or vice versa.

3. The WTRU may then monitor for an ePDCCH with the normal CP, if the upcoming MBSFN subframe is scheduled (and/or used) for the PDSCH transmission, or with the extended CP, if the upcoming MBSFN subframe is scheduled (and/or used) for the PMCH transmission.

In various embodiments, non-MBMS WTRUs with MBMS supporting NCT as an SCell may be indicated with DL grants for the PDSCH in the MBSFN subframe, following LTE Rel-11 procedures, with cross carrier scheduling by the PDCCH/ePDCCH of the PCell or another SCell.

A WTRU may support or be configured for subframe specific cross carrier scheduling. For example, a WTRU may monitor the control channel (e.g., PDCCH or ePDCCH) of a serving cell (CC) in certain subframes to receive, for example grants and/or power control information for that serving cell and be cross carrier scheduled (e.g., monitor one serving cell to receive scheduling and/or power control information for another serving cell) in certain other subframes. For example, WTRUs that are configured for aggregation of carriers may receive grants and/or power control information in MBSFN subframes from other serving cells (e.g., a PCell and/or other configured SCells) via cross carrier scheduling. A WTRU configured with a serving cell for eMBMS (e.g., using MBSFN subframes) may monitor for grants and/or power control information for this serving cell, on another serving cell in MBSFN subframes (e.g., only in MBSFN subframes). In non-MBSFN subframes, the WTRU may monitor the control channel on this serving cell (e.g., for self scheduling). For example, a WTRU may be cross-carrier scheduled during SCell MBSFN subframes (e.g., via a PCell PDCCH/ePDCCH by default and/or via another SCell, as configured for carrier indication field (CIF)). For example, if the MBSFN subframe occurs in the PCell, the WTRU may be provided grants and power control information for the PCell on another SCell, as configured by high layers (e.g., via the RRC).

One Symbol Non-MBSFN Region

In various embodiments, a representative method may include a MBSFN subframe that may include a non-MBSFN region limited to one normal CP symbol and an extended MBSFN region for the PMCH transmission. The WTRU may be indicated with a one symbol non-MBSFN region configuration of MBSFN subframes, as pre-defined, and/or the WTRU may be indicated by higher layer, for example as part of the MBSFN subframe configuration in the SIB2.

The WTRU may receive one of the following information in the non-MBSFN region:

1. Indication of MBSFN region usage: the WTRU may receive a binary indication in the non-MBSFN region indicating whether the upcoming MBSFN region may be used for the PMCH transmission with the extended CP or for the PDSCH transmission with the normal CP. Based on the indication, the WTRU may monitor the ePDCCH with either the extended CP or the normal CP.

2. MCCH change notification: the WTRU may receive, for example, an 8-bit bitmap indicating upcoming changes to the MCCH in the one symbol non-MBSFN region. The WTRU may receive the indication according to a notification schedule that may be specified by a higher layer (e.g., in the SIB13), or the information may be sent in every MBSFN subframe by the cell.

The above information may be encoded and transmitted separately or together in the non-MBSFN region. The information may be scrambled with a MBSFN area specific scrambling code and/or a physical cell ID specific scrambling code, among others.

Extended MBSFN Subframe in Normal CP

In various embodiments, a representative method may include the MBSFN subframe that may be extended for the entire subframe, and a WTRU that receives the PMCH may do so (e.g., receive the PMCH) in the normal CP mode. For example, the MBSFN area may consist of or may include small NCT cells, which may constitute a small aggregated physical area. The delay spread of the MBSFN area may be small enough to be supported by transmission of data with the normal CP. In a normal CP MBSFN subframe, the WTRU may use a different set of MBSFN (demodulation) RS patterns for purpose of receiving and decoding the associated PMCH.

In the normal CP, MBSFN subframes, both non-MBMS and MBMS supporting WTRUs, may monitor the ePDCCH, for example for UL grants, power control information in WTRU specific search space, and/or particular RNTIs (e.g., a M-RNTI, and/or a P-RNTI, among others) in the common search space. In various embodiments, a non-MBMS WTRU may receive a DL grant and a PDSCH transmission in the MBSFN subframe, with or without the transmission of the PMCH in that MBSFN subframe.

MBMS Reception on NCT Cell by Non-NCT WTRUS

To maximize reception of MBMS service to WTRUs (e.g., all WTRUs), a WTRU may be able to receive MBMS data and associated MBMS related information in RRC_IDLE and/or RRC_Connected mode from (e.g., directly from) the NCT cell. In various embodiments, MBMS supporting WTRUs may receive MBMS related configuration information directly from the NCT cell. In this case, a MBMS supporting WTRU may be either an NCT-capable WTRU or a non-NCT capable WTRU and the NCT cell may be configured as a PCell for an NCT-capable WTRU (e.g. a standalone NCT) or may be configured only as a SCell (e.g. a non-standalone NCT).

A WTRU may receive MBMS related information from the NCT cell through broadcast information with one or more of the following representative procedures:

1. The WTRU may receive SIB1 for Scheduling a List of other MBMS related information. For example, the scheduling may include SIB2, SIB13 and/or SIB15. The scheduling of SIB2, SIB13 and/or SIB15 may or may not be limited to reception in subframes nos. 0 and/or 5 for any given frame. The PDCCH may also be received in subframe nos. 0 and/or 5. The PDCCH with SI-RNTI may be received in those subframes.

2. The WTRU may receive SIB2 for MBSFN subframe configuration. The contents of SIB2 may be limited to MBMS related information such that WTRUs may not attempt to access the NCT cell directly, e.g. the NCT cell may be non-standalone NCT cell. The WTRU may receive SIB13 and/or SIB15 for MBMS reception and service continuity.

3. The WTRU may or may not receive any other SIBs other than those related to MBMS reception. The WTRU may then be indicated that this NCT cell may not be used for normal cell access.

The WTRU may receive the MBMS related SIBs from the NCT cell in RRC_IDLE mode or RRC_connected mode. In connected mode, the WTRU may read the NCT cell MBMS related SIBs as part of neighbor cell measurements, for example, as part of the SIB1 reception which may be part of the measurement configuration as received from the cell to which the WTRU is currently connected. For example, the WTRU may read the other MBMS related SIBs if in the SIB1 the scheduling list includes only MBMS related SIBs.

The connected mode WTRU may receive MBMS related information and configuration from the currently connected cell by RRC dedicated signaling. For example, a WTRU capable of carrier aggregation may receive MBMS related information via a RRC Reconfiguration message when adding the NCT cell as a SCell or reconfiguration of the NCT cell as a SCell.

Backward Compatible MBSFN Subframe

The MBSFN subframe of the NCT may follow a LTE Rel-11 configuration, by maintaining the two symbol non-MBSFN region and the remaining MBSFN region. A WTRU may not receive any control information by way of the PDCCH, the PHICH, and/or the PCFICH in the non-MBSFN region, as the non-MBSFN region may be left "blank" by the NCT cell. For example, the WTRU may receive the PCFICH/PDCCH/PHICH in the non-MBSFN region, that may be transmitted (e.g., only transmitted) by the NCT (e.g., NCT cell) during MBSFN subframes. For receiving the control information in MBSFN subframes, the WTRU may revert to LTE Rel-11 procedures. In various embodiments, the NCT cell may transmit the CRS on port 0 (e.g., only port 0) along with the control information transmission on port 0 (e.g., port 0 only). In various embodiments, the NCT cell may transmit the CRS and the control information on antenna ports as specified in the PBCH (for example if the NCT transmits the PBCH as specified in LTE Rel-1).

Representative Methods

Figure 3:
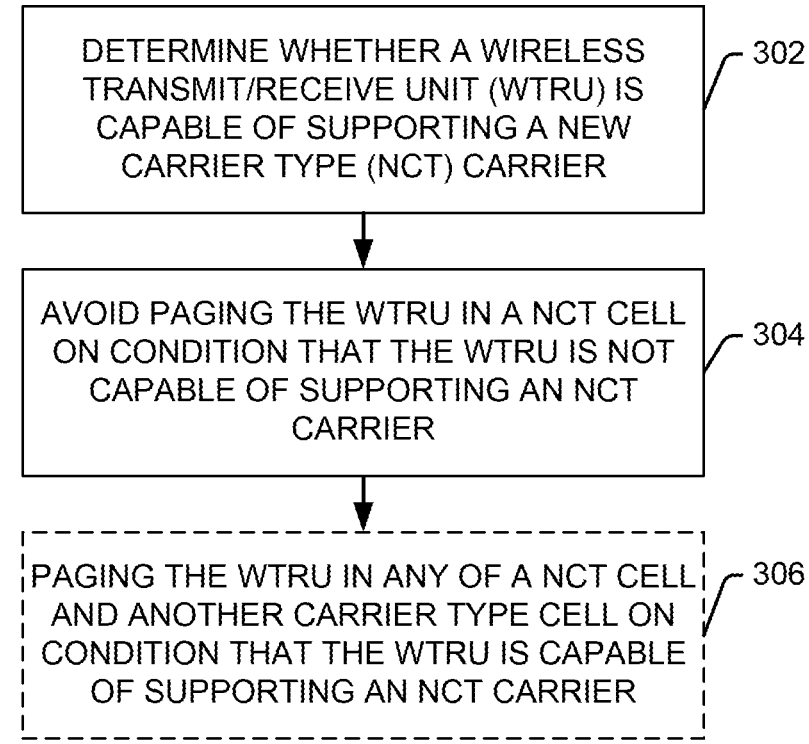
FIG. 3 is a flow diagram illustrating an example method for paging in accordance with an embodiment.

FIG. 3 is a flow diagram illustrating an example method 300 for paging in accordance with an embodiment. The method 300 is described with reference to the example communications system of FIGS. 1A-1E. The method 300 may be carried out using other architectures, as well.

At block 302, a network element may determine whether a WTRU 102 is capable of supporting the NCT carrier. At block 304, the network 104/106 may avoid paging the WTRU 102 in an NCT cell on condition that the WTRU is not capable of supporting an NCT carrier. Alternatively, as shown at block 306, the network 104/106 may page the WTRU in an NCT cell and/or another carrier type cell on condition that the WTRU is capable of supporting an NCT carrier.

In some embodiments, the network element may receive NCT-capability information indicating the WTRU 102 is capable of supporting the NCT carrier. This NCT-capability information may include, for example, WTRU-capability information.

In some embodiments, the NCT-capability information may be received from the WTRU 102. In some embodiments, the NCT-capability information is included in capability information associated with the WTRU 102. In some embodiments, the capability information associated with the WTRU 102 includes radio capability information associated with the WTRU. In some embodiments, the NCT-capability information is received by a mobility management entity. In some embodiments, the NCT-capability information is received and stored by a mobility management entity.

Figure 4:
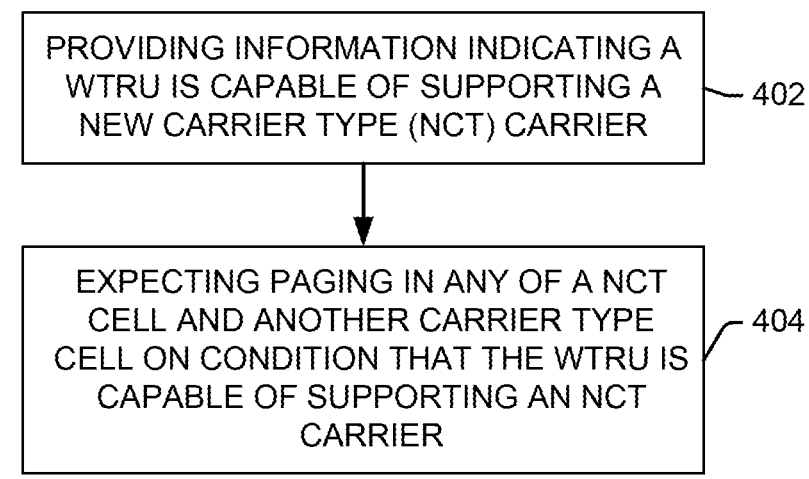
FIG. 4 is a flow diagram illustrating an example method for detecting paging in accordance with an embodiment.

FIG. 4 is a flow diagram illustrating an example method 400 for detecting paging in accordance with an embodiment. The method 400 is described with reference to the example communications system of FIGS. 1A-1E. The method 400 may be carried out using other architectures, as well.

At block 402, a WTRU 102 may provide NCT-capability information to a network element. At block 404, the WTRU may expect paging in any of an NCT cell and another carrier type cell based on condition the WTRU being capable of supporting an NCT carrier. In some embodiments, the NCT-capability information is provided using radio resource control (RRC) signaling.

Figure 5:
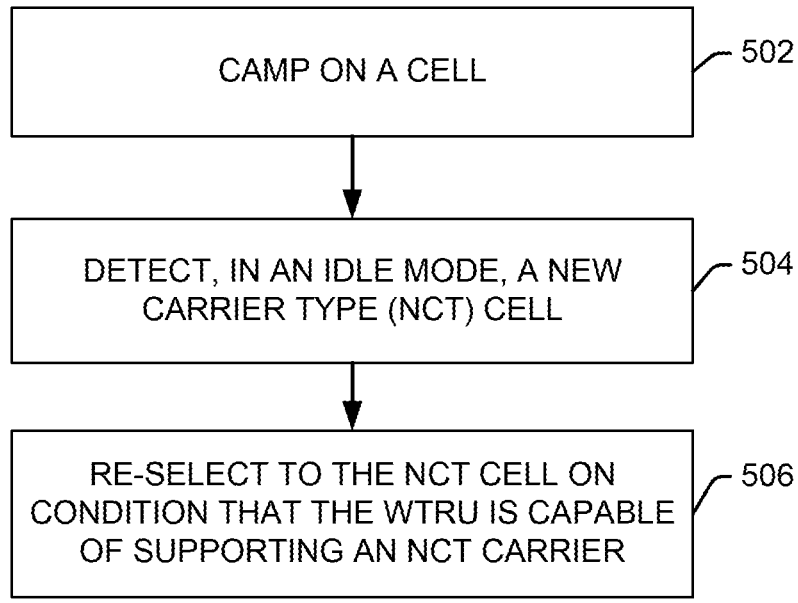
FIG. 5 is a flow diagram illustrating an example method for performing re-selection in accordance with an embodiment.

FIG. 5 is a flow diagram illustrating an example method 500 for performing re-selection in accordance with an embodiment. The method 500 is described with reference to the example communications system of FIGS. 1A-1E. The method 500 may be carried out using other architectures, as well.

At block 502, a WTRU 102 may camp on a cell. At block 504, the WTRU 102 may detect, in idle mode, an NCT cell. At block 506, the WTRU 102 may re-select to the NCT cell on condition that the WTRU is capable of supporting an NCT carrier.

In some embodiments, the WTRU 102 may re-select to the NCT cell irrespective of a priority of the camped-on cell. In some embodiments, the WTRU 102 may re-select to the NCT cell on condition that the NCT cell is a highest ranked cell. In some embodiments, the WTRU 102 may re-select to the NCT cell on condition that the NCT cell is on the same frequency as the camped-on cell. In some embodiments, the WTRU 102 may adjust priority of the NCT cell to prioritize the NCT cell over the camped-on cell. In some embodiments, the WTRU 102 may re-select to the NCT cell based on the adjusted priority of the NCT cell.

Figure 6:
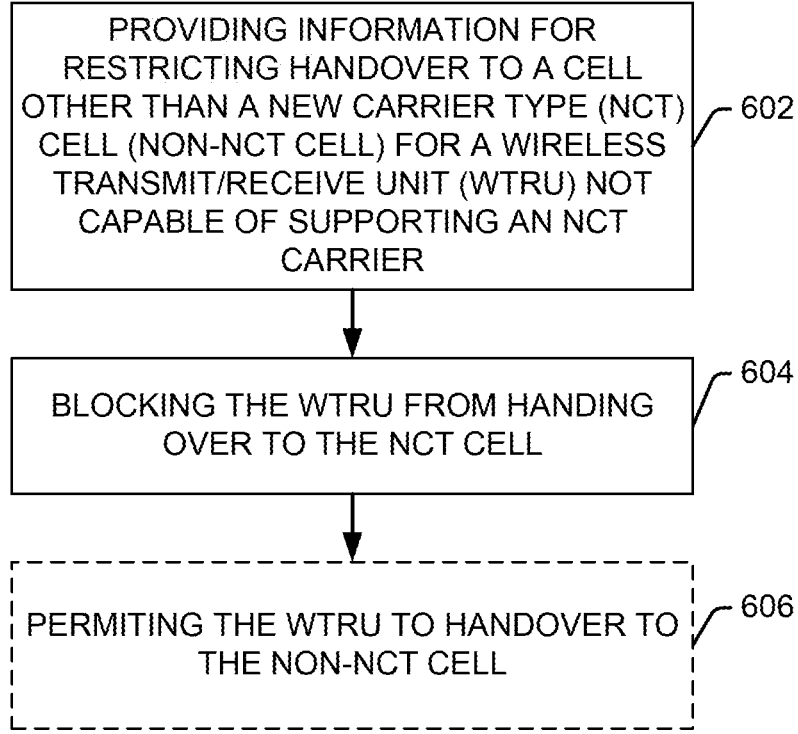
FIG. 6 is a flow diagram illustrating an example method for controlling handover in accordance with an embodiment.

FIG. 6 is a flow diagram illustrating an example method 600 for controlling handover in accordance with an embodiment. The method 600 is described with reference to the example communications system of FIGS. 1A-1E. The method 600 may be carried out using other architectures, as well.

At block 602, a first network element may provide, to a second network element, information for restricting handover to a cell other than NCT cell (non-NCT cell) for a WTRU 102 that is a non-NCT-capable WTRU. At block 604, the second network element may block the non-NCT-capable WTRU from handing over to the NCT cell. At block 606, a third network element may permit the non-NCT-capable WTRU to handover to the non-NCT cell.

Figure 7:
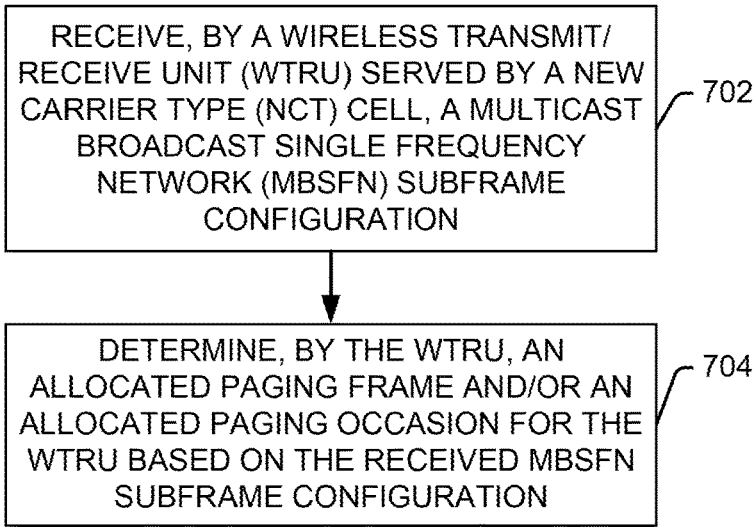
FIG. 7 is a flow diagram illustrating an example method for supporting MBMS operations on an NCT cell in accordance with an embodiment.

FIG. 7 is a flow diagram illustrating an example method 700 for supporting MBMS operations on an NCT cell in accordance with an embodiment. The method 700 is described with reference to the example communications system of FIGS. 1A-1E. The method 700 may be carried out using other architectures, as well.

At block 702, a WTRU 102 served by an NCT cell may receive a MBSFN subframe configuration. At block 702, the WTRU 102 may determine an allocated paging frame and/or an allocated paging occasion for the WTRU based on the received MBSFN subframe configuration.

In some embodiments, the MBSFN subframes may include at least one of: subframe nos. 0, 4, 5, and/or 9. In some embodiments, the WTRU may receive the MBSFN subframe configuration, at least in part, by obtaining a bitmap representing a MBSFN subframe pattern.

Figure 8:
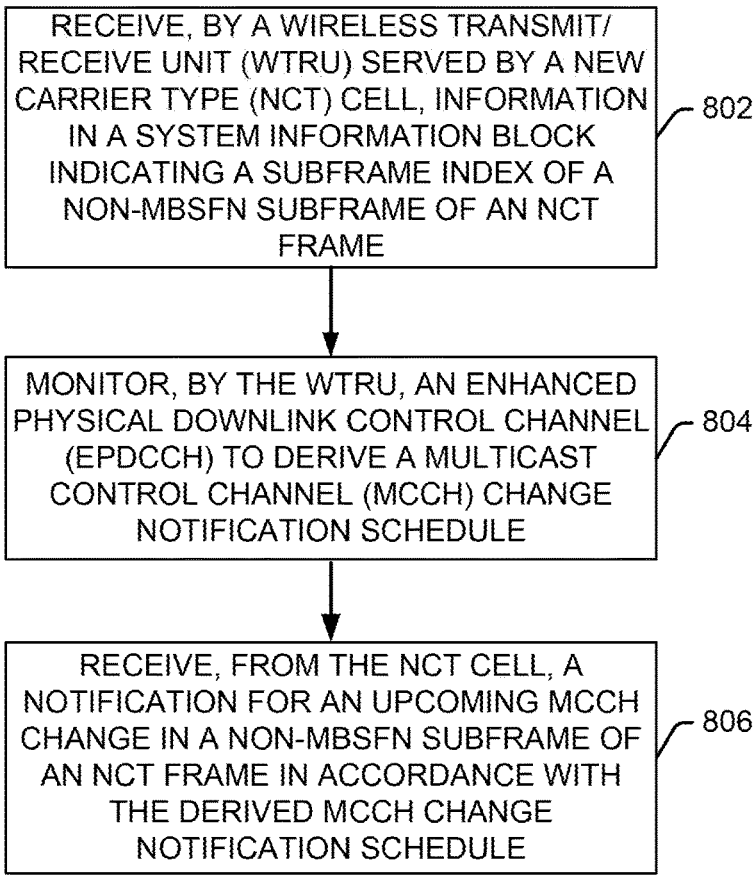
FIG. 8 is a flow diagram illustrating an example method for supporting MBMS operations on an NCT cell in accordance with an embodiment.

FIG. 8 is a flow diagram illustrating an example method 800 for supporting MBMS operations on an NCT cell in accordance with an embodiment. The method 800 is described with reference to the example communications system of FIGS. 1A-1E. The method 800 may be carried out using other architectures, as well.

At block 802, a WTRU 102 served by an NCT cell may receive information in a SIB indicating a subframe index of a non-MBSFN subframe of an NCT frame. At block 804, the WTRU 102 may monitor an enhanced Physical Downlink Control Channel (ePDCCH) to derive a multicast control channel (MCCH) change notification schedule. At block 806, the WTRU 102 may receive, from the NCT cell, a notification for an upcoming MCCH change in a non-MBSFN subframe of a radio frame in accordance with the derived MCCH change notification schedule.

In some embodiments, the WTRU may receive a DCI format scrambled with an M-RNTI in the non-MBSFN subframe, and/or decode the DCI format in the non-MBSFN subframe using the M-RNTI.

Figure 9:
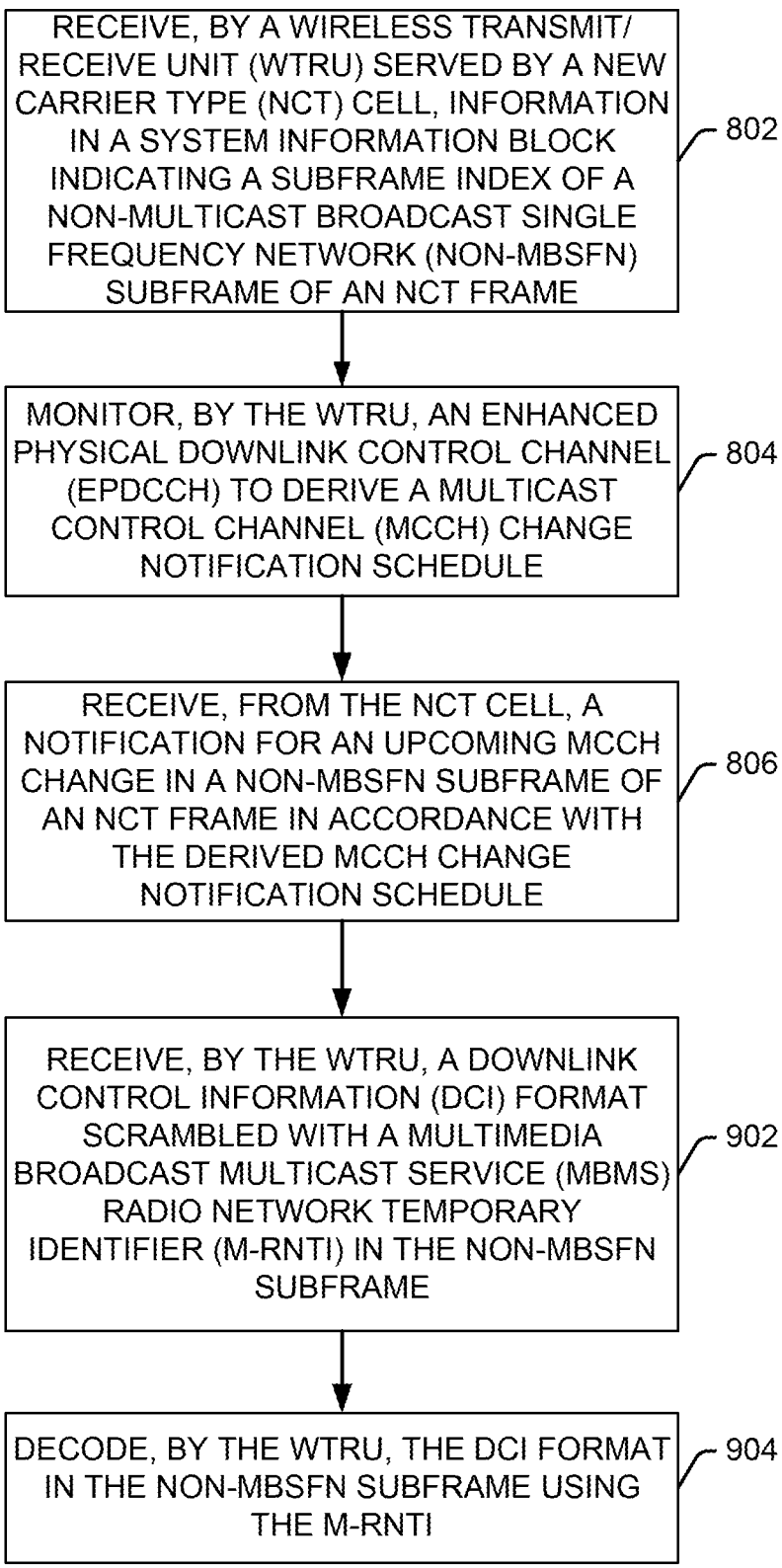
FIG. 9 is a flow diagram illustrating an example method for supporting MBMS operations on an NCT cell in accordance with an embodiment.

FIG. 9 is a flow diagram illustrating an example method 900 for supporting MBMS operations on an NCT cell in accordance with an embodiment. The method 900 is described with reference to the example communications system of FIGS. 1A-1E. The method 900 may be carried out using other architectures, as well. The method 900 of FIG. 9 is similar to the method 800 of FIG. 8, except as described below.

At block 902, the WTRU 102 served by the NCT cell may receive a downlink control information (DCI) format scrambled with a MBMS radio network temporary identifier (M-RNTI) in the non-MBSFN subframe. At block 904; the WTRU 102 may decode the DCI format in the non-MBSFN subframe using the M-RNTI.

Figure 10:
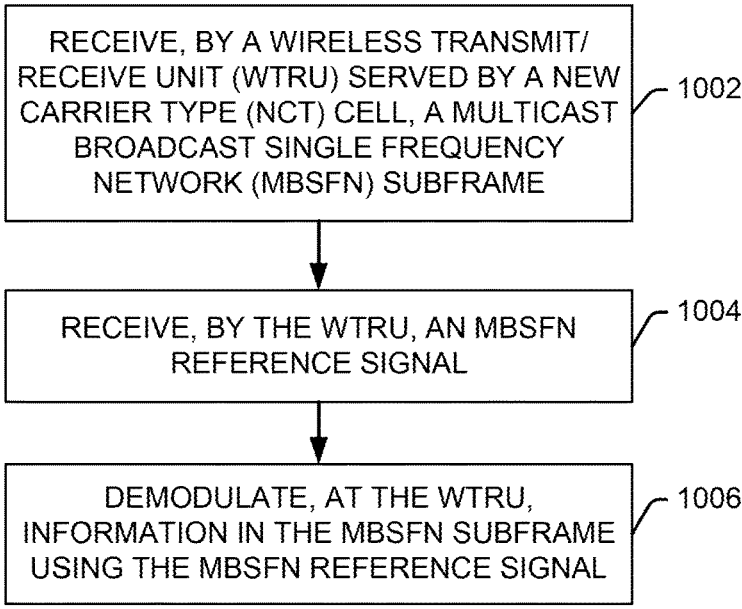
FIG. 10 is a flow diagram illustrating an example method for supporting MBMS operations on an NCT cell in accordance with an embodiment.

FIG. 10 is a flow diagram illustrating an example method 1000 for supporting MBMS operations on an NCT cell in accordance with an embodiment. The method 1000 is described with reference to the example communications system of FIGS. 1A-1E. The method 1000 may be carried out using other architectures, as well.

At block 1002, a WTRU 102 served by an NCT cell may receive a MBSFN subframe. At block 1004, the WTRU 102 may receive an MBSFN reference signal. At block 1006, the WTRU 102 may demodulate information in the MBSFN subframe using the MBSFN reference signal.

In some embodiments, the WTRU 102 may receive a PDSCH transmission in the MBSFN subframe. In some embodiments, the WTRU 102 may determine whether an upcoming MBSFN subframe is used for one of: (1) unicast transmission with a normal CP on a PDSCH; or (2) a PMCH transmission.

In some embodiments, the WTRU 102 may read MCH transmission schedules and, MCH scheduling information in first scheduled subframe of each MTCH; and/or determine MBSFN subframes that are scheduled for the PMCH transmission and/or that are scheduled for PDSCH transmission.

In some embodiments, the WTRU 102 may receive a MBSFN subframe pattern, read each bit of the MBSFN subframe pattern, and/or determine, based on a logic level of a respective bit, whether a corresponding MBSFN subframe is for one of: (1) PMCH transmission; or (2) PDSCH transmission.

In some embodiments, the WTRU 102 may monitoring for information with a normal CP, if the upcoming MBSFN subframe is used for the PDSCH transmission, or the information with an extended CP, if the upcoming MBSFN subframe is scheduled for the PMCH transmission based on the determined logic level of a corresponding bit. In some embodiments, the MBSFN subframe has an extended CP in its entirety for a PMCH transmission; and the WTRU 102 may demodulate the PMCH in the MBSFN subframe.

Figure 11:
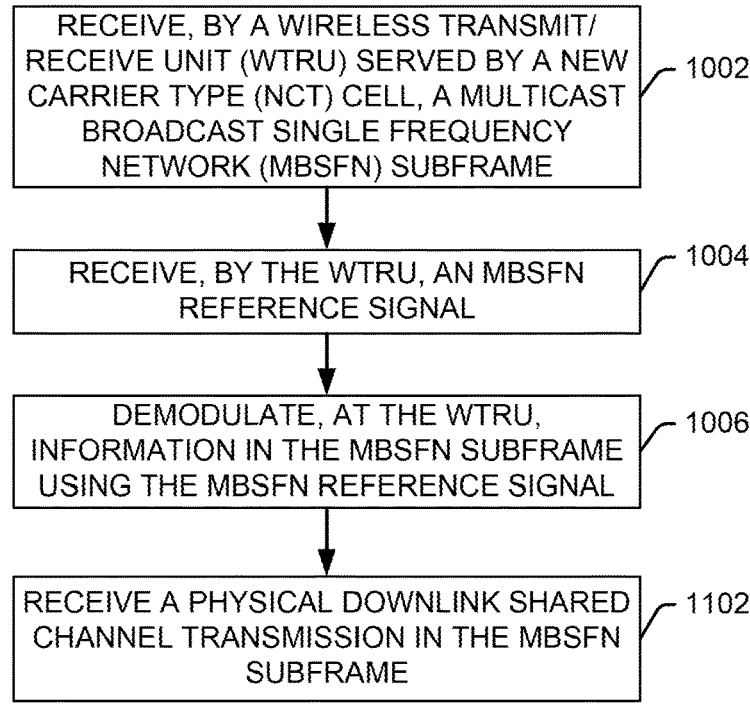
FIG. 11 is a flow diagram illustrating an example method for supporting MBMS operations on an NCT cell in accordance with an embodiment.

FIG. 11 is a flow diagram illustrating an example method 1100 for supporting MBMS operations on an NCT cell in accordance with an embodiment. The method 1100 is described with reference to the example communications system of FIGS. 1A-1E. The method 1100 may be carried out using other architectures, as well. The method 1100 of FIG. 11 is similar to the method 1000 of FIG. 10, except that at block 1102, the WTRU 102 served by the NCT cell may receive a PDCCH transmission in the MBSFN subframe.

Figure 12:
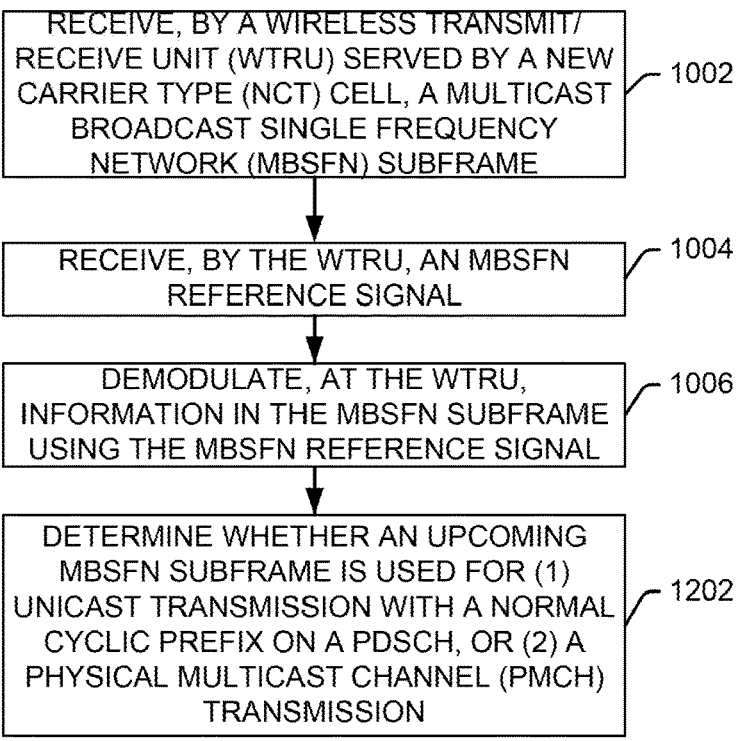
FIG. 12 is a flow diagram illustrating an example method for supporting MBMS operations on an NCT cell in accordance with an embodiment.

FIG. 12 is a flow diagram illustrating an example method 1200 for supporting MBMS operations on an NCT cell in accordance with an embodiment. The method 1200 is described with reference to the example communications system of FIGS. 1A-1E. The method 1200 may be carried out using other architectures, as well. The method 1200 of FIG. 12 is similar to the method 1000 of FIG. 10, except that at block 1202, the WTRU 102 served by the NCT cell may determine whether an upcoming MBSFN subframe is used for one of: (1) unicast transmission with a normal Cyclic Prefix on a PDSCH; or (2) a Physical Multicast Channel (PMCH) transmission.

Figure 13:
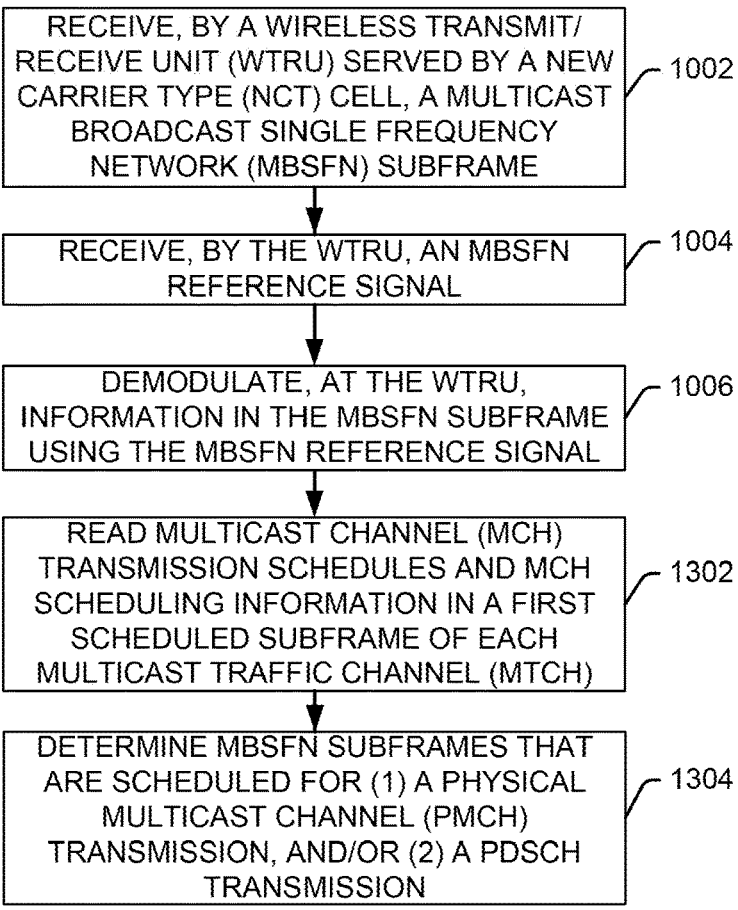
FIG. 13 is a flow diagram illustrating an example method for supporting MBMS operations on an NCT cell in accordance with an embodiment.

FIG. 13 is a flow diagram illustrating an example method 1300 for supporting MBMS operations on an NCT cell in accordance with an embodiment. The method 1300 is described with reference to the example communications system of FIGS. 1A-1E. The method 1300 may be carried out using other architectures, as well. The method 1300 of FIG. 13 is similar to the method 1000 of FIG. 10, except as described below.

At block 1302, the WTRU 102 served by the NCT cell may read MCH transmission schedules and MCH scheduling information in a first scheduled subframe of each MTCH. At block 1304, the WTRU 102 may determine MBSFN subframes that are scheduled for a PMCH transmission and/or that are scheduled for a PDSCH transmission.

Figure 14:
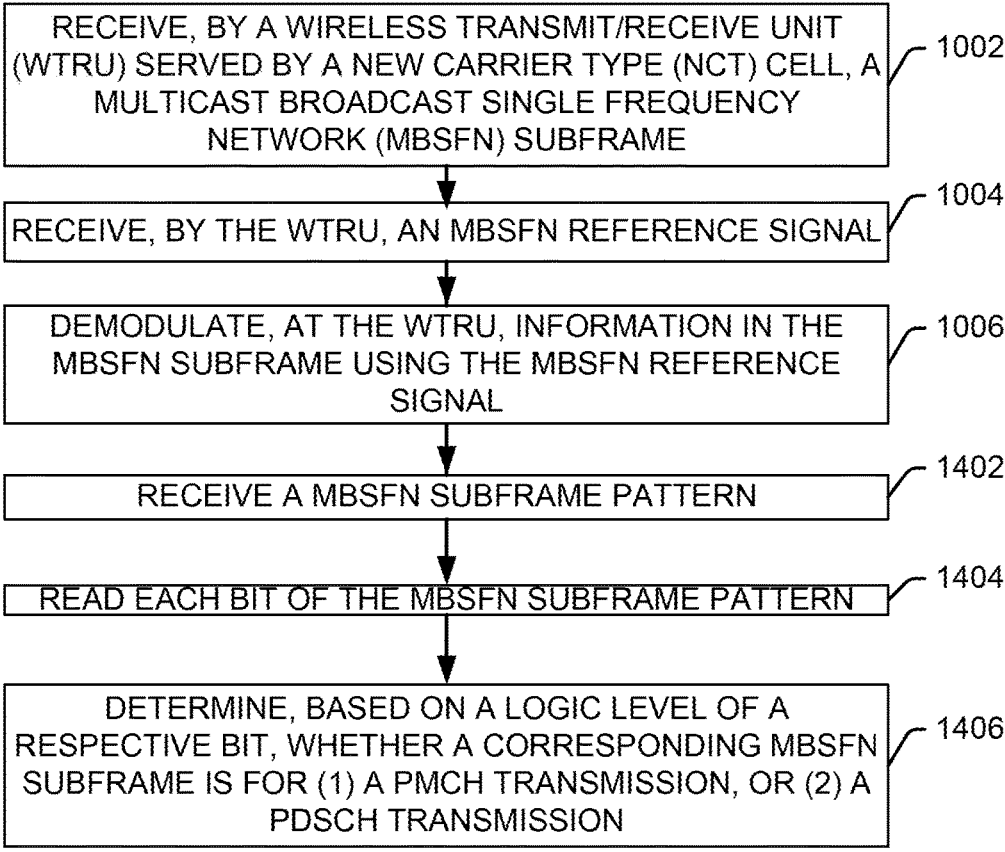
FIG. 14 is a flow diagram illustrating an example method for supporting MBMS operations on an NCT cell in accordance with an embodiment.

FIG. 14 is a flow diagram illustrating an example method 1400 for supporting MBMS operations on an NCT cell in accordance with an embodiment. The method 1400 is described with reference to the example communications system of FIGS. 1A-1E. The method 1400 may be carried out using other architectures, as well. The method 1400 of FIG. 14 is similar to the method 1000 of FIG. 10, except as described below.

At block 1402, the WTRU 102 served by the NCT cell may receive a MBSFN subframe pattern. At block 1402, the WTRU 102 may read each bit of the MBSFN subframe pattern. At block 1406, the WTRU 102 may determine, based on a logic level of a respective bit, whether a corresponding MBSFN subframe is for one of: (1) a PMCH transmission, or (2) a PDSCH transmission.

Figure 15:
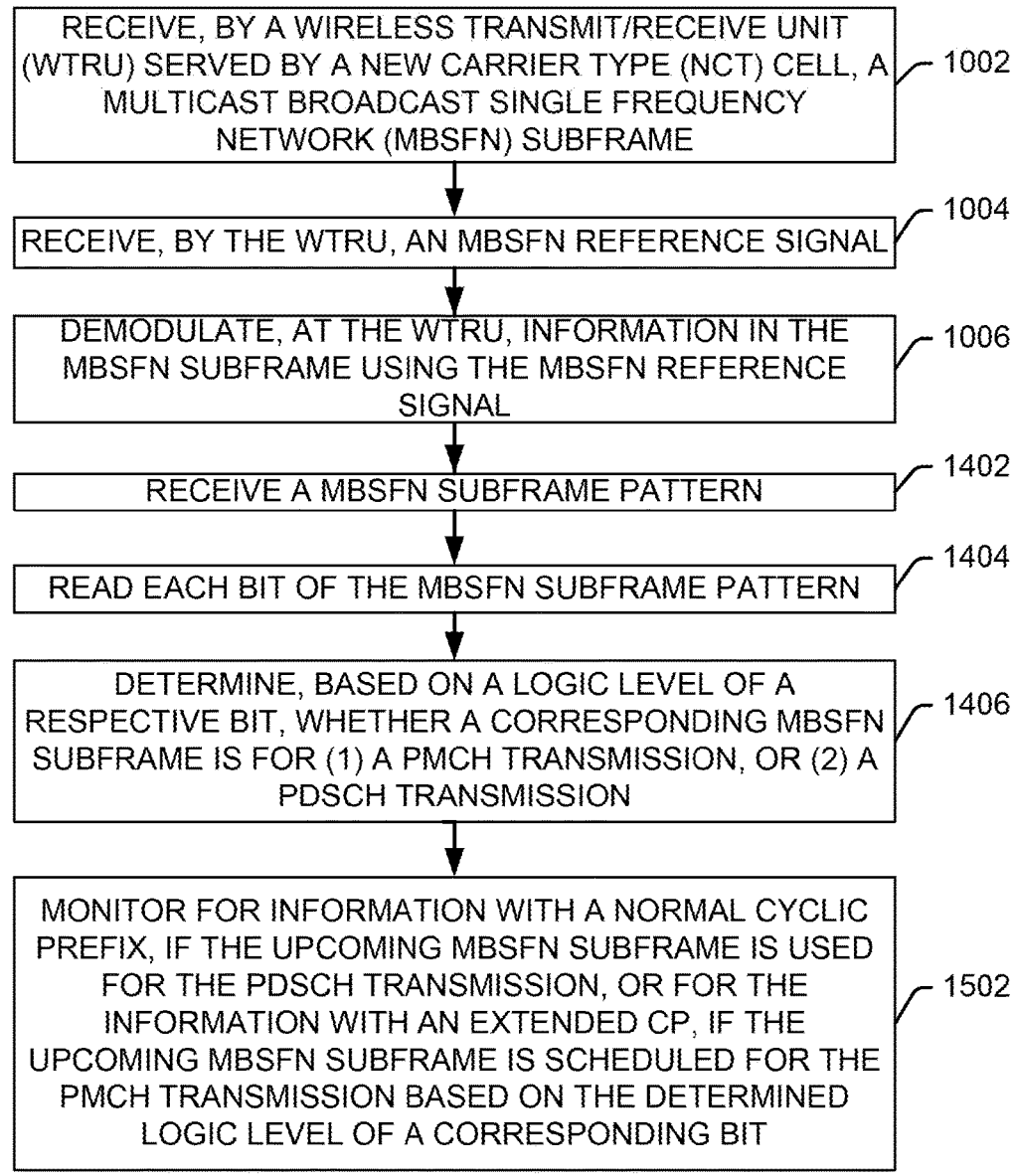
FIG. 15 is a flow diagram illustrating an example method for supporting MBMS operations on an NCT cell in accordance with an embodiment.

FIG. 15 is a flow diagram illustrating an example method 1500 for supporting MBMS operations on an NCT cell in accordance with an embodiment. The method 1500 is described with reference to the example communications system of FIGS. 1A-1E. The method 1500 may be carried out using other architectures, as well. The method 1500 of FIG. 15 is similar to the method 1400 of FIG. 14, except that at block 1502, the WTRU 102 served by the NCT cell may monitor for information with a normal Cyclic Prefix, if the upcoming MBSFN subframe is used for the PDSCH transmission, or the information with an extended CP, if the upcoming MBSFN subframe is scheduled for the PMCH transmission based on the determined logic level of a corresponding bit.

Figure 16:
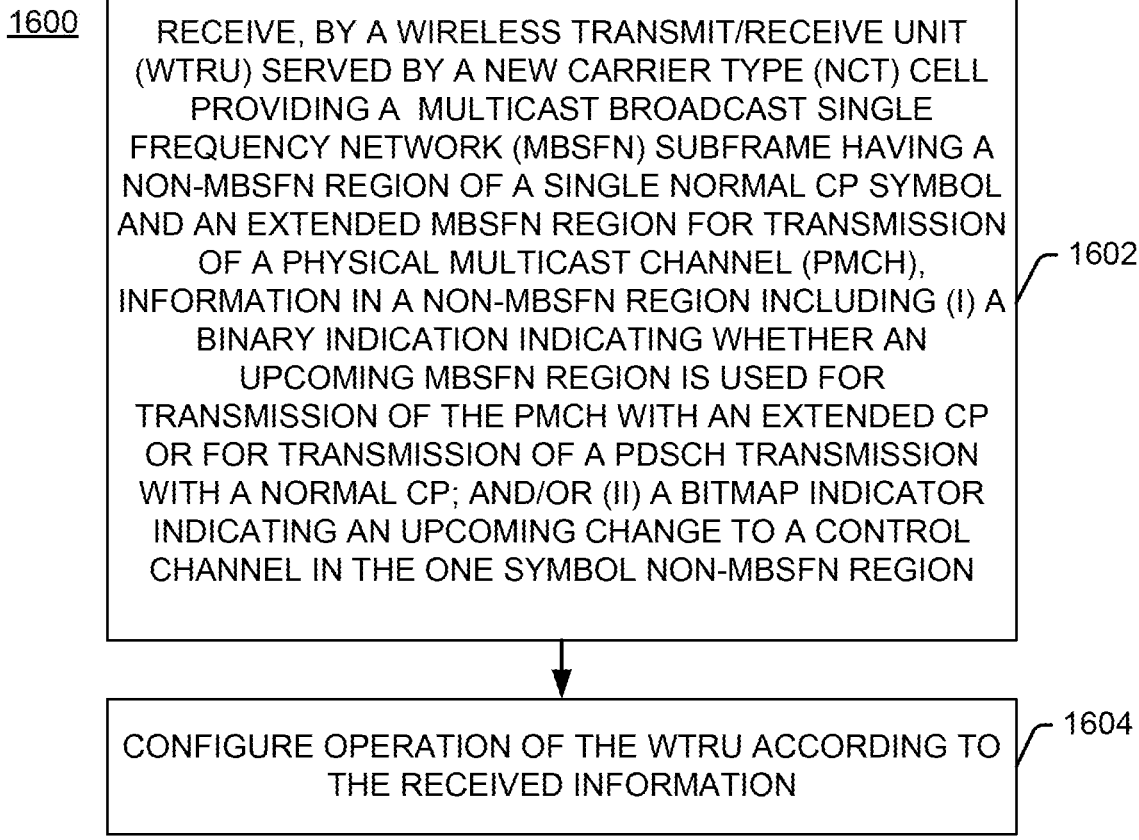
FIG. 16 is a flow diagram illustrating an example method for supporting MBMS operations on an NCT cell in accordance with an embodiment.

FIG. 16 is a flow diagram illustrating an example method 1600 for supporting MBMS operations on an NCT cell in accordance with an embodiment. The method 1600 is described with reference to the example communications system of FIGS. 1A-1E. The method 1600 may be carried out using other architectures, as well.

In the method 1600, a WTRU 102 served by an NCT cell configured to provide a MBSFN subframe having a non-MBSFN region of a single normal CP symbol and an extended MBSFN region for transmission of a PMCH. At block 1602, the WTRU 102 may receive information in the non-MBSFN region including (i) a binary indication indicating whether an upcoming MBSFN region is used for transmission of the PMCH with an extended CP or for transmission of a PDSCH transmission with a normal CP; and/or (ii) a bitmap indicator indicating an upcoming change to a control channel in the one symbol non-MBSFN region. At block 1604, the WTRU 102 may configure operation of the WTRU according to the received information.

Figure 17:
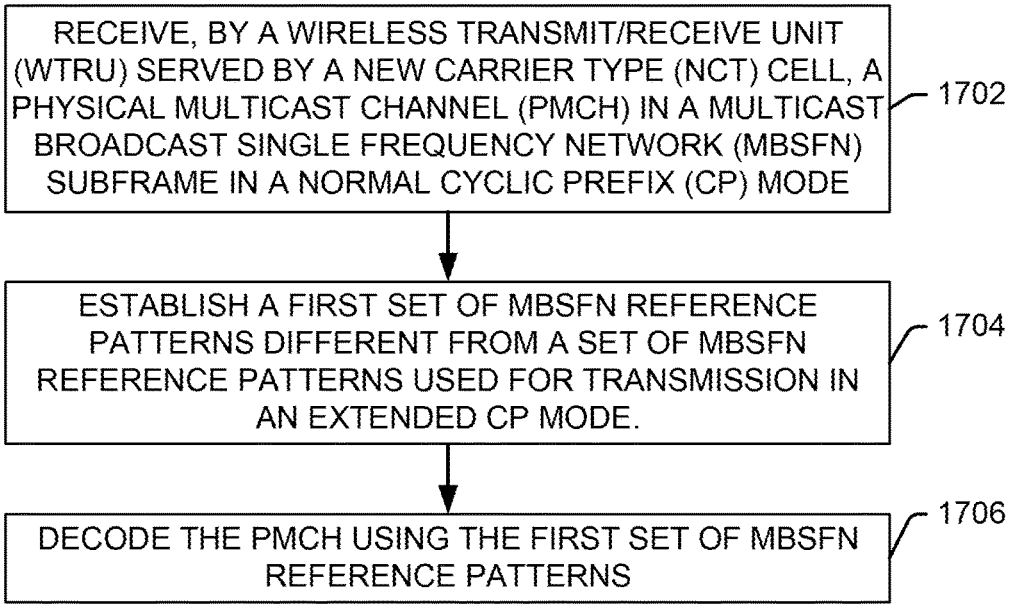
FIG. 17 is a flow diagram illustrating an example method for supporting MBMS operations on an NCT cell in accordance with an embodiment.

FIG. 17 is a flow diagram illustrating an example method 1700 for supporting MBMS operations on an NCT cell in accordance with an embodiment. The method 1700 is described with reference to the example communications system of FIGS. 1A-1E. The method 1700 may be carried out using other architectures, as well.

At block 1702, a WTRU 102 served by an NCT cell may receive a Physical Multicast Channel (PMCH) of a MBSFN subframe in a normal Cyclic Prefix (CP) mode; which MBSFN subframe has an extended MBSFN region for the entire subframe for the transmission of the PMCH. At block 1704, the WTRU 102 may establish a first set of MBSFN reference patterns different from a set of MBSFN reference patterns used for transmission in an extended CP mode. At block 1706, the WTRU 102 may decode the PMCH using the first set of MBSFN reference patterns.

Enhanced PBCH

A WTRU may receive a new PBCH (e.g., an enhanced PBCH (ePBCH)) having a structure (or design) that may be partially or completely different from that of a legacy PBCH. The ePBCH may include or contain some or all information of the legacy PBCH. For example, the ePBCH may include (e.g., only include or contain) the SFN. In various embodiments, the ePBCH may be used to deliver some information that is not included in the legacy PBCH.

Demodulation Reference Signals (DMRS) Based ePBCH

The WTRU 102 may demodulate the ePBCH based on one or a combination of the following signals: (1) PSS/SSS; (2) CRS; and/or (3) DMRS. When the WTRU 102 uses DMRS, the WTRU 102 may use (e.g., assume) a single or multiple DMRS for the detection. The WTRU 102 may determine the DMRS port to be used for ePBCH demodulation according to one or a combination of the following: (i) a predefined DMRS port, e.g., one of DMRS ports 7/8/107/108/109/110; (ii) a function of the cell ID, PSS index and/or SSS index, among others; and (iii) blind detection of the DMRS port out of a predefined set of DMRS ports. In various embodiments, upon the detection of the PSS, the WTRU 102 may identify cell IDs within the cell identity group. The cell identity group may take on one of three different values, and depending on the detected value, the WTRU 102 may use (e.g., assume) one DMRS port (e.g., a single DMRS port, for example, DMRS port 108) out of a predefined set of DMRS ports. In various embodiments, the blind detection may be used by the WTRU 102 to determine the actual DMRS port used, and depending on the actual DMRS port used, the WTRU 102 may derive (e.g., implicitly derive) additional information, as well.

ePBCH Resource Mapping

Some physical resource blocks (PRBs) may be configured to carry the ePBCH. The ePBCH may be mapped to resource elements (REs) using enhanced control channel element (ECCE) and/or enhanced resource-element group (EREG) concepts and/or implementations.

The WTRU 102 may expect an ePBCH in some or all available REs of the PRBs, according to one or a combination of the following:

1. REs reserved for cell-specific reference signals (CRSs) may not be available for ePBCH mapping. As an example, the REs allocated to CRS port 0, which may be sent in subframe nos. 0 and 5, may not be used for ePBCH RE mapping.

2. REs reserved for DMRS ports may not be available for ePBCH mapping.

3. REs reserved for CSI-RS may not be available for ePBCH mapping. As an example, the WTRU 102 may use (e.g., assume) a limited number of CSI-RS ports, e.g., only one port, in the PRBs allocated for the ePBCH transmission.

4. Available REs may be a function of the DMRS port to be used. For example, if two DMRS ports are used, e.g., for two different parts of the cell, each DMRS may be associated with a certain set of REs.

In various embodiments, the WTRU 102 may assume that there is no CSI-RS in the PRBs allocated for ePBCH transmission, and, for example, the WTRU 102 may not use any CSI-RS in the PRBs allocated for ePBCH transmission.

ePBCH Resource Allocation

A WTRU 102 may expect and/or determine the ePBCH according to one or a combination of the following mechanisms. The ePBCH may be mapped to one or more PRBs in one or more subframes in one or more radio frames.

ePBCH Subframe Location

A WTRU 102 may receive the ePBCH in one or more subframes of a radio frame according to one or a combination of following: (i) at a predefined subframe or subframes within a radio frame (e.g., the first subframe of each radio frame); (ii) at a subframe or subframes where subframe positions in a radio frame may be a function of cell ID (e.g., depending on the cell ID, the WTRU 102 may expect the ePBCH either in subframe nos. 0 or 5 or both); (iii) at a subframe or subframes where subframe positions in a radio frame may be a function of TDD or FDD mode of operation (e.g., the WTRU 102 may expect the ePBCH in subframe no. 0 for TDD and in subframe no. 5 for FDD); and (iv) at a subframe or subframes where subframe positions in a radio frame may be a function of frame number or SFN. In some embodiments in which the WTRU 102 may receive the ePBCH at a subframe or subframes where subframe positions in a radio frame may be a function of frame number, the ePBCH transmission may have a periodicity of 4 radio frames where the subframe position (location) of ePBCH transmission in each of the 4 radio frames may be different. As an example, in radio frames 0, 1, 2 and 3, the ePBCH may be transmitted in subframes nos. 0, 1, 5 and 6.

ePBCH Physical Resource Block (PRB) Location

A WTRU 102 may receive the ePBCH in one or more PRBs of a subframe according to one or a combination of following.

1. The WTRU 102 may expect and/or determine the ePBCH in one or a subset of the PRBs in a center region (for example, of the 6 center PRBs (in bandwidth). As one example, two PRBs out of the 6 center PRBs.

2. The WTRU 102 may expect and/or determine the ePBCH in a number of adjacent or distributed PRBs. In various embodiments, the ePBCH may be across a pre-defined bandwidth.

3. The WTRU 102 may expect and/or determine a location of the PRBs as a function of the Cell ID. As an example, different cells with different cell IDs may transmit the ePBCH in different PRBs, and may be able to avoid ePBCH interference on other cells.

4. The location of PRBs may not be explicitly specified to the WTRU 102 within a subframe, and, instead, the WTRU 102 may perform a blind detection to determine the location of PRBs carrying the ePBCH. The WTRU 102 may receive some implicit information based on the detected location of the ePBCH PRBs. As an example, the WTRU 102 may determine the system bandwidth (which may be a range) based on the detected PRB locations.

5. The location of the PRBs may differ from one subframe to another and/or may depend on the SFN. In this case, the WTRU 102 may attempt (e.g., try) different hypothesis, ways and/or locations to detect the ePBCH PRBs. As an example, the ePBCH transmission may have a periodicity of 4 radio frames where, each radio frame may carry the PBCH in one subframe (e.g., only in a single subframe, e.g., subframe no. 0), and the location of the PRBs in each of those subframes are different.

Determination of SFN Bits by the WTRU

A WTRU 102 may determine a limited number of SFN bits and/or other information upon the detection of the ePBCH. The WTRU 102 may expect and/or determine ePBCH transmissions that may be different in one or a combination of the following, in different radio frames: (1) subframe locations; (2) PRB locations; (3) scrambling used for the ePBCH context; and/or (4) cyclic redundancy check (CRC), among others.

Upon the detection of different ePBCH transmissions in different radio frames and/or the detection of one of the possibilities (one or more possibilities), the WTRU 102 may distinguish the specific radio frame or radio frames from the rest and may determine a limited number of least significant bits (LSBs) of the SFN. As an example, the ePBCH transmission may have a periodicity of 4 radio frames where each radio frame may carry the PBCH in one subframe (e.g., only in a single subframe (e.g., subframe no. 0)). The ePBCH may be transmitted in PRB sets of {0,3}, {(1,4}, {2,5} and {0,5} corresponding to radio frames 0, 1, 2 and 3, respectively. Radio frames 0, 1, 2, and 3 may be associated with 2 SFN LSBs of [0,0], [0,1], [1,0] and [1,1], respectively. Upon the detection of the ePBCH PRBs of {2,5} in a radio frame, the WTRU 102 may associate the detected set of PRBs to the radio frame 2 among those 4 radio frames such that the WTRU 102 may determine the 2 LSB of the SFN of that radio frame as [1,0].

In various embodiments, processes and/or procedures may be implemented to configure different cells to transmit the ePBCH in different subframe and/or PRB locations to reduce (e.g., considerably reduce) inter-cell interference from the ePBCH.

ePBCH and Cell Splitting

In various embodiments, processes, procedures and/or mechanisms for different transmission and/or reception of ePBCH are implemented. The mechanisms may be used in combination with other mechanisms described herein.

DMRS Antenna Ports

The ePBCH may be transmitted and/or received on one or more DMRS antenna ports, using one or a combination of the following mechanisms: (i) the ePBCH may be transmitted to, and/or received by, a WTRU 102 on two or more DMRS antenna ports; (ii) the ePBCH may be transmitted to, and/or received by, a WTRU 102 on a single DMRS antenna port; (iii) the ePBCH may be transmitted to, and/or received by, different WTRUs 102 on different antenna ports; (iv) ePBCH information may be transmitted to, and/or received by, different WTRUs 102 on different DMRS antenna ports; (v) different ePBCH information may be transmitted to, and/or received by, different WTRUs 102 on different DMRS antenna ports; and (v) different ePBCHs may be transmitted to, and/or received by, a WTRU 102 on different antenna ports; each corresponding to a different cell ID.

REs and DMRS Antenna Ports

The REs of the PRB, which may carry the ePBCH, may be mapped to DMRS antenna ports using one or a combination of the following mechanisms: (i) in a PRB, the REs may be assigned to different DMRS antenna ports; (ii) in a PRB, some REs may contain (e.g., only contain) or include the information associated with one or some DMRS antenna port; and (iii) in a PRB, some REs may not contain or include the information associated with one or some DMRS antenna ports.

ePBCH Information Content

The information carried by an ePBCH may be described by one or a combination of the following: (i) the ePBCH may carry the whole or subset of information carried by a conventional PBCH; and (ii) the ePBCH may carry information that is not part of conventional PBCH information.

A WTRU 102 may decode and/or use the information content of the ePBCH according to one or a combination of the following mechanisms.

1. The WTRU 102 may receive different sets of values for some or all ePBCH-related parameters.

2. The WTRU 102 may receive one or more different values for the same one or more ePBCH-related parameters on different DMRS antenna ports.

3. The WTRU 102 may receive one or more different values for the same one or more ePBCH-related parameters on the same DMRS antenna port.

4. The WTRU 102 receiving different values for an ePBCH-related parameter may chose one value according to different factors, such as its WTRU-class, WTRU-capability, and/or predefined criteria, among others.

5. The WTRU 102 receiving different values for one or more ePBCH-related parameters may chose one value associated with higher quality of received signal, e.g., single-to-noise-and-interference ratio (SINR).

Cells with Overlapping Physical Resources

To have at least two cells with partially and/or completely overlapping coverage areas and/or partially and/or completely overlapping physical resources, one or a combination of the following mechanisms may be used.

1. Two or more cells, which may correspond to the same eNode-B 160, may share some or all physical resources, such as PRBs and/or subframes, among others.

2. The coverage area of two or more cells, which may correspond to the same eNode-B 160, may be completely or partially overlapping.

3. Two or more cells, which may correspond to the same eNode-B 160, may have the same PSS/SSS signals.

4. A WTRU 102 may use the same set of PSS/SSS to acquire the information of more than one cell.

5. The WTRU 102 may derive more than one cell ID upon the reception of the set of PSS/SSS signals.

6. The WTRU 102 may determine the time and/or frequency location of an ePBCH, which may be a function of the cell ID.

7. The WTRU 102 may determine the candidate ePBCH DMRS antenna port or ports as a function of cell ID.

8. The WTRU 102 may derive one cell ID from a set of PSS/SSS and may determine the cell ID of at least more than one cell as a function of several parameters including the derived cell ID.

In one representative embodiment, a cell may cover two or more locations (e.g., crowded locations) where these two locations may not be in the close vicinity. The cell may transmit the same ePBCH information on two or more different DMRS antenna ports (e.g., antenna ports 7 and 8). Each antenna port may be associated with some REs of the PRBs, where the assigned set of REs may not overlap. Each antenna port may be used to transmit the ePBCH to certain locations (e.g., crowded locations), where the transmission of the ePBCH on that antenna port may be optimized for its location (e.g., covering location). As an example, the cell may choose an appropriate precoder matrix to perform beamforming for an associated location, which may improve (e.g., consequently improve) the reception of the ePBCH by the WTRUs 102 in that location. If a WTRU 102 sees (e.g., only sees) the signal from one antenna port, then it may decode the ePBCH information of that antenna port and use the signal for further communication with the WTRU. A WTRU 102 in a certain location that may see the ePBCH information on both antenna ports may chose the ePBCH associated with stronger received signal and/or may perform joint detection considering the signals received from detectable (e.g., all detectable) DMRS antenna ports.

In another representative embodiment, a cell may cover two different categories of the WTRUs 102, where one WTRU category may support (e.g., may only support) a limited bandwidth (e.g., 8 RBs) and the other may WTRU category support a full band width (e.g., 20 RBs). The cell may transmit two sets of ePBCH-related information on two different DMRS antenna ports (e.g., antenna ports 7 and 8). Some of the REs in the PRBs containing or including ePBCH may be associated to DMRS antenna port 7 and some others may be associated with DMRS antenna port 8. A WTRU 102 may look (e.g., only look) into the REs associated with each antenna port when it attempts or tries to use that specific DMRS antenna port. The ePBCH transmitted on antenna port 7 may advertise for a cell with a 6 PRB bandwidth, whereas the ePBCH transmitted on antenna port 8 may advertise for a cell with a 20 PRB bandwidth. Each WTRU 102 may detect and may decode the ePBCH parameters on both antenna ports. A WTRU 102 belonging to a category of WTRUs supporting up to 8 PRBs may see both values of 6 PRBs and 20 PRBs. The WTRU 102 may assume (or establish) a bandwidth of 6 PRBs, for example, for a portion and/or the rest of communication with that cell. A WTRU 102 belonging to the category of the WTRUs supporting up to 20 PRBs may see both values of 6 PRBs and 20 PRBs and may assume or establish a bandwidth of 20 PRBs for a portion and/or the rest of the communication with that cell, since it may support the higher bandwidth.

In another embodiment, an eNode-B 160 may use two different cells, and hence cell IDs, to cover a completely or partially overlapping coverage area. These two cells may use, for example, some overlapping time and/or frequency resources. As an example, one cell may have a bandwidth of 20 PRBs and the other cell may have a bandwidth of 6 PRBs located in the center of the first cell. Both cells may use the same or overlapping PRBs for the broadcasting of their respective ePBCHs. The two cells may use different DMRS antenna ports for their ePBCH broadcasting. Each of the ePBCHs may be associated with a subset of the REs in the overlapping ePBCH PRBs. One set (e.g., only one set) of PSS/SSS may be broadcast. A WTRU 102 may see the one set (e.g., only one set) of the PSS/SSS. A WTRU 102 may derive the two cell IDs from the received PSS/SSS signals. A WTRU 102 may detect one cell ID from the PSS/SSS, and the WTRU 102 may derive the second cell ID as a function of one or several factors (e.g., such as a function of the first cell ID). A WTRU 102 may detect the ePBCHs of both cells. A WTRU 102 may connect to the cell according to its WTRU-class, and/or WTRU-category, among others. As an example, a WTRU 102 that cannot support more than 6 PRBs may chose to connect to the cell with a bandwidth of 6 PRBs.

Representative Methods

Figure 18:
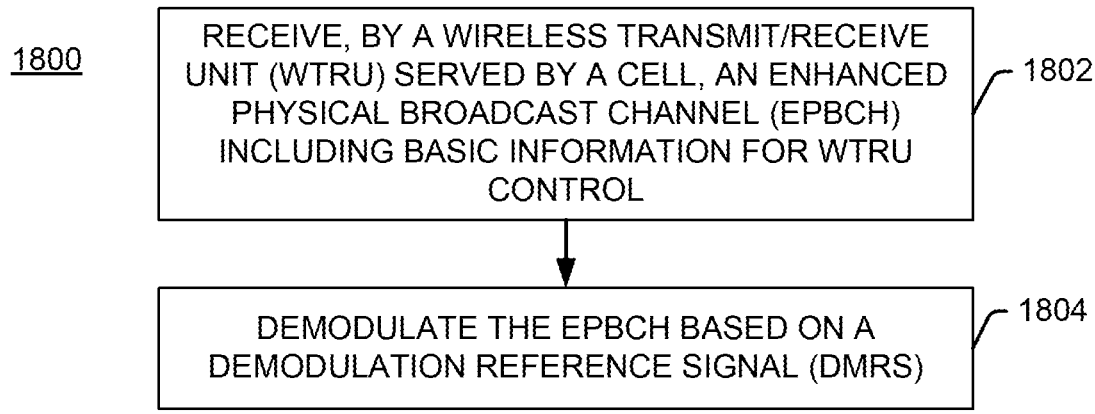
FIG. 18 is a flow diagram illustrating an example method for supporting reception of an enhanced physical broadcast channel (ePBCH) in accordance with an embodiment.

FIG. 18 is a flow diagram illustrating an example method 1800 for supporting reception of an ePBCH in accordance with an embodiment. The method 1800 is described with reference to the example communications system of FIGS. 1A-1E. The method 1800 may be carried out using other architectures, as well.

At block 1802, a WTRU 102 served by a cell may receive the ePBCH, including basic information for WTRU control. At block 1804, the WTRU 102 may demodulate the ePBCH based on a demodulation reference signal (DMRS).

In some embodiments, the WTRU 102 may demodulate the ePBCH based on any of: (1) a primary synchronization signal (PSS); (2) a secondary synchronization signal (SSS); and/or (3) a cell-specific reference signal (CRS).

In some embodiments in which the WTRU 102 demodulates the ePBCH based on a single or multiple DMRS, the WTRU 102 may determine a or multiple DMRS ports for the ePBCH demodulation according to one of: (1) a predefined and/or pre-configured DMRS port; or (2) a function of a cell ID, a PSS index and/or an SSS index; and (3) a blind detection of the DMRS port out of a predefined set of DMRS ports.

In some embodiments in which the WTRU 102 demodulates the ePBCH based on a plurality of DMRS, the WTRU 102 may select one of the plurality of DMRS ports, associate available sets of resource elements to the selected one of the DMRS ports, and demodulate the ePBCH in the resource elements associated with the selected one of the DMRS ports using the selected one of the DMRS ports.

In some embodiments, the WTRU 102 may receive the ePBCH in one or more RBs of a plurality of subframes, determine at least a portion of SFNs based on: (1) subframe locations of the ePBCH; (2) locations of the RBs that carry the ePBCH; (3) scrambling used for ePBCH contexts; and/or (4) cyclic redundancy checks (CRCs).

In some embodiments, the ePBCH may be mapped to one or more resource blocks at any of: (1) a predefined subframe or predefined subframes within a radio frame, (2) a subframe or subframes where positions in the radio frame are a function of cell ID; (3) a subframe or subframes where the positions in the radio frame are a function of a mode of operation; or (4) a subframe or subframes where the positions in the radio frame are a function of frame number or SFN.

In some embodiments, the location of the RBs carrying the ePBCH continuously changes. In some embodiments, the ePBCH of a specific subframe may be located in any of: (1) the RBs in a center region; (2) a number of adjacent or distributed RBs; (3) across a predefined bandwidth; (4) the RBs determined as a function of Cell ID; and/or (5) the RBs determined by a blind detection.

In some embodiments, the WTRU may decode an ePBCH in a subframe where subframe location may be variable within a radio frame. In some embodiments, the variability of the subframe location may be based, at least in part, on a cell ID. In some embodiments, the location may be identified by a subframe number, and wherein the subframe number may be a function at least one of (i) a SFN, (ii) a cell ID and (iii) duplex type.

Figure 19:
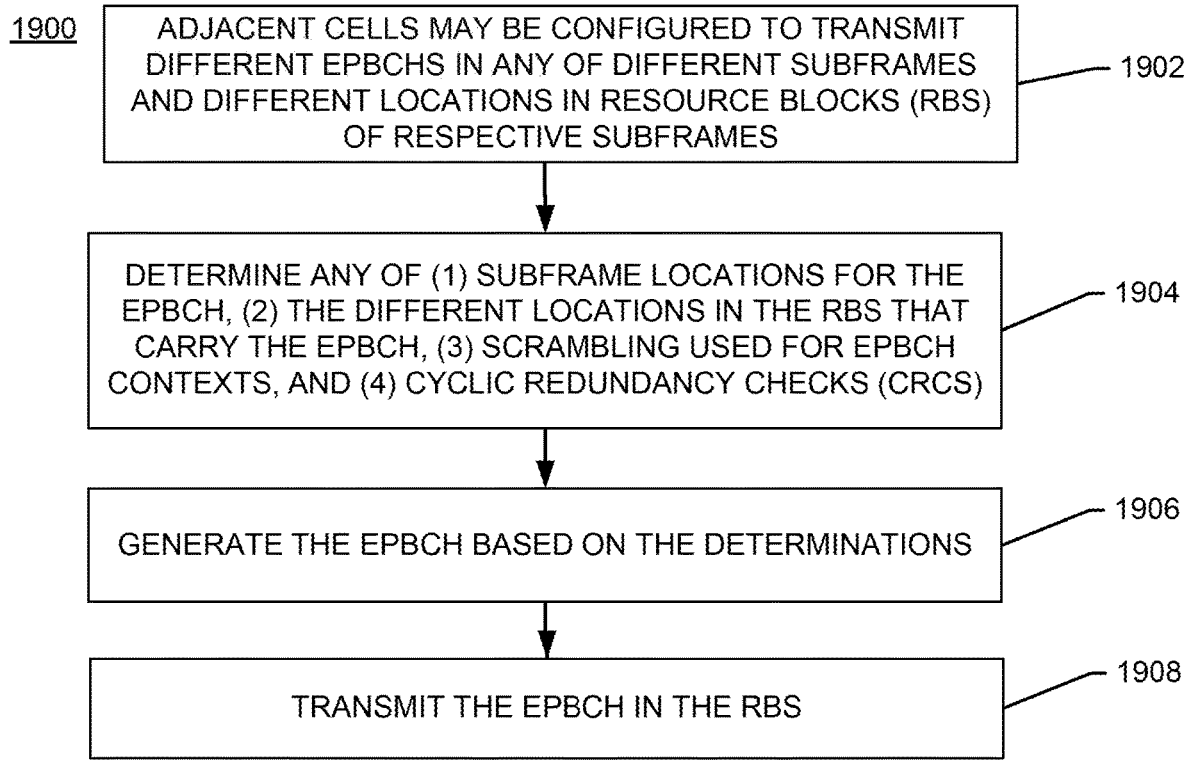
FIG. 19 is a flow diagram illustrating an example method for supporting transmission of multiple ePBCHs in accordance with an embodiment.

FIG. 19 is a flow diagram illustrating an example method 1900 for supporting transmission of multiple ePBCHs in accordance with an embodiment. The method 1900 is described with reference to the example communications system of FIGS. 1A-1E. The method 1900 may be carried out using other architectures, as well.

At block 1902, adjacent cells may be configured to transmit different ePBCHs in any of different subframes and different locations in RBs of respective subframes. At block 1904, any of subframe locations for the ePBCH, the different locations in the RBs that carry the ePBCH, scrambling used for ePBCH contexts, and/or CRCs may be determined. At block 1906, the ePBCH may be generated based on the determinations. And at block 1908, the ePBCH may be transmitted in the RBs.

Figure 20:
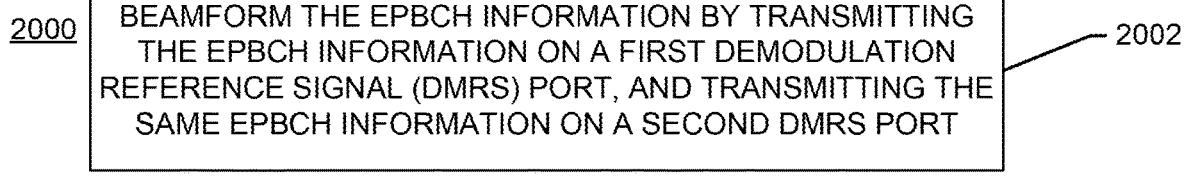
FIG. 20 is a flow diagram illustrating an example method for supporting transmission of an ePBCH in accordance with an embodiment.

FIG. 20 is a flow diagram illustrating an example method 2000 for supporting transmission of an ePBCH in accordance with an embodiment. The method 2000 is described with reference to the example communications system of FIGS. 1A-1E. The method 2000 may be carried out using other architectures, as well.

The method 2000 may be implemented by a network resource (e.g., an eNode-B 160) to steer ePBCH information towards two one more particular locations within a coverage area associated with a cell. At block 2002, the network resource may beamform the ePBCH information by transmitting the ePBCH information on a first DMRS port, and transmitting the same ePBCH information on a second DMRS port.

In some embodiments, the two or more particular locations may be remote from one another. In some embodiments, the first and second DMRS ports may be antenna ports 7 and 8. In some embodiments, the beamforming carried out by the network resource may include the network resource selecting a precoder matrix in accordance with a first one of the two or more locations, and precoding the ePBCH information using the selected precoder matrix. In some embodiments, the transmitting of the ePBCH information on the first DMRS port carried out by the network resource may include transmitting the precoded ePBCH information.

In some embodiments, the beamforming carried out by the network resource may include selecting another precoder matrix in accordance with a second one of the two or more locations, and precoding the same ePBCH information using the selected further precoder matrix. In some embodiments, the transmitting of the same ePBCH information on the second DMRS port may include transmitting the precoded same ePBCH information.

In some embodiments, the network resource may select the precoder matrices that are optimized for the particular two or more locations.

FIG. 21 is a flow diagram illustrating an example method 2100 for supporting reception of ePBCH information in accordance with an embodiment. The method 2100 is described with reference to the example communications system of FIGS. 1A-1E. The method 2100 may be carried out using other architectures, as well.

At block 2102, a WTRU 102 may receive ePBCH information from any of a first antenna port and/or a second antenna port. At block 2104, the WTRU 102 may select one or both of: the ePBCH information received from the first antenna port and/or the second antenna port. At block 2106, the WTRU 102 may decode the selected ePBCH information.

In some embodiments, the decoding of the ePBCH information carried out by the WTRU 102 may include the WTRU 102 decoding only a stronger one of the received signals of the ePBCH information from the first and second antenna ports. In some embodiments, the decoding of the ePBCH information carried out by the WTRU 102 may include the WTRU 102 performing joint detection of the received ePBCH information from the first and second antenna ports.

FIG. 22 is a flow diagram illustrating an example method 2200 for supporting transmission of ePBCH-related information in accordance with an embodiment. The method 2200 is described with reference to the example communications system of FIGS. 1A-1E. The method 2200 may be carried out using other architectures, as well.

The method 2200 may be implemented by a network resource (e.g., an eNode-B 160). The network resource may use the method 2200 may be to configure one or more WTRUs 102 that are within a coverage area of a cell that is associated with it. At block 2202, the network resource may transmit a first set of ePBCH-related information on a first DMRS port. At block 2204, the network resource may transmit a second set of ePBCH-related information on a second DMRS port.

In some embodiments, the first set of ePBCH-related information on the first DMRS port may include a first set of attributes associated with a first type of WTRU 102, and the second set of ePBCH-related information on the second DMRS port may include a second set of attributes associated with a second, different type of WTRU 102. In some embodiments, the first set of ePBCH-related information may support a bandwidth that is wider than a bandwidth supported by the second set of ePBCH-related information.

Figure 23:
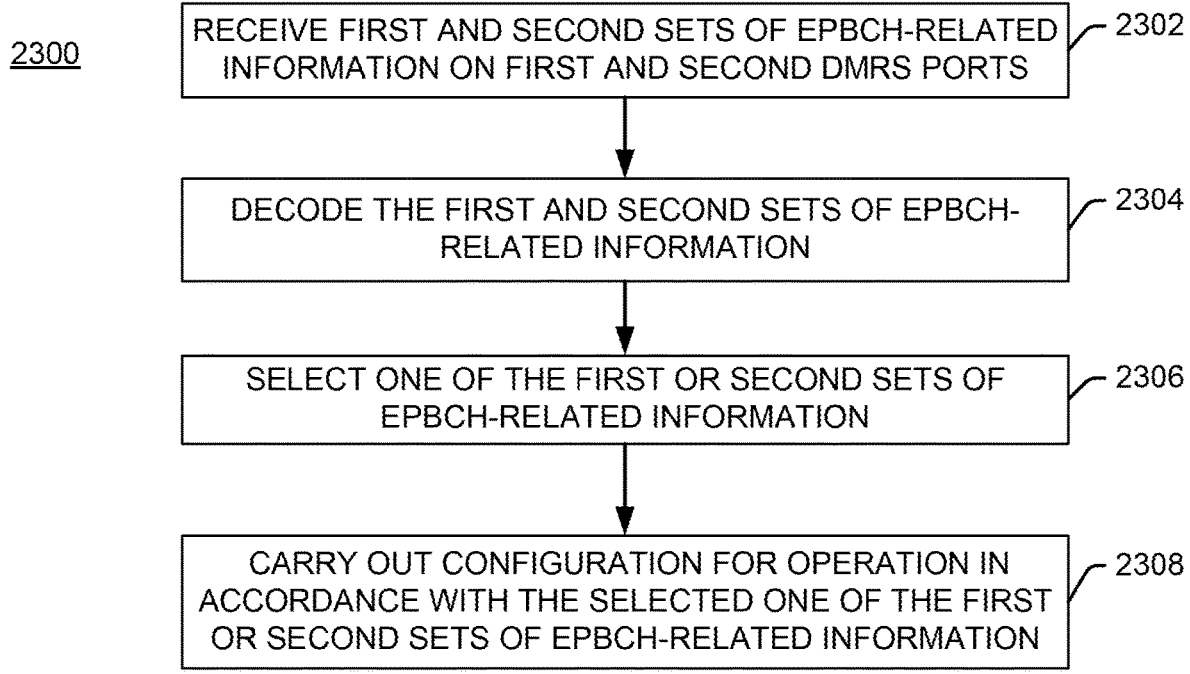
FIG. 23 is a flow diagram illustrating an example method for supporting reception of ePBCH information in accordance with an embodiment.

FIG. 23 is a flow diagram illustrating an example method 2300 for supporting reception of ePBCH information in accordance with an embodiment. The method 2300 is described with reference to the example communications system of FIGS. 1A-1E. The method 2300 may be carried out using other architectures, as well.

At block 2302, a WTRU 102 may receive, from a network resource, first and second sets of ePBCH-related information on first and second DMRS ports, respectively. At block 2304, the WTRU 102 may decode the first and second sets of ePBCH-related information. At block 2306, the WTRU 102 may select one of the first or second sets of ePBCH-related information. At block 2308, the WTRU 102 may configure itself for operation in accordance with the selected one of the first or second sets of ePBCH-related information.

In some embodiment, if the WTRU 102 is of a first type, selection of the first or second sets of ePBCH-related information carried out by the WTRU 102 may include the WTRU 102 selecting the first set of ePBCH-related information and, if the WTRU 102 is of a second type, selection of the first or second sets of ePBCH-related information carried out by the WTRU 102 may include the WTRU 102 selecting the second set of ePBCH-related information.

In some embodiments, the WTRU 102 of the first type may have a first bandwidth capability. In some embodiments, the WTRU 102 of the second type may have a second, higher bandwidth capability.

Figure 24:
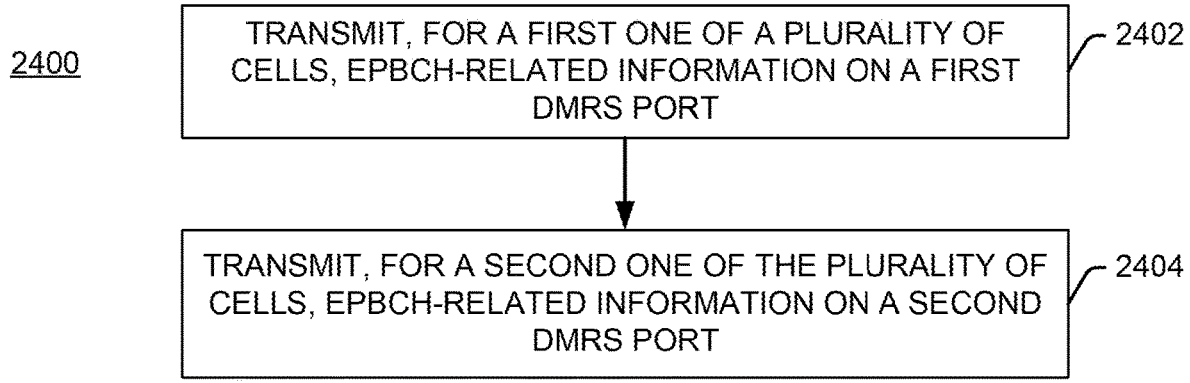
FIG. 24 is a flow diagram illustrating an example method 2400 for supporting transmission of ePBCH-related information in accordance with an embodiment.

FIG. 24 is a flow diagram illustrating an example method 2400 for supporting transmission of ePBCH-related information in accordance with an embodiment. The method 2400 is described with reference to the example communications system of FIGS. 1A-1E. The method 2400 may be carried out using other architectures, as well.

The method 2400 may be implemented by a network resource (e.g., an eNode-B 160). The network resource may use the method 2400 may be to configure one or more WTRUs 102 that are within overlapping coverage areas of a plurality of cells associated with the network resource. At block 2402, the network resource may transmit, for a first one of the plurality of cells, ePBCH-related information on a first DMRS port. At block 2404, the network resource may transmit, for a second one of the plurality of cells, ePBCH-related information on a second DMRS port.

In some embodiments, the ePBCH-related information associated with the first and second ones of the plurality of cells includes an identical set of primary and secondary synchronization signals.

Figure 25:
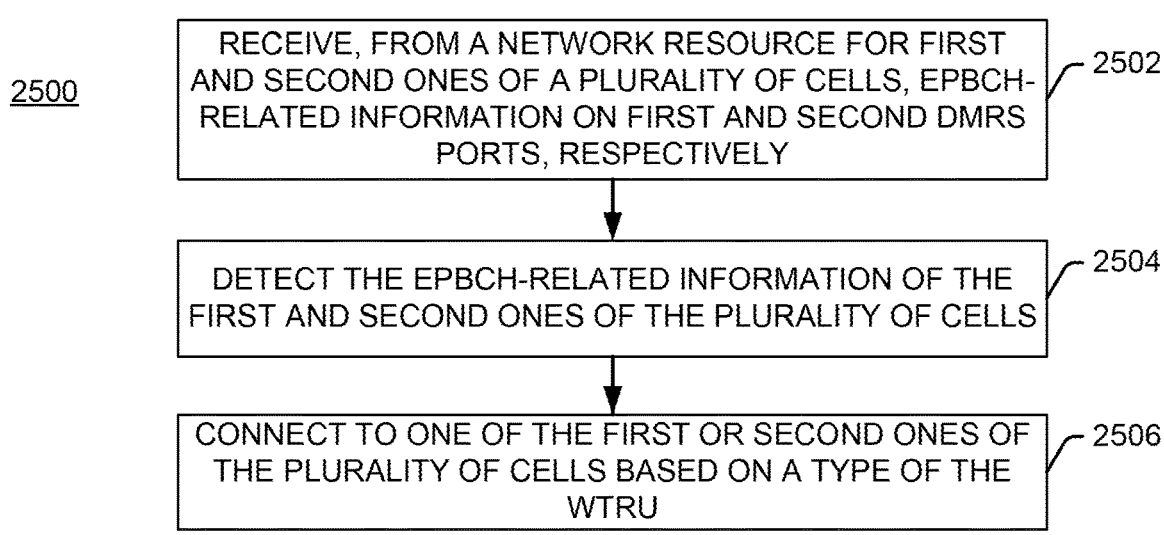
FIG. 25 is a flow diagram illustrating an example method for supporting reception of ePBCH information in accordance with an embodiment.

FIG. 25 is a flow diagram illustrating an example method 2500 for supporting reception of ePBCH information in accordance with an embodiment. The method 2500 is described with reference to the example communications system of FIGS. 1A-1E. The method 2500 may be carried out using other architectures, as well.

At block 2502, a WTRU 102 may receive, from a network resource for first and second ones of a plurality of cells, ePBCH-related information on first and second DMRS ports, respectively. At block 2504, the WTRU 102 may detect the ePBCH-related information of the first and second ones of the plurality of cells. At block 2506, the WTRU 102 may connect to one of the first or second ones of the plurality of cells based on a type of the WTRU.

In some embodiments, the WTRU 102 may determine, based on the received information, the cell identities of the first and second ones of the plurality of cells.

Figure 26:
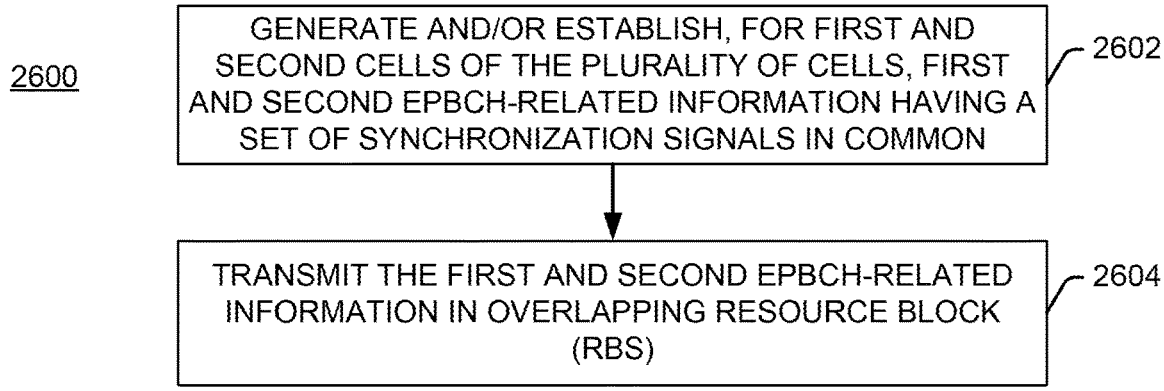
FIG. 26 is a flow diagram illustrating an example method for supporting transmission of ePBCH-related information in accordance with an embodiment.

FIG. 26 is a flow diagram illustrating an example method 2600 for supporting transmission of ePBCH-related information in accordance with an embodiment. The method 2600 is described with reference to the example communications system of FIGS. 1A-1E. The method 2600 may be carried out using other architectures, as well.

The method 2600 may be implemented by a network resource (e.g., an eNode-B 160). The network resource may use the method 2600 may be to configure one or more WTRUs 102 that are within overlapping coverage areas of a plurality of cells associated with the network resource. The plurality of cells may have overlapping resource blocks (RBs).

At block 2602, the network resource may generate/establish, for first and second cells of the plurality of cells, first and second ePBCH-related information. The first and second ePBCH-related information may have a set of synchronization signals in common. At block 2604, the network resource may transmit the first and second ePBCH-related information in the overlapping RBs.

In some embodiments, the network resource may transmit the first and second ePBCH-related information in respective first and second subsets of resource elements in the overlapping RBs. In some embodiments, the network resource may transmit the first and second ePBCH-related information are transmitted on respective first and second DMRS ports.

In some embodiments, the set of synchronization signals may include any of a set of primary synchronization signals and secondary synchronization signals. In some embodiments, the first and second cells may have respective first and second transmission bandwidths, and the first transmission bandwidth encompasses the second transmission bandwidth in whole or in part. In some embodiments, the coverage areas of the plurality of cells may include a first coverage area of the first cell and a second coverage area of the second cell, and the first and second coverage areas partially overlap. In some embodiments, the overlapping coverage areas of the plurality of cells may include a first coverage area of the first cell and a second coverage area of the second cell, and the first coverage area completely overlaps the second coverage area or the second coverage area completely overlays the first coverage area.

Figure 27:
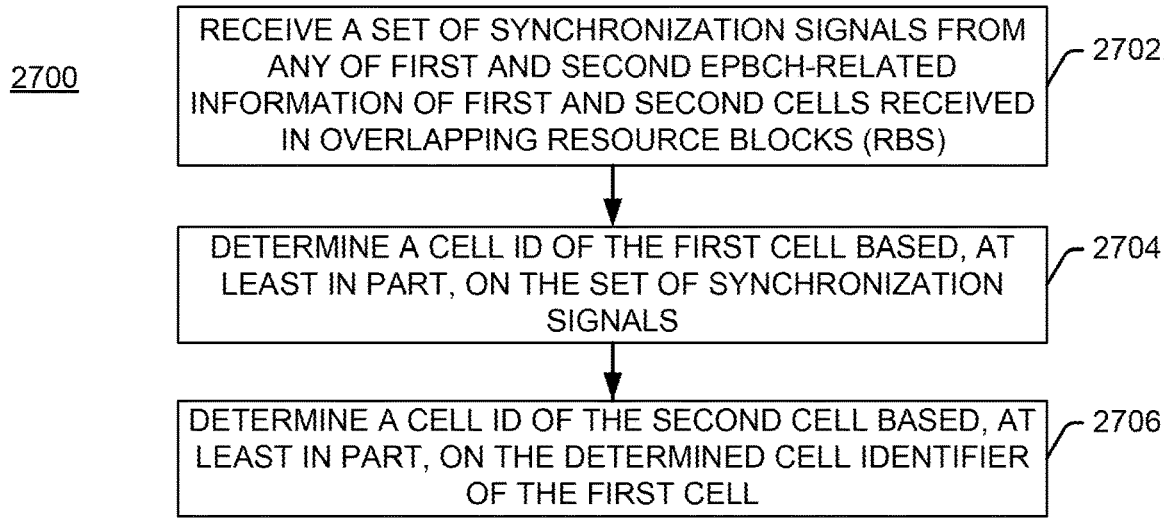
FIG. 27 is a flow diagram illustrating an example method for supporting reception of ePBCH information in accordance with an embodiment.

FIG. 27 is a flow diagram illustrating an example method 2700 for supporting reception of ePBCH information in accordance with an embodiment. The method 2700 is described with reference to the example communications system of FIGS. 1A-1E. The method 2700 may be carried out using other architectures, as well.

The method 2700 may be implemented by a WTRU 102 within overlapping coverage areas of a plurality of cells associated with a network resource, where at least first and second cells of the plurality of cells have overlapping RBs. At block 2702, the WTRU 102 may receive a set of synchronization signals from any of first and second ePBCH-related information of first and second cells received in the overlapping RBs. The received set of synchronization signals is common to both of the first and second ePBCH-related information. At block 2704, the WTRU 102 may determine a cell ID of the first cell based, at least in part, on the set of synchronization signals. In some embodiment, at block 2706, the WTRU 102 may determine a cell ID of the second cell based, at least in part, on the determined cell identifier of the first cell. In some embodiments, the WTRU 102 may determine a cell ID of the second cell based on one or more factors, including any of first and second ePBCH-related information.

In some embodiments, the first and second ePBCH-related information are received in respective first and second subsets of resource elements in the overlapping RBs. In some embodiments, the first and second ePBCH-related information are received on respective first and second DMRS ports.

In some embodiments, the set of synchronization signals may be any of a set of primary synchronization signals and secondary synchronization signals. In some embodiments, the first and second cells have respective first and second transmission bandwidths. In some embodiments, the first transmission bandwidth encompasses the second transmission bandwidth in whole or in part. In some embodiments, the overlapping coverage areas of the plurality of cells may include a first coverage area of the first cell and a second coverage area of the second cell, and the first and second coverage areas partially overlap. In some embodiments, the overlapping coverage areas of the plurality of cells may include a first coverage area of the first cell and a second coverage area of the second cell, and the first coverage area completely overlaps the second coverage area or the second coverage area completely overlays the first coverage area.

In some embodiments, the WTRU 102 may determine which of the first and second cells to use based, at least in part, the respective first and second bandwidths. In some embodiments, the WTRU 102 may determine which of the first and second cells to use based, at least in part, on any of (i) the respective first and second bandwidths, (ii) a WTRU class, and (iii) a WTRU category.

Dormant/Active Cell Operation

Dormant cells generally refer to cells in which no or relatively no DL communications is presently occurring (e.g., dormant), while active cells generally refers to cells in which DL communications is presently occurring (e.g., active). In some deployments, cells may be densely deployed in limited geographic areas. It is contemplated that such cells may not always be equally loaded with WTRUs. To reduce unnecessary interference and/or increase energy savings, cells may operate in one of two states: active or dormant. Dormancy may also imply no transmission of any sync and CRS signals. In various embodiments, procedures are implemented to determine what cells remain or should remain dormant and what cells are to be or should be awoken based on specific WTRU distributions. In various embodiments, representative method may be implemented by which a WTRU may make measurements of a dormant cell to allow for the network to determine whether the dormant cell is to be, may be or should be activated.

Dormant Cell Aperiodic Signal

Dormant cells may transmit aperiodic signals or bursts allowing nearby WTRUs to take measurements. A WTRU 102 may be configured by its serving cell to take one-shot (e.g., one-time) measurements of nearby cells. The WTRU 102 may be configured with a set of resources on which it may take measurements (e.g., may need to take measurements) of nearby dormant cells. Such a configuration may be implemented (e.g., done) via higher layer signaling (i.e. RRC signaling) or may be implemented (done) more dynamically by PHY layer signaling. The configuration may include at least one of: (i) timing of the aperiodic signal in terms of the SFN, subframe, time slot and/or OFDM symbols; (ii) a band of the aperiodic signal in terms of the PRBs, subbands or list of subcarriers; (iii) a sequence used for the aperiodic signal, such as the ZC or Gold sequence and any appropriate cyclic shift; and/or (iv) and orthogonal cover code.

A WTRU 102 may be configured with multiple sets of resources on which it may be triggered to take measurements. Such triggering may be implemented (done) via PHY layer signaling. For example, an existing DCI may be modified to include a bit field indicating to the WTRU 102 what set of resources it should use for its next measurement report. In various embodiments, when triggered by an eNode-B 160 for measurement, the WTRU 102 may indicate the appropriate set of resources (either explicitly, or by a bit field that maps to pre-configured sets of resources).

When taking measurements on the aperiodic signal of a dormant cell, a WTRU 102 may feedback a measurement report if (e.g., only if) the signal satisfies a pre-determined set of quality criteria. In various embodiments, a WTRU 102 may not report the actual measurement. In various embodiments, the report may include a simple indication (e.g., a single bit) informing the serving cell whether it was able to detect a signal in the configured resources. For example, the WTRU 102 may be configured with a threshold and if the measurement exceeds the threshold, the WTRU 102 may send a positive indication to its serving cell.

Inter-Cell Triggering and Configuration of Aperiodic Signal

An aperiodic signal generally refers to a signal sent or transmitted aperiodically (e.g., without a regular periodicity) but also contemplates signals sent as a one-time signal, for example.

These aperiodic signal configurations may be pre-configured for each dormant cell by a controlling cell (such as a Macro cell in the case of dormant small cells), or may be determined, for example, as a function of the cell ID (e.g., implicitly as a function of the cell ID). In various embodiments, a cell may determine (e.g., independently determine) a resource configuration for its dormant-state aperiodic signal and may inform some or all of its neighboring cells, cluster and/or its Macro cell of its chosen configuration. A controlling cell or any neighbor cell may ask, request and/or demand a dormant neighbor cell to trigger the aperiodic signal using the pre-configured resources. This triggering may be done via X2 interface signaling. In various embodiments, a first cell triggering a dormant second cell for aperiodic signaling may also include its desired aperiodic signaling configuration. The dormant cell may use or be required to use the proposed (desired) aperiodic signaling configuration, and may send an acknowledgement signal, for example via the X2 interface, to the first cell indicating that the dormant cell is to trigger the aperiodic signal. In various embodiments, the dormant cell may acknowledge to the first cell, for example via the X2 interface, that it is to perform or will perform aperiodic signaling using another resource configuration. The dormant cell's desired aperiodic signal resource configuration may be indicated (e.g., explicitly indicated) in the acknowledgement message or a bit field may link to a pre-configured list of possible resource configurations.

The aperiodic signal resource configuration may include multiple transmissions of the signal and may be (e.g., thus be) transmitted over multiple time instances. In one embodiment, the time period, for which the aperiodic signal may be transmitted, may be part of the configuration. In various embodiments, the dormant cell may transmit the aperiodic signal until it is instructed and/or commanded, for example via the X2 interface, to stop such a transmission.

WTRU-Triggered Dormant Cell Aperiodic Signal: Trigger Mechanisms

A WTRU 102 may trigger neighbor eNode-Bs 160 to perform a procedure and/or transmit one or some signals. One example of such eNode-Bs 102 may be eNode-Bs that are in the dormant state.

The WTRU 102 may trigger some or all neighbor eNode-Bs 160, e.g., neighbor dormant cells, to initiate transmission(s), by initiating a PRACH transmission according to one or a combination of the following.

1. The WTRU 102 may transmit a PRACH, for example, in one or more reserved PRACH resources, which may be configured by the eNode-B that the WTRU is connected to. These PRACH resources may be monitored by neighbor cells, e.g., neighboring dormant cells.

2. The WTRU 102 may receive implicitly and/or explicitly an indication of a subset of PRACH resources (that may be monitored by neighbor cells, e.g., neighboring dormant cells) to be used for this triggering purpose, for example from the eNode-B 160 that it is connected to. In this case, the WTRU 102 may know or may assume that such resources may not be used for access to a new eNode-B 160 and may be to trigger (e.g., only to trigger) an eNode-B's transmissions and/or events.

3. The WTRU 102 may receive implicitly and/or explicitly a subset of the subframes which include or contain PRACH resources (that may be monitored by neighbor cells, e.g., neighboring dormant cells) to be used for this triggering purpose, for example from the eNode-B 160 that it is connected to. In this case, the WTRU 102 may know or assume that PRACH resources in these subframes may not be used for access to a new eNode-B 160 and may be to trigger (e.g., only to trigger) an eNode-B's transmissions and/or events.

4. Upon the transmission of a PRACH trigger, the WTRU 102 might not expect some or all LTE Rel-10 response signals corresponding to the transmission of a PRACH.

Once an eNode-B 160 receives a trigger, for example initiated by a WTRU 102, the eNode-B 160 may perform a procedure and/or transmit one, some or all of the signals. For the purpose of triggering one, some or all of the neighbor eNode-Bs 160, e.g., neighboring dormant cells, the set of PRACH resources configured to a WTRU 102 may include at least one of, a preamble sequence, PRACH resources (such as the subframe and/or the PRB), as well as a WTRU transmission power.

WTRU-Triggered Dormant Cell Aperiodic Signal: When to Trigger

A WTRU 102 may initiate a PRACH trigger according to one or a combination of the following: (i) the WTRU 102 may receive an explicit and/or implicit request from an eNode-B 160 that it is connected to for initiating the PRACH triggering; and (ii) the WTRU may initiate a PRACH trigger as a function of its measurement and/or traffic condition or some other triggering event.

WTRU-Triggered Dormant Cell Aperiodic Signal: WTRU Expectation after the Trigger Upon the transmission of a PRACH trigger by a WTRU 102, the WTRU 102 may perform some measurements in specific physical resources, e.g., subframe, PRBs and/or OFDM symbols, using one or combination of the following.

1. The WTRU 102 may blindly search, detect and/or measure one or a set of signals, e.g., as a single known signal or a signal out of a known set of signals.

2. The WTRU 102 may determine the subframe and/or time location of the signal to be measured as a function of several factors, such as the subframe and/or PRACH resource used for the PRACH trigger transmission, and/or the system bandwidth, among others.

3. The WTRU 102 may determine the band, e.g., the PRB and/or the OFDM symbols, of the signal to be measured as a function of several factors, such as the subframe and/or the PRACH resource used for the PRACH trigger transmission, and/or the system bandwidth, among others.

For a single PRACH trigger initiated by a WTRU 102, the WTRU 102 may perform several measurements, for example in the same or different physical resources. These resources may have been pre-configured by the serving eNode-B 160, and/or may be a function of the serving eNode-B's cell ID. In various embodiments, the resources used for the signal that the WTRU 102 may, is to, or should measure, upon triggering an aperiodic signal, may be configured by higher layer signaling of the serving eNode-B 160. In various embodiments, the resources used for the signal that the WTRU 102 may, is to or should measure, upon triggering an aperiodic signal, may be dynamically indicated to the WTRU 102, for example in the serving eNode-B command to perform PRACH triggering.

Figure 28:
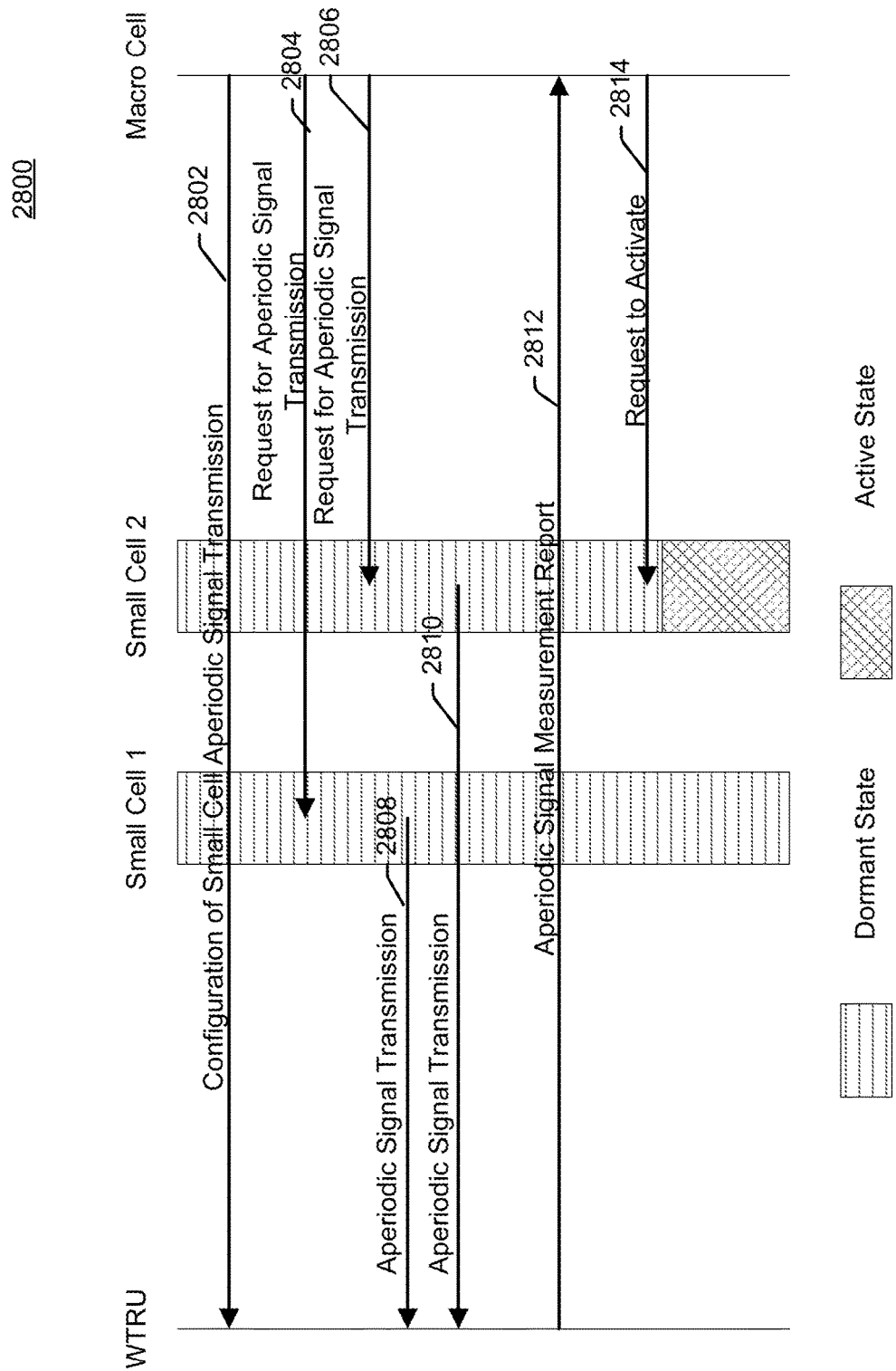
FIG. 28 is a sequence flow diagram illustrating an example method for supporting dormant cell operation in accordance with an embodiment.

FIG. 28 is a sequence flow diagram illustrating an example method 2800 for supporting dormant cell operation in accordance with an embodiment. At 2802, a macro cell may transmit to a WTRU a configuration of small cell aperiodic signal transmission. At 2804, the macro cell may send to a first small cell, a request for aperiodic signal transmission. At 2806, the macro cell may send to a second small cell, a request for aperiodic signal transmission. At 2808, the first small cell may send to the WTRU a first aperiodic signal transmission. At 2810, the second small cell may send to the WTRU a second aperiodic signal transmission. At 2812, the WTRU may send to the macro cell an aperiodic signal measurement report, including measurements associated with one or both of the first and second aperiodic signal transmissions. At 2814, the macro cell may send to the second small cell a request to activate. The request to activate may be generated based on, and/or sent in based on and/or in response to, the aperiodic signal measurement report.

WTRU-Triggered Dormant Cell Aperiodic Signal: WTRU Measurement Reporting

After or following the transmission of a PRACH trigger by a WTRU 102 and the performance of the corresponding measurement(s) by the WTRU 102, the WTRU 102 may transmit an indication of the measurement(s) to its connected eNode-B 160 using one or a combination of the following: (i) the WTRU 102 may inform the eNode-B 160 of the measurement levels; (ii) the WTRU 102 may inform the eNode-B 160 if (and/or when) measurements are higher than a certain threshold (e.g., satisfies the threshold condition); (iii) the WTRU 120 may inform the eNode-B 160 of measurements that are higher than a pre-configured and/or predetermined threshold (e.g., satisfies the pre-configured or predetermined threshold condition); (iv) the WTRU 102 may inform the eNode-B 160 of a type and/or context of the measured (e.g., detected) signals; and (v) the WTRU 102 may inform the eNode-B 160 of a location (for example, latitude, longitude and/or altitude, among others) of the measured (e.g., detected) signals.

Figure 29:
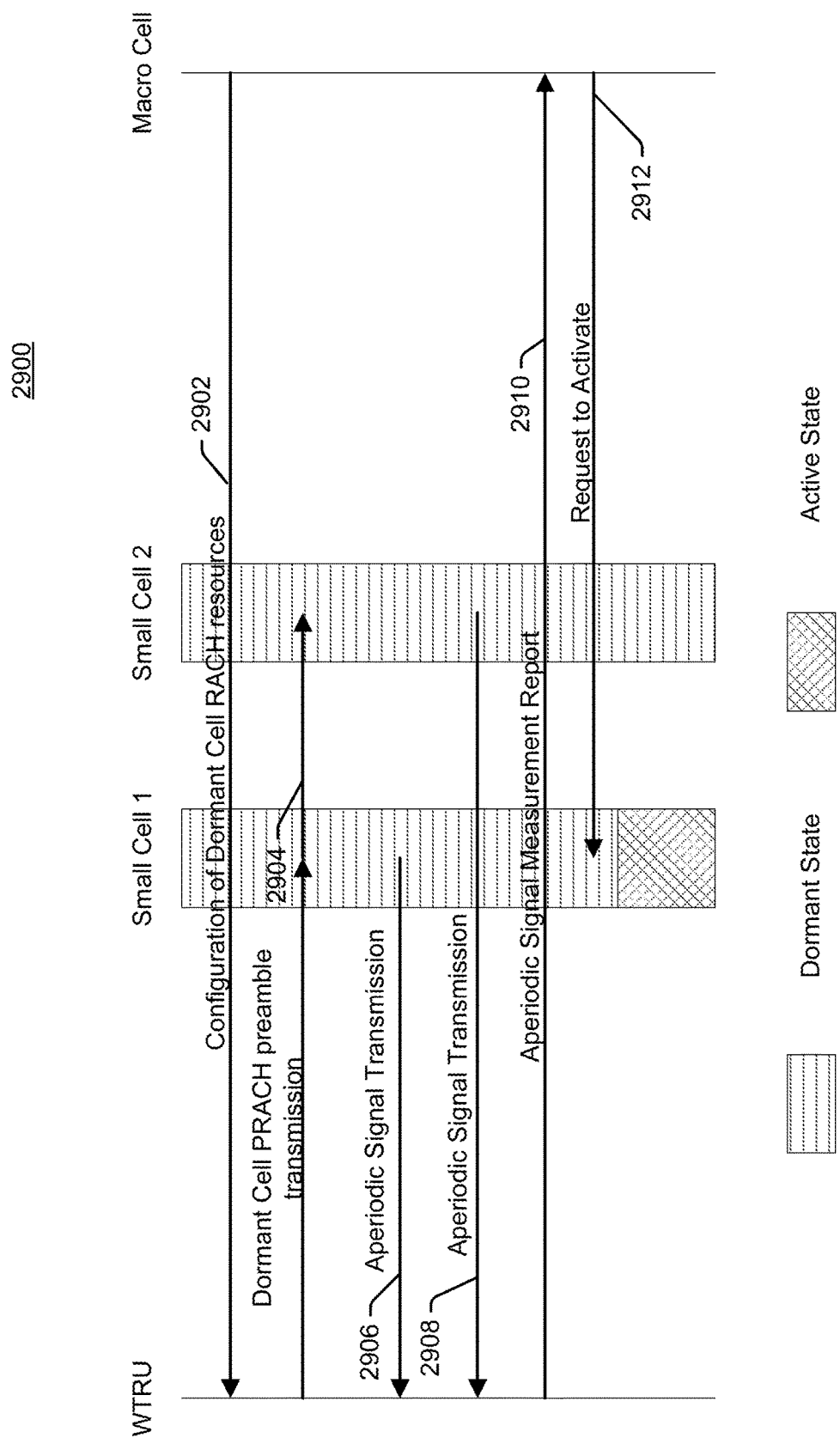
FIG. 29 is a sequence flow diagram illustrating an example method for supporting dormant cell operation in accordance with an embodiment.

FIG. 29 is a sequence flow diagram illustrating an example method 2900 for supporting dormant cell operation in accordance with an embodiment. At 2902, a macro cell may transmit to a WTRU a configuration of small cell aperiodic signal transmission. At 2904, the WTRU may send to first and second small cells respective requests for aperiodic signal transmission. At 2906, the first small cell may send to the WTRU a first aperiodic signal transmission. At 2908, the second small cell may send to the WTRU a second aperiodic signal transmission. At 2910, the WTRU may send to the macro cell an aperiodic signal measurement report, including measurements associated with one or both of the first and second aperiodic signal transmissions. At 2912, the macro cell may send to the first small cell a request to activate. The request to activate may be generated based on, and/or sent in based on and/or in response to, the aperiodic signal measurement report.

Dormant Cell Periodic Signal

Dormant cells may transmit periodic signals on which WTRUs may take measurements. A WTRU 102 may be configured with measurement resources to measure dormant cells. Such resource configurations may include at least one of: (i) timing of the periodic signal, for example, in terms of SFN, subframe, time slot and/or OFDM symbol (including, for example, a periodicity as well as an initial offset); (ii) a band of the periodic signal, for example, in terms of PRBs, subbands and/or a list of subcarriers; (iii) one or more sequences used for the periodic signal, such as a ZC sequence and/or a Gold sequence and any appropriate cyclic shift; and/or (iv) one or more orthogonal cover codes, among others.

The WTRU 102 may also be configured with one or more thresholds to trigger one or more measurement reports for the dormant cells. It is contemplated that the threshold(s) for the dormant cells may be different from thresholds for active cells.

To limit the number of dormant cells, a WTRU 102 may monitor, multiple dormant cells (for example, within a cluster) and the dormant cells may transmit the same periodic signal using the same resource configuration. In various embodiments, some or all (e.g., substantially all) of the dormant cells within a geographic area or a cluster (e.g., a collection of cells, some or all of which may be dormant) may transmit the periodic signal (e.g., the common periodic signal) on a set of resources in an SFN (single frequency network) manner. A WTRU 102 may measure such a cluster-specific periodic signal and if the signal strength is greater than a threshold (e.g., a pre-configured threshold, a cluster-specific periodic signal threshold and/or a pre-configured cluster-specific periodic signal threshold, among others), the WTRU 102 may report to its serving eNode-B 160 either the value of the measurement or an indication that the threshold condition is met (e.g., was satisfied).

In various embodiments, some or all (e.g., substantially all) of the dormant cells may share the resource configuration of the cluster-specific periodic signal. In various embodiments, specific dormant cells (e.g., each specific dormant cell) may actually (e.g., only actually) transmit on a subset of the resources used for cluster-specific periodic signals. For example, the cluster-specific periodic signal may be transmitted in a first subframe of every frame. Respective ones of the cells or each cell may be configured to transmit the periodic signal in a subset of the frames (e.g., only in a subset of frames). This limits the number of cells that may transmit in any one frame and may reduce the delay spread of the signal at the WTRU 102.

A WTRU 102 may not be aware of what cell or cells it may be measuring in any time instance. For example, the triggering of one or more measurement reports may depend on a threshold for cluster-specific periodic signals. The subset of the resources used by cells (e.g., each cell) may be configured by the network or may be chosen by the dormant cells (e.g., each dormant cell, individually).

Serving Cell Actions Upon Reception of a Measurement Report

Upon reception of a measurement report (e.g., whether an actual measurement or an indication that a measurement is sufficient for a threshold and/or exceeded the threshold), the serving cell may indicate, for example via the X2 interface, to some or all dormant cells within the appropriate cluster that at least one of the cells may switch and/or may need to switch to an active state. In various embodiments, such an indication may trigger dormant cells to send cell-specific aperiodic signals. A WTRU 102 may expect (e.g., then expect) to be and/or may be configured with appropriate resources and/or may expect to be and/or may be triggered dynamically to measure the cell-specific aperiodic signals. The WTRU 102 may feedback the appropriate measurements to the network and/or a network resource (such as its serving cell and/or it serving eNode-B).

In various embodiments, the WTRU 102 may indicate specific details about the subset of resources where it obtained the signal that satisfied its reporting criterion and triggered a report. In such cases, the serving cell may be able to request a specific cell to switch to active state and/or to transmit an aperiodic signal.

Request to Switch to Dormant State

A serving cell may trigger a WTRU 102 to report measurements of nearby active cells. The measurements may be RSRP/RSRQ or may be physical layer measurements, via appropriate CSI Process configurations. Based on the measurement report or reports, a cell may determine that one or more of its WTRUs are suffering due to interference caused by a neighbor cell (e.g., being interfered with). A first cell may indicate to a nearby second cell (or neighboring cell), for example via the X2 interface, that the WTRUs associated with or served by the first cell may be or are suffering from interference. The indication may include a set of resources that have significant interference (e.g., above a particular threshold) (for example, the WTRUs that are greatly interfered with) and/or a set of resources where the first cell is intending to schedule such WTRUs. In various embodiments, a first cell may indicate to a second cell (e.g., for example via an X2 interface or otherwise) that, if possible, the second cell is to go and/or should go to (e.g., transition to) a dormant state. Such an indication may also indicate to the second cell that the second cell may handoff the second cell's WTRUs to the first cell. For example, the WTRUs currently served by the second cell may transition (e.g., be handed off) to the first cell. It is contemplated that the handoff may be from the first cell to the second cell, or vice versa.

The second cell may acknowledge the first cell's request, for example, by providing a subset of resources where it may (or may not) expect interference or by indicating whether it (e.g., the second cell) is to or will switch to the dormant state or not.

Dormant Cell RACH Response and WTRU Behavior

Dormant Cell Behavior Upon Reception of a PRACH Preamble

Upon successful reception of a PRACH, based on PRACH resources used (such as the preamble, time/frequency resources, and/or the subframe/frame number), a dormant cell may determine the identity of the first cell that configured the WTRU to perform dormant cell PRACH. The dormant cell may use X2 signaling to indicate to the first cell that the dormant cell was able to successfully receive the PRACH preamble. Furthermore, it may indicate to the first cell the reception power of the PRACH preamble. This may be used by the first cell in the case where multiple dormant cells received the PRACH preamble from a same WTRU 102. The dormant cell may determine the pathloss of the WTRU 102 to dormant cell link in some scenarios, for example, if the dormant cell is made aware of the transmission power the WTRU 102 uses for the PRACH transmission. The transmission power of the WTRU 102 may be known (e.g., explicitly known) at the dormant cell based on a configuration for dormant-cell RACH. In various embodiments, the PRACH preamble selection and/or resources may be tied (e.g., implicitly tied) to specific WTRU transmission powers. The dormant cell may determine the WTRU transmission power based on which PRACH configuration was used. In the case of multiple dormant cells receiving the WTRU's PRACH transmission, the dormant cells may indicate to the first cell the PRACH resources used by the WTRU 102, to enable the first cell to determine which dormant cell is to be or should be turned on.

Upon successful reception of a PRACH and may be after the transmission of such a message to a first cell, the dormant cell may autonomously enter a new state. Such a new state may be turning on (e.g., completely turning on) (e.g., transmitting PSS/SSS, PBCH/SIBs and/or CRS), and/or the state may be beginning the transmission of discovery signals (such as CRS and/or a new discovery signal). The dormant-cell may indicate the state to which it will switch after the transmission of the X2 signal. This may allow the first cell to determine the appropriate action with the WTRU 102.

In various embodiments, the dormant cell may be configured to transmit a response (e.g., a dormant-cell random access response (RAR)) to the WTRU 102. The dormant cell may be pre-configured with certain resources on which to transmit the dormant-cell RAR. In various embodiments, the first cell may indicate a set of resources, for example via the X2 interface, the dormant cell may use to transmit a dormant-cell RAR.

In various embodiments, the dormant-cell may transmit an over-the-air response to the first cell to indicate that the dormant-cell successfully received PRACH preamble from the WTRU 102. Such an indication may indicate to the first cell the following steps the dormant cell may take and may include to which state it may or will switch. Such an over-the-air procedure may use the dormant cell to perform RACH to the first cell. The dormant cell may not actually desire or wish to access the first cell and may wish (e.g., only wish) to inform the first cell of its successfully receiving the WTRUs PRACH preamble.

The RACH process used by the dormant cell may be a single step process, where the dormant cell uses a pre-configured set of resources and preambles to indicate to the first cell that the dormant-cell received the WTRU's PRACH preamble. In various embodiments, sets of PRACH preambles and/or PRACH resources may be used. The dormant cell may select the appropriate configuration based on whether the dormant-cell may or will remain off, enter a new state, and/or become turned on (e.g., completely on).

In various embodiments, the dormant cell may desire or wish to access the first cell to provide the appropriate contents (such as a timing advance, a UL scheduling grant, and/or a WTRU-specific RS configuration, among others) that the first cell may or will include in the dormant-cell RAR that the dormant-cell transmits to the WTRU 102.

WTRU Behavior after Transmitting a Dormant-Cell PRACH Preamble

Upon transmitting a PRACH preamble that may be received by the dormant eNode-Bs, a WTRU 102 may start a timer. Until the expiration of the timer, the WTRU 102 may monitor the channel for a new RAR message or for a modified RAR message applicable for the dormant eNode-Bs. The timer may be configured at the WTRU by the first cell, may be configured to perform PRACH for locating dormant cells. If the timer expires without detecting the response (e.g., the RAR message), the WTRU 102 may indicate to its first cell (e.g., the cell from which it was first connected before beginning the dormant cell RACH procedure) that it was not able to find any dormant cell where it could potentially be or may be handed over. Such an indication may be a higher layer message (such as an RRC message) or may be a physical channel indication. An example of a physical channel indication that the WTRU 102 was not able to find an appropriate dormant cell may be a NACK transmission in a pre-configured PUCCH resource. In various embodiments, upon expiration of such a timer, the WTRU 102 may increase its transmission power by a pre-configured amount and may retransmit the preamble on the preconfigured resources.

Handling a Dormant-Cell RAR from the Dormant Cell

Before the expiration of the timer, the WTRU 102 may expect or monitor for a dormant-cell RAR message from one or more dormant cells. The RAR message may be transmitted to the WTRU 102 using configurations provided a priori by the first cell. For example, upon configuring the WTRU 102 with PRACH resources to attempt to locate (and may be to awaken) a dormant cell, the first cell may provide the WTRU 102 with an appropriate Random Access—radio network temporary identifier (RA)-RNTI and PDCCH configuration to allow the WTRU 102 to decode (e.g., properly decode) the DL assignment where the RAR is included. The WTRU 102 may be informed of the appropriate CRS configuration to allow it to properly demodulate the PDCCH and/or the RAR message from the dormant cell.

In various embodiments, a pre-configured set of WTRU-specific reference symbols (RSs) may be assigned to the WTRU 102 for demodulation of the RAR (e.g., RAR message) from the dormant cells. The configuration of such WTRU-specific RS may include a virtual cell ID to be used for sequence generation and/or a number of ports, among others. The WTRU-specific RSs may be used to demodulate the PDCCH and/or the ePDCCH. The WTRU-specific RSs may be (e.g., may only be) transmitted by a dormant cell upon a first reception of a PRACH from the WTRU 102. The WTRU 102 may begin measuring such WTRU-specific REs from a specific time after the WTRU 102 has transmitted the PRACH. The measurements may be reported back to the first cell (e.g., as a rough estimate of the pathloss to such a dormant cell). In various embodiments, the WTRU 102 may begin (e.g., may only begin) taking measurements on the WTRU-specific RSs when the WTRU 102 decodes (e.g., successfully decodes) an assignment from the dormant cell. This may ensure that the WTRU 102 is indeed measuring WTRU-specific RSs from the dormant cells that have successfully received the PRACH.

In various embodiments, the WTRU 102 may be configured with a DL assignment of the dormant-cell RAR, by the first cell. This assignment may indicate to the WTRU 102: (1) when to expect a dormant-cell RAR; and/or (2) on what resource to expect the dormant cell RAR and using what WTRU-specific RS to use for demodulation. In various embodiments, the WTRU 102 may be configured by the first cell with ePDCCH resources on which to receive and/or expect a DCI for a DL assignment of the dormant-cell RAR.

Representative Contents of the Dormant-Cell RAR Message

The contents of the dormant-cell RAR message may be, for example similar to regular RAR messages and/or may include any of: (1) the index of the random-access preamble sequence that was detected and for which the response is valid; (2) the timing correction calculated by the random-access preamble receiver; (3) a scheduling grant indicating resources the WTRU 102 may or should use for the transmission of message 3; (4) a temporary identity, for example the TC-RNTI that may be used for further communication between the WTRU and the network; (5) reception power, or pathloss, of the PRACH preamble transmission; (6) a frequency or timing offset; and/or (7) configuration of a discovery signal that the WTRU 102 may make measurements on.

In various embodiments, the dormant-cell RAR may (e.g., may only) include a predetermined subset of the information set forth above. In various embodiments, the dormant-cell RAR message may include an identity for identifying the dormant cell that received (e.g., successfully received) the PRACH, for example to enable the WTRU 102 to determine (e.g., properly determine) what cell the WTRU 102 may use. For example, the dormant-cell RAR may include the following: (1) the index of the random-access preamble sequence that was detected and, for example, for which the response is valid; and/or (2) an identity of the dormant cell that detected the preamble sequence.

The identity may reuse the TC-RNTI field and/or the identity may be the cell ID. In various embodiments, the identity may be a bit stream (e.g., a simple bit stream, for example of consecutive or sequential bits) that indicates which dormant cell, of a cluster of dormant cells, was able to receive the WTRU's PRACH preamble. In various embodiments, the WTRU 102 may identify the dormant cell by the RA-RNTI used for the DCI. The WTRU 102 may be pre-configured with a list of possible RA-RNTI to decode looking for a dormant-cell RAR. Depending on the scrambling used (e.g., what scrambling is used) in the DCI, the WTRU 102 may know what dormant-cell is transmitting the dormant-cell RAR. In various embodiments, the WTRU 102 may be pre-configured with multiple CRS or WTRU-specific RS configurations. Depending on the RS used (e.g., what RS is used) for demodulation; the WTRU 102 may identify (e.g., be able to identify) the dormant cell transmitting the dormant-cell RAR.

In various embodiments, the dormant-cell RAR may indicate to the WTRU 102 a specific set of RSs (for example, with the transmission power) on which the WTRU may measure the RSRP to determine the pathloss to the dormant cell.

In various embodiments, the dormant-cell RAR may be a burst of energy in a pre-configured location (e.g., frequency and/or time location). Such a burst may be used by the WTRU 102 for measurements and/or may indicate to the WTRU 102 that the dormant cell has received (e.g., indeed received) the PRACH. The resources used for the burst may be pre-configured. Different resources may have a different indication (or meaning) for the WTRU 102. For example, the set of resources may provide an identity of the dormant cell. In various embodiments, the set of resources used for the burst may indicate to the WTRU 102 a level of quality with which the dormant cell received the PRACH transmission.

In various embodiments, the dormant-cell RAR may use a pseudo-random sequence. The pseudo-random sequence may be generated by a dormant-cell identity and decoding (e.g., proper decoding) of the pseudo-random sequence may indicate to the WTRU 102 which dormant-cell received the WTRU's PRACH preamble.

In various embodiments, the location in time and frequency of a dormant-cell RAR may identify the dormant cell that is transmitting the dormant-cell RAR.

Dormant-Cell RAR Transmitted by a First Cell

In various embodiments, the WTRU 102 may anticipate or expect the dormant-cell RAR to be transmitted from the first cell. The RAR message may indicate to the WTRU 102 that the WTRU 102 has been granted (e.g., is now granted) RSs on which to perform measurements (e.g., conventional measurements). In various embodiments, the message may be a handover command to the dormant cell which has been turned on (e.g., now on (and previously dormant) cell).

WTRU Behavior Upon Reception of Dormant-Cell RAR

Upon reception of the dormant-cell RAR, the WTRU 102 may transmit a message to the first cell indicating a status of the dormant cell search. In various embodiments, when the first cell configures the WTRU 102 with PRACH resources for the dormant cell search (for example, with a configuration for the reception (e.g., proper reception) of dormant-cell RAR and configuration of a timer), the first cell may provide the WTRU 102 with a scheduling grant indicating resources to be used to report that WTRU's findings to the first cell. In various embodiments, the scheduling grant may be included as part of the dormant-cell RAR. The scheduling grant may explicitly indicate the cell ID to use for the sequence generation of the UL DM-RS.

The WTRU 102 may use the scheduling grant to report to the first cell the WTRU's ability (or inability) to locate a dormant-cell. If the WTRU 102 located one or more dormant cells, the WTRU 102 may report to the first cell the identity of the located cells and/or some measurements taken. The WTRU 102 may be configured to report the identity of dormant cells (e.g., all dormant cells) it has located. In various embodiments, the WTRU 102 may report (e.g., may only report) the identity of dormant cells whose measurements have achieved a certain, pre-configured, criterion.

Contention of Dormant-Cell RAR

For example, multiple dormant cells may be capable of receiving a PRACH transmission from the WTRU 102. In such a case, a plurality of dormant cells may transmit one or more dormant-cell RARs. The WTRU 102 may perform measurements on each dormant-cell RAR and may select a subset of dormant cells whose identity the WTRU 102 may report (e.g., report back) to the first cell.

In various embodiments, multiple cells may transmit RARs in the same resources, which may not allow for the WTRU 102 to decode (e.g., properly decode) such transmissions. If the WTRU 102 is aware of one or more collisions of such transmissions, the WTRU 102 may begin the PRACH process anew. In various embodiments, the WTRU 102 may indicate to the first cell that a collision of dormant-cell RAR occurred. To ensure that situations where the WTRU 102 is unable to detect such a collision do not lead to an assumption that those dormant cells did not receive the PRACH transmission, dormant cells may be configured to transmit a redundant acknowledgement, for example, indicating the reception and/or characteristics of the PRACH, to the first cell. This acknowledgement may be via an X2 interface.

Figure 30:
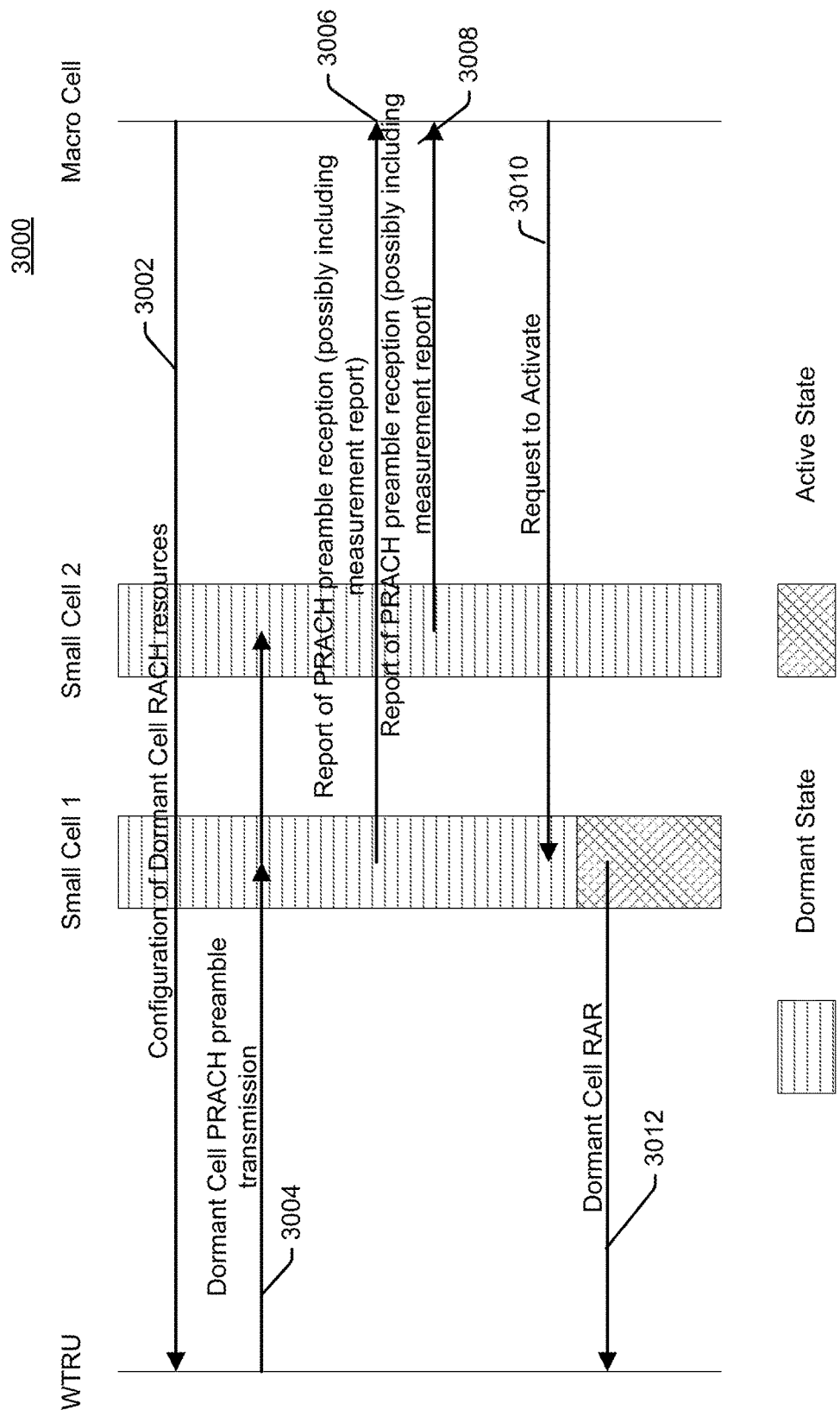
FIG. 30 is a sequence flow diagram illustrating an example method for supporting dormant cell operation in accordance with an embodiment.

FIG. 30 is a sequence flow diagram illustrating an example method 3000 for supporting dormant cell operation in accordance with an embodiment. At 3002, a macro cell may transmit to a WTRU a configuration of dormant cell RACH resources. At 3004, the WTRU may send to first and second small cells respective dormant cell PRACH preamble transmissions. At 3006, the first small cell may send to the macro cell a first report of the PRACH transmission, which may include a measurement report. At 3008, the second small cell may send to the macro cell a second a first report of the PRACH transmission, which may include a measurement report. At 3010, the macro cell may send to the first small cell a request to activate. The request to activate may be generated based on, and/or sent in based on and/or in response to, any of the first and second reports of the PRACH transmission. At 3012, the first small cell may send a dormant-cell RAR to the WTRU.

Figure 31:
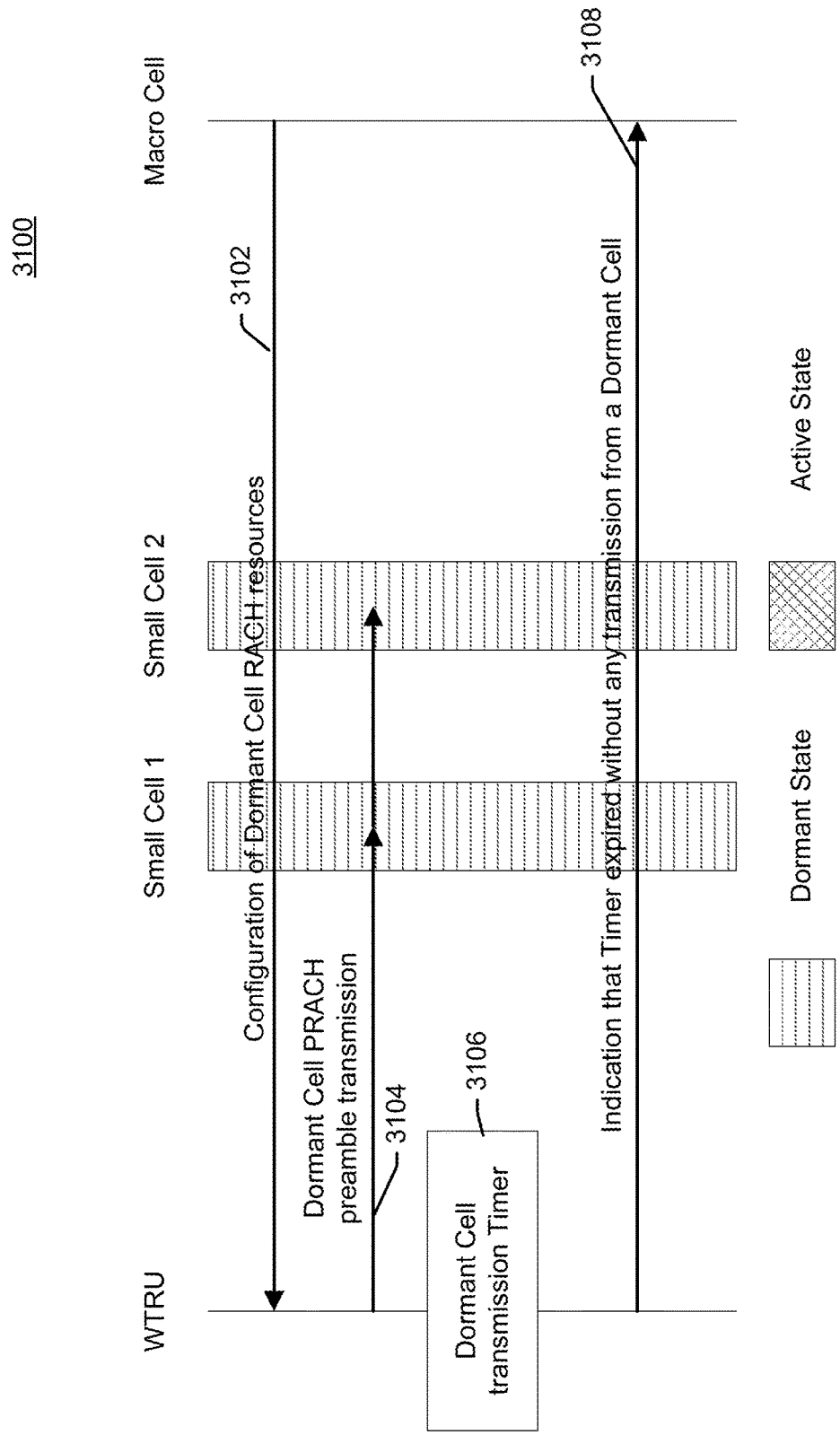
FIG. 31 is a sequence flow diagram illustrating an example method for supporting dormant cell operation in accordance with an embodiment.

FIG. 31 is a sequence flow diagram illustrating an example method 3100 for supporting dormant cell operation in accordance with an embodiment. At 3102, a macro cell may transmit to a WTRU a configuration of dormant cell RACH resources. At 3004, the WTRU may send to first and second small cells respective dormant cell PRACH preamble transmissions. At 3006, the WTRU may initiate a dormant-cell transmission timer. At 3108, the WTRU may send to the macro cell an indication that the WTRU did not receive a transmission from any of the first and second small cell prior to expiration of the dormant-cell transmission timer.

Representative Embodiments

In one or more representative embodiments, a method ("first example method") may include selectively mixing an NCT subframe with one or more other subframe types in a carrier. In one or more representative embodiments, the carrier may be a conventional carrier. In one or more representative embodiments, the carrier may be an NCT carrier.

In one or more representative embodiments, selectively mixing an NCT subframe with one or more other subframe types in a carrier may include selectively mixing the NCT subframe with the one or more other subframe types in a carrier configured in accordance with one of various types of duplex modes. In one or more representative embodiments, the various types of duplex modes may include a FDD mode. In one or more representative embodiments, the various types of duplex modes may include a TDD mode.

In one or more representative embodiments, the one or more other subframe type may include non-NCT subframes. In one or more representative embodiments, the non-NCT subframes may include conventional subframe types. In one or more representative embodiments, the non-NCT subframes may include at least one subframe selected from (i) a normal (e.g., UL and/or DL) subframe, (ii) a special subframe, (iii) a MBSFN subframe, and (iv) an ABS.

In one or more representative embodiments, the NCT subframe may include at least a portion of a subframe defined according to at least one protocol different from conventional subframe types. In one or more representative embodiments, the NCT subframe may include a subframe selected from (i) a CRS-less subframe, (ii) a CRS-limited subframe, (iii) a limited port CRS subframe, (iv) a DM-RS subframe, (v) a non-backward compatible subframe and (vi) a mixed NCT subframe.

In one or more representative embodiments, the NCT subframe may be a CRS-less subframe. In one or more representative embodiments, the CRS-less subframe may include a subframe lacking time/frequency resource reservations and/or occupancies for CRS. In one or more representative embodiments, the CRS-less subframe may include time/frequency resources reservations and/or occupancies for one or more signals, including, any of PDSCH, DM-RS, PRS, and CSI-RS, and such time/frequency resources reservations and/or occupancies are time/frequency resources that would be otherwise reserved and/or occupied for CRS in a conventional subframe type. In one or more representative embodiments, the CRS-less subframe may include a subframe lacking time/frequency resource reservations and/or occupancies for CRS irrespective of a number of antenna ports carried in a PBCH.

In one or more representative embodiments, the NCT subframe may be a CRS-limited subframe. In one or more representative embodiments, the CRS-limited subframe may include a subframe that limits CRS overhead to a given level. In one or more representative embodiments, the CRS-limited subframe may include an amount of time/frequency resource reservations and/or occupancies for CRS, and the CRS-limited subframe may limit CRS overhead by limiting the amount of time/frequency resource reservations and/or occupancies for CRS. In one or more representative embodiments, the given level may be and/or include a level set to minimize the amount of time/frequency resource reservations and/or occupancies for CRS. In one or more representative embodiments, the given level may be and/or include a level set to minimize the amount of time/frequency resource reservations and/or occupancies for CRS (e.g., so as to support a wideband transmission employing CRS). In one or more representative embodiments, the given level may be and/or include a level set to cause the CRS overhead to be less than a CRS overhead associated with a normal or other non-NCT subframe.

In one or more representative embodiments, the CRS-limited subframe may be and/or include a subframe that limits CRS overhead in a time domain. In one or more representative embodiments, the CRS-limited subframe may be and/or include a subframe that limits CRS overhead in a time domain at a level half of a CRS overhead associated with a normal or other non-NCT subframe.

In one or more representative embodiments, the CRS-limited subframe may be and/or include first and second slots, and either the first slot or the second slot may include a set of OFDM symbols for CRS. In one or more representative embodiments, the set of OFDM symbols may be and/or include a subset of OFDM symbols of the CRS-limited subframe specified by temporal sequence of the OFDM symbols of the CRS-limited subframe. In one or more representative embodiments, the set of OFDM symbols may be and/or include a subset of OFDM symbols of the CRS-limited subframe specified by a slot number of the CRS-limited subframe. In one or more representative embodiments, the set of OFDM symbols may be configured by higher layers. In one or more representative embodiments, the set of OFDM symbols may be configured by higher layers and may be carried in a MIB and/or a SIB. In one or more representative embodiments, any of the MIB and/or SIB may be broadcasted and/or received via a broadcast.

In one or more representative embodiments, the CRS-limited subframe may be and/or include a subframe that limits CRS overhead in a frequency domain. In one or more representative embodiments, the CRS-limited subframe may include a set of PRB-pairs. In one or more representative embodiments, a subset of the set of PRB-pairs may include the CRS. In one or more representative embodiments, the subset of the set of PRB-pairs may be and/or include at least one even-numbered PRB-pair of the CRS-limited subframe. In one or more representative embodiments, the subset of the set of PRB-pairs may be and/or include at least one odd-numbered PRB-pair of the CRS-limited subframe.

In one or more representative embodiments, the CRS-limited subframe may include a set of PRB-pairs. In one or more representative embodiments, a first subset of the set of PRB-pairs may include the CRS, and a second subset of the set of PRB-pairs may lack the CRS. In one or more representative embodiments, the first subset may be and/or include at least one even-numbered PRB-pair, and/or the second subset may be and/or include at least one odd-numbered PRB-pair. In one or more representative embodiments, the first subset may be and/or include at least one odd-numbered PRB-pair, and/or the second subset may be and/or include at least one even-numbered PRB-pair. In one or more representative embodiments, the subset of PRB-pairs may be and/or include at least one of the PRB-pairs specified and/or selected in accordance with a bitmap, an indicator for even/odd PRB-pairs, RBGs, etc.

In one or more representative embodiments, the subset of PRB-pairs is configured by higher layers. In one or more representative embodiments, the subset of PRB-pairs are configured by higher layers and carried in a MIB and/or a SIB. In one or more representative embodiments, any of the MIB and/or the SIB may be broadcasted and/or received via a broadcast.

In one or more representative embodiments, the CRS-limited subframe may be and/or include a subframe that limits CRS overhead in an antenna port domain. In one or more representative embodiments, the CRS-limited subframe may be and/or include a subframe that limits CRS for a subset antenna ports. In one or more representative embodiments, the subset antenna ports may be and/or include a minimum set of antenna ports. In one or more representative embodiments, the subset antenna ports may be and/or include a minimum set of antenna ports irrespective of a number of antenna port carried in a PBCH. In one or more representative embodiments, the minimum set of antenna ports may be a single antenna port. In one or more representative embodiments, the single antenna port may be associated with a cell.

In one or more representative embodiments, the subset antenna ports may be and/or include a maximum set of antenna ports. In one or more representative embodiments, the maximum set of antenna ports may be and/or include a predefined maximum number of antenna ports. In one or more representative embodiments, the predefined maximum number of antenna ports may be and/or include a number of antenna ports not to exceed a number of antenna port carried in a PBCH.

In one or more representative embodiments, the NCT subframe may include a plurality of NCT subframes, and the plurality of NCT subframes may be and/or include one or more CRS-less subframes and one or more CRS-limited subframes. In one or more representative embodiments, selectively mixing an NCT subframe with one or more other subframe types in a carrier may include selectively conveying the CRS-less and CRS-limited subframes based on whether the NCT subframe carries a PSS/SSS. In one or more representative embodiments, selectively conveying the CRS-less and CRS-limited subframes comprises selecting a CRS-limited subframe if the NCT subframe carries the PSS/SSS. In one or more representative embodiments, selectively conveying the CRS-less and CRS-limited subframes may include selecting a CRS-less subframe if the NCT subframe lacks the PSS/SSS.

In one or more representative embodiments, selectively mixing an NCT subframe with one or more other subframe types in a carrier may include selectively conveying the CRS-less and CRS-limited subframes based on subframe number. In one or more representative embodiments, selectively conveying the CRS-less and CRS-limited subframes may include selecting a CRS-limited subframe for subframe numbers 0 and 5, and selecting CRS-less subframes for subframe numbers 1, 2, 3, 4, 6, 7, 8, and 9 if defined as NCT subframes.

In one or more representative embodiments, the NCT subframe may be and/or include a mixed NCT subframe. In one or more representative embodiments, the mixed NCT subframe may include a plurality of parts. At least some of the plurality of parts may be and/or include elements of a non-NCT subframe. In one or more representative embodiments, the mixed NCT subframe may be and/or include GP and UpPTS parts, but not a DwPTS part.

In one or more representative embodiments, the mixed NCT subframe may include parts configured as any of a CRS-less subframe, CRS-limited subframe, and any other NCT subframe.

In one or more representative embodiments, the mixed NCT subframe may be used in place of a special subframe in TDD.

In one or more representative embodiments, the mixed NCT subframe may include a set of OFDM symbols defined in accordance with non-NCT subframes and a set of OFDM symbols defined in accordance with an NCT subframe. In one or more representative embodiments, the mixed NCT subframe may include a first set of 7 OFDM symbols defined in accordance with a non-NCT subframe and a second set of 7 OFDM symbols defined in accordance with an NCT subframe. In one or more representative embodiments, the first set of 7 OFDM symbols may include CRS in accordance with a non-NCT subframe and the second set of 7 OFDM symbols may lack CRS.

In one or more representative embodiments, a slot-level configuration for the parts in accordance with a non-NCT subframe and the parts in accordance with the NCT subframe may be used.

In one or more representative embodiments, a subset of PRB-pairs in accordance with a non-NCT subframe and other PRB-pairs in accordance with an NCT subframe may be used.

In one or more representative embodiments, an NCT subframe configuration for FDD may include a subframe lacking PSS/SSS and/or PBCH. In one or more representative embodiments, the NCT subframe configuration may be and/or include a subframe configuration in which subframe nos. 0 and 5 are not configured for NCT subframes.

In one or more representative embodiments, an NCT subframe configuration for FDD may include a subframe lacking paging channels. In one or more representative embodiments, an NCT subframe configuration for FDD may include a subset of HARQ-processes configured as NCT subframes. In one or more representative embodiments, if an eight (8) HARQ process is used, a subset of the HARQ processes thereof may be used for NCT subframes. In one or more representative embodiments, if first and second HARQ processes are used for NCT subframes, then the first and second subframes in every eight (8) downlink subframes may be configured as NCT subframes.

In one or more representative embodiments, the NCT subframe may be configured by higher layers and/or for broadcasting channels.

In one or more representative embodiments, the NCT subframe may be configured with a duty cycle x, and a bitmap may be used. In one or more representative embodiments, the duty cycle x may be one of a set {8, 10, 20, 40, 100} ms.

In one or more representative embodiments, the NCT subframe may be configured with an on/off indicator. In one or more representative embodiments, the NCT subframe configuration may be predefined, and/or whether the NCT subframe is used within a carrier may be configured and/or broadcasted with the on-off indicator. In one or more representative embodiments, the on-off indicator may be one or multiple bits.

In one or more representative embodiments, an NCT subframe configuration for TDD may include an uplink subframe in a cell-specific UL/DL subframe configuration. In one or more representative embodiments, an NCT subframe configuration for TDD may include a specific special subframe configuration. In one or more representative embodiments, the specific special subframe configuration may include DwPTS and UpPTS.

In one or more representative embodiments, an NCT subframe configuration for TDD may include a DL subframe. In one or more representative embodiments, a subset of DL subframes is restricted to non-NCT subframes if it contains PSS/SSS and/or PBCH.

In one or more representative embodiments, among the uplink subframes, a subset may be configured for DL NCT subframes via higher layer signaling and/or one or more broadcasting channels. In one or more representative embodiments, among the UL subframes and special subframes, a subset may be configured for DL NCT subframes via higher layer signaling and/or one or more broadcasting channels.

In one or more representative embodiments, the method may further include: using any of a PDCCH and/or ePDCCH according to subframe and/or search spaces. In one or more representative embodiments, the PDCCH and/or ePDCCH reception behavior may be according to the non-NCT subframe and/or the NCT subframe configurations.

In one or more representative embodiments, the PDCCH may be used for both the WTRU-specific search space and the common search space in a non-NCT subframe, and the ePDCCH may be used for WTRU-specific search space in an NCT subframe. In one or more representative embodiments, the common search space may not be supported in an NCT subframe with ePDCCH, and broadcasting, paging, and PRACH may be supported by the non-NCT subframe. In one or more representative embodiments, a WTRU may receive a DL/UL grant in the NCT subframe.

In one or more representative embodiments, the PDCCH may be used for both WTRU-specific and common search spaces in a non-NCT subframe, and the ePDCCH may be used for both WTRU-specific and common search spaces. In one or more representative embodiments, in a non-NCT subframe, either the PDCCH or the ePDCCH may be used for WTRU-specific search space according to a configuration, and the PDCCH may be used for a common search space. In such representative embodiments, the ePDCCH may be used for an NCT subframe for WTRU-specific search space. In such representative embodiments, a WTRU may receive DL/UL grant in the NCT subframe.

In one or more representative embodiments, in a non-NCT subframe, either the PDCCH or the ePDCCH may be used for WTRU-specific and/or common search spaces according to the configuration, and the ePDCCH may be used for the NCT subframe for WTRU-specific and/or common search space. In such representative embodiments, the ePDCCH configuration may be different according to subframe type.

In one or more representative embodiments, the ePDCCH parameters for a WTRU-specific search space may be independently configured for the non-NCT subframes and/or NCT subframes;

In one or more representative embodiments, two different ePDCCH configurations may be used for the non-NCT subframe and the NCT subframe, respectively, and an ePDCCH starting symbol indicator may be configured independently. In one or more representative embodiments, two different ePDCCH configurations may be used for the non-NCT subframe and the NCT subframe, and an ePDCCH starting symbol indicator may be fixed to zero (0) or other symbol number.

In one or more representative embodiments, the method may further include adapting a transmission scheme according to subframe types. In such representative embodiments, a WTRU may receive, in a non-NCT subframe, a PDSCH with a configured transmission mode according to a DCI format. In one or more representative embodiments, the WTRU may receive, in an NCT subframe, a PDSCH with a predefined transmission scheme. In one or more representative embodiments, the predefined transmission scheme may be fixed regardless of a transmission mode. In one or more representative embodiments, if the NCT subframe is a CRS-less subframe, the transmission scheme may be based on DMRS. In one or more representative embodiments, if the NCT subframe is a CRS-limited subframe, the transmission scheme may be based on DMRS.

In one or more representative embodiments in which a transmission scheme may be adapted according to subframe types, the WTRU may receive, in a non-NCT subframe, a PDSCH with a configured transmission mode according to a DCI format. In one or more representative embodiments in which a transmission scheme may be adapted according to subframe types, the WTRU may receive, in a CRS-limited subframe, a PDSCH with a configured transmission mode according to the DCI format.

In one or more representative embodiments in which a transmission scheme may be adapted according to subframe types, if the NCT subframe is a CRS-limited subframe, the transmission scheme may be based on a transmission mode used for a non-NCT subframe with a reduced number of antenna ports. In one or more representative embodiments in which a transmission scheme may be adapted according to subframe types, the transmission schemes for a PDSCH may be associated with corresponding control channel type. In one or more representative embodiments, the control channel type may be correlated with a demodulation type. In one or more representative embodiments, the WTRU and/or network resources operation may include any of paging, cell re-selection and measurements, radio link monitoring, system information acquisition, and cell type detection.

In one or more representative embodiments, a network resource (e.g., an eNode-B), which may include any of receiver, transmitter and processor, may be configured to perform a method as in at least one of the preceding embodiments. In one or more representative embodiments, a system may be configured to perform a method as in at least one of the preceding embodiments. In one or more representative embodiments, a tangible computer readable storage medium may have stored thereon computer executable instructions for performing a method as in at least one of the preceding embodiments.

In one or more representative embodiments, a network resource may include any of receiver, transmitter and processor, and at least the processor may be configured to selectively mixing an NCT subframe with one or more other subframe types in a carrier. In one or more representative embodiments, the transmitter may transmit the selectively mixed NCT subframes and other subframe types.

In one or more representative embodiments, the transmitter may transmit any of a PDCCH and/or ePDCCH according to subframe and/or search spaces. In one or more representative embodiments, at least the processor may be configured to adapting a transmission scheme according to subframe types.

In one or more representative embodiments, a WTRU may include any of receiver, transmitter and processor, and at least the processor may be configured to receive selectively mixed NCT subframe and other subframe types in a carrier. In one or more representative embodiments, the receiver may receive the selectively mixed NCT subframes and other subframe types.

The above-mentioned features with respect to the first example method (and corresponding apparatuses) may be combined with one or more features described above with respect to selectively mixing NCT subframes with other subframe types.

In one or more representative embodiments, a method ("second example method") may include any of: determining, at a network element (e.g., an eNode-B), whether a WTRU is capable of supporting an NCT carrier; and avoiding paging the WTRU in an NCT cell on condition that the WTRU is not capable of supporting an NCT carrier. In one or more representative embodiments, the method may include paging the WTRU in any of an NCT cell and another carrier type cell on condition that the WTRU is capable of supporting the NCT carrier.

In one or more representative embodiments, the method may further include receiving NCT-capability information indicating whether the WTRU is capable of supporting the NCT carrier. In one or more representative embodiments, the NCT-capability information may be received from the WTRU. In one or more representative embodiments, the NCT-capability information may be included in capability information associated with the WTRU. In one or more representative embodiments, the capability information associated with the WTRU may include radio capability information associated with the WTRU. In one or more representative embodiments, the NCT-capability information may be received by an MME. In one or more representative embodiments, the NCT-capability information may be stored by the MME.

In one or more representative embodiments, a network resource (e.g., an eNode-B), which may include any of receiver, transmitter and processor, may be configured to perform a method as in at least one of the preceding embodiments. In one or more representative embodiments, a system may be configured to perform a method as in at least one of the preceding embodiments. In one or more representative embodiments, a tangible computer readable storage medium may have stored thereon computer executable instructions for performing a method as in at least one of the preceding embodiments.

In one or more representative embodiments, a network resource may include any of receiver, transmitter and processor, and at least the processor may be configured to selectively mixing an NCT subframe with one or more other subframe types in a carrier. In one or more representative embodiments, the transmitter may transmit the selectively mixed NCT subframes and other subframe types.

In one or more representative embodiments, the transmitter may transmit any of a PDCCH and/or ePDCCH according to subframe and/or search spaces. In one or more representative embodiments, at least the processor may be configured to adapting a transmission scheme according to subframe types.

In one or more representative embodiments, a WTRU may include any of receiver, transmitter and processor, and at least the processor may be configured to receive selectively mixed NCT subframe and other subframe types in a carrier. In one or more representative embodiments, the receiver may receive the selectively mixed NCT subframes and other subframe types.

The above-mentioned features with respect to the first and second example methods (and corresponding apparatuses) may be combined with one or more features described above with respect to and/or in connection with selectively mixing NCT subframes with other subframe types.

In one or more representative embodiments, a method ("third example method") implemented in a WTRU may include expecting paging in any of a NCT cell and another carrier type cell on condition that the WTRU is capable of supporting an NCT carrier. In one or more representative embodiments, the method may include providing, to a network element, NCT-capability information indicating whether the WTRU is capable of supporting the NCT carrier. In one or more representative embodiments, the NCT-capability information may be provided using radio resource control (RRC) signaling.

In one or more representative embodiments, a method ("fourth example method") implemented in a network resource (e.g., an eNode-B) may include paging a WTRU in any of a NCT cell and another carrier type cell on condition that the WTRU is capable of supporting an NCT carrier. In one or more representative embodiments, the method may include receiving, at the network element, NCT-capability information indicating whether the WTRU is capable of supporting the NCT carrier. In one or more representative embodiments, the NCT-capability information may be received via radio resource control (RRC) signaling.

In one or more representative embodiments, a network resource (e.g., an eNode-B), which may include any of receiver, transmitter and processor, may be configured to perform a method as in at least one of the preceding embodiments directed to the third and/or fourth example methods. In one or more representative embodiments, a system may be configured to perform a method as in at least one of the preceding embodiments directed to the third and/or fourth example methods. In one or more representative embodiments, a tangible computer readable storage medium may have stored thereon computer executable instructions for performing a method as in at least one of the preceding embodiments directed to the third and/or fourth example methods.

In one or more representative embodiments, a WTRU may include any of receiver, transmitter and processor, and at least the processor may be configured to expecting paging in any of a NCT cell and another carrier type cell on condition that the WTRU is capable of supporting an NCT carrier. In one or more representative embodiments, the WTRU may provide, to a network element, NCT-capability information indicating whether the WTRU is capable of supporting the NCT carrier. In one or more representative embodiments, this NCT-capability information may be provided using radio resource control (RRC) signaling.

In one or more representative embodiments, a network resource may include any of receiver, transmitter and processor, and at least the transmitter may be configured to page a WTRU in any of a NCT cell and another carrier type cell on condition that the WTRU is capable of supporting an NCT carrier. In one or more representative embodiments, the network resource may receive NCT-capability information indicating whether the WTRU is capable of supporting the NCT carrier. In one or more representative embodiments, the NCT-capability information may be received via radio resource control (RRC) signaling.

The above-mentioned features with respect to the third and fourth example methods (and corresponding apparatuses) may be combined with one or more features described above with respect to and/or in connection with paging a WTRU in an NCT cell.

In one or more representative embodiments, a method ("fifth example method") implemented in a WTRU may include at least one of: camping on a cell; detecting, in an idle mode, a NCT cell; and re-selecting to the NCT cell on condition that the WTRU is capable of supporting an NCT carrier. In one or more representative embodiments, re-selecting to the NCT cell may include re-selecting to the NCT cell irrespective of a priority of the camped-on cell. In one or more representative embodiments, re-selecting to the NCT cell may include re-selecting to the NCT cell on condition that the NCT cell is a highest ranked cell. In one or more representative embodiments, re-selecting to the NCT cell may include re-selecting to the NCT cell on condition that the NCT cell is on the same frequency as the camped-on cell.

In one or more representative embodiments, the method may include adjusting priority of the NCT cell to prioritize the NCT cell over the camped-on cell. In one or more representative embodiments, re-selecting to the NCT cell may include re-selecting to the NCT cell based on the adjusted priority of the NCT cell.

In one or more representative embodiments, a network resource (e.g., an eNode-B), which may include any of receiver, transmitter and processor, may be configured to perform a method as in at least one of the preceding embodiments directed to the fifth example method. In one or more representative embodiments, a system may be configured to perform a method as in at least one of the preceding embodiments directed to the fifth example method. In one or more representative embodiments, a tangible computer readable storage medium may have stored thereon computer executable instructions for performing a method as in at least one of the preceding embodiments directed to the fifth example method.

In one or more representative embodiments, a WTRU may include any of receiver, transmitter and processor, and at least the processor may be configured to camp on a cell; detect, in an idle mode, a NCT cell; and/or re-select to the NCT cell on condition that the WTRU is capable of supporting an NCT carrier. In one or more representative embodiments, at least the processor may be configured to re-select to the NCT cell irrespective of a priority of the camped-on cell. In one or more representative embodiments, at least the processor may be configured to re-select to the NCT cell may on condition that the NCT cell is a highest ranked cell. In one or more representative embodiments, at least the processor may be configured to re-select to the NCT cell on condition that the NCT cell is on the same frequency as the camped-on cell.

In one or more representative embodiments, at least the processor may be configured to adjust priority of the NCT cell to prioritize the NCT cell over the camped-on cell. In one or more representative embodiments, at least the processor may be configured to re-select to the NCT cell based on the adjusted priority of the NCT cell.

The above-mentioned features with respect to the fifth example method (and corresponding apparatuses) may be combined with one or more features described above with respect to and/or in connection with cell selection and/or re-selection in view of NCT cells.

In one or more representative embodiments, a method ("sixth example method") implemented in a WTRU may include prioritizing a NCT cell over another carrier type cell when performing any of cell re-selection and cell selection.

In one or more representative embodiments, a WTRU may include any of receiver, transmitter and processor, and at least the processor may be configured to prioritize a NCT cell over another carrier type cell when performing any of cell re-selection and cell selection.

In one or more representative embodiments, a network resource (e.g., an eNode-B), which may include any of receiver, transmitter and processor, may be configured to perform a method as in at least one of the preceding embodiments directed to the sixth example method. In one or more representative embodiments, a system may be configured to perform a method as in at least one of the preceding embodiments directed to the sixth example method. In one or more representative embodiments, a tangible computer readable storage medium may have stored thereon computer executable instructions for performing a method as in at least one of the preceding embodiments directed to the sixth example method.

The above-mentioned features with respect to the sixth example method (and corresponding apparatuses) may be combined with one or more features described above with respect to and/or in connection with cell selection and/or re-selection in view of NCT cells.

In one or more representative embodiments, a method ("seventh example method") may include at least one of: providing, from a network element, information for restricting handover to a cell other than a NCT cell for a WTRU not capable of supporting the NCT carrier; and blocking the WTRU from handing over to the NCT cell. In one or more representative embodiments, the method may further include permitting the WTRU to handover to the cell.

In one or more representative embodiments, a network resource (e.g., an eNode-B), which may include any of receiver, transmitter and processor, may be configured to perform a method to at least one of the preceding embodiments directed to the seventh example method. In one or more representative embodiments, a system may be configured to perform a method as in, and/or a complementary method to, at least one of the preceding embodiments directed to the seventh example method. In one or more representative embodiments, a tangible computer readable storage medium may have stored thereon computer executable instructions for performing a method as in, and/or a complementary method to, at least one of the preceding embodiments directed to the seventh example method.

In one or more representative embodiments, a network resource (e.g., an eNode-B) may include any of receiver, transmitter and processor, and at least the processor may be configured to provide information for restricting handover to a cell other than a NCT cell for a WTRU not capable of supporting the NCT carrier; and/or block the WTRU from handing over to the NCT cell. In one or more representative embodiments, the network resource may be configured to permit the WTRU to handover to the cell.

The above-mentioned features with respect to the seventh example method (and corresponding apparatuses) may be combined with one or more features described above with respect to and/or in connection with handover in view of an NCT carrier.

In one or more representative embodiments, a method ("eighth example method") implemented by a WTRU served by a NCT cell may include any of: receiving, by the WTRU from the NCT cell, a MBSFN subframe configuration; and determining, by the WTRU, an allocated paging frame and/or an allocated paging occasion for the WTRU based on the received MBSFN subframe configuration of the NCT cell. In one or more representative embodiments, the MBSFN subframes may include at least one of: subframes 0, 4, 5, and/or 9. In one or more representative embodiments, the method may further include allocating paging occasion based on MBSFN subframe configuration and WTRU ID. In one or more representative embodiments, the receiving of the MBSFN subframe configuration may include obtaining a bitmap representing a MBSFN subframe patterns.

In one or more representative embodiments, a network resource (e.g., an eNode-B), which may include any of receiver, transmitter and processor, may be configured to perform a method complementary to at least one of the preceding embodiments directed to the eighth example method. In one or more representative embodiments, a system may be configured to perform a method as in, and/or a method complementary to, at least one of the preceding embodiments directed to the eight example method. In one or more representative embodiments, a tangible computer readable storage medium may have stored thereon computer executable instructions for performing a method as in, and/or a method complementary to, at least one of the preceding embodiments directed to the eighth example method.

In one or more representative embodiments, a WTRU served by a NCT cell may include any of: receiver, transmitter and processor, and at least the processor may be configured to receive, a MBSFN subframe configuration; and/or determine an allocated paging frame and/or an allocated paging occasion for the WTRU based on the received MBSFN subframe configuration of the NCT cell.

The above-mentioned features with respect to the eighth example method (and corresponding apparatuses) may be combined with one or more features described above with respect to and/or in connection with MBMS in view of an NCT carrier, such as described above with respect to one or more of the FIGS. 7-16.

In one or more representative embodiments, a method ("ninth example method") implemented by a WTRU served by a NCT cell, may include any of: receiving, by the WTRU, information in a SIB indicating a subframe index of a non-MBSFN subframe of an NCT frame; monitoring, by the WTRU, an ePDCCH to derive a MCCH change notification schedule; and receiving, by the WTRU from the NCT cell, a notification for an upcoming MCCH change in a non-MBSFN subframe of an NCT frame in accordance with the derived MCCH change notification schedule.

In one or more representative embodiments, the method may further include any of: receiving, by the WTRU, a DCI format scrambled with a MBMS radio network temporary identifier (M-RNTI) in the non-multicast broadcast single frequency network (non-MBSFN) subframe; and decoding, by the WTRU, the DCI format in the non-MBSFN subframe using the M-RNTI.

In one or more representative embodiments, a network resource (e.g., an eNode-B), which may include any of receiver, transmitter and processor, may be configured to perform a method complementary to at least one of the preceding embodiments directed to the ninth example method. In one or more representative embodiments, a system may be configured to perform a method as in, and/or a method complementary to, at least one of the preceding embodiments directed to the ninth example method. In one or more representative embodiments, a tangible computer readable storage medium may have stored thereon computer executable instructions for performing a method as in, and/or a method complementary to, at least one of the preceding embodiments directed to the ninth example method.

In one or more representative embodiments, a WTRU served by a NCT cell may include any of receiver, transmitter and processor, and at least the processor may be configured to receive information in a SIB indicating a subframe index of a non-MBSFN subframe of an NCT frame; monitor an ePDCCH to derive a MCCH change notification schedule; and/or receive from the NCT cell, a notification for an upcoming MCCH change in a non-MBSFN subframe of an NCT frame in accordance with the derived multicast control channel (MCCH) change notification schedule.

The above-mentioned features with respect to the ninth example method (and corresponding apparatuses) may be combined with one or more features described above with respect to and/or in connection with MBMS in view of an NCT carrier, such as described above with respect to one or more of the FIGS. 7-16.

In one or more representative embodiments, a method ("tenth example method") implemented by a WTRU served by a NCT cell, may include any of: receiving, by the WTRU, a MBSFN subframe; receiving, by the WTRU, an MBSFN reference signal; and demodulating information in the MBSFN subframe using the MBSFN reference signal.

In one or more representative embodiments, the method may further include receiving a PDSCH transmission in the MBSFN subframe. In one or more representative embodiments, the method may further include determining whether an upcoming MBSFN subframe is used for one of: (1) unicast transmission with a normal CP on a PDSCH; or (2) a PMCH transmission.

In one or more representative embodiments, the method may further include: reading, by the WTRU, a MCH transmission schedules and, MCH scheduling information in first scheduled subframe of each MTCH; and determining MBSFN subframes that are scheduled for the PMCH transmission and/or that are scheduled for PDSCH transmission.

In one or more representative embodiments, the method may further include: receiving a MBSFN subframe pattern; reading each bit of the MBSFN subframe pattern; and determining, based on a logic level of a respective bit, whether a corresponding MBSFN subframe is for one of: (1) PMCH transmission; or (2) PDSCH transmission.

In one or more representative embodiments, the method may further include: monitoring, by the WTRU, for information with a normal CP, if the upcoming MBSFN subframe is used for the PDSCH transmission, or the information with an extended CP, if the upcoming MBSFN subframe is scheduled for the PMCH transmission based on the determined logic level of a corresponding bit.

In one or more representative embodiments, the MBSFN subframe may have an extended CP in its entirety for a PMCH transmission; and the demodulating of the information may include demodulating the PMCH in the MBSFN subframe.

In one or more representative embodiments, a network resource (e.g., an eNode-B), which may include any of receiver, transmitter and processor, may be configured to perform a method complementary to at least one of the preceding embodiments directed to the tenth example method. In one or more representative embodiments, a system may be configured to perform a method as in, and/or a method complementary to, at least one of the preceding embodiments directed to the tenth example method. In one or more representative embodiments, a tangible computer readable storage medium may have stored thereon computer executable instructions for performing a method as in, and/or a method complementary to, at least one of the preceding embodiments directed to the tenth example method.

In one or more representative embodiments, a WTRU served by a NCT cell may include any of receiver, transmitter and processor, and at least the processor may be configured to receive a MBSFN subframe; receive an MBSFN reference signal; and/or demodulate information in the MBSFN subframe using the MBSFN reference signal. In one or more representative embodiments, the transmitter and/or the processor may be configured to receive a PDSCH transmission in the MBSFN subframe. In one or more representative embodiments, the processor may be configured to determine whether an upcoming MBSFN subframe is used for one of: (1) unicast transmission with a normal CP on a PDSCH; or (2) a PMCH transmission.

In one or more representative embodiments, the processor may be configured to read a MCH transmission schedules and, MCH scheduling information in first scheduled subframe of each MTCH; and/or determine MBSFN subframes that are scheduled for the PMCH transmission and/or that are scheduled for PDSCH transmission.

In one or more representative embodiments, the receiver and/or the processor may be configured to receive a MBSFN subframe pattern; read each bit of the MBSFN subframe pattern; and/or determine, based on a logic level of a respective bit, whether a corresponding MBSFN subframe is for one of: (1) PMCH transmission; or (2) PDSCH transmission.

In one or more representative embodiments, at the processor may be configured to monitor for information with a normal CP, if the upcoming MBSFN subframe is used for the PDSCH transmission or the information with an extended CP, if the upcoming MBSFN subframe is scheduled for the PMCH transmission based on the determined logic level of a corresponding bit. In one or more representative embodiments, the MBSFN subframe may have an extended CP in its entirety for a PMCH transmission; and the demodulating of the information may include demodulating the PMCH in the MBSFN subframe.

The above-mentioned features with respect to the tenth example method (and corresponding apparatuses) may be combined with one or more features described above with respect to and/or in connection with MBMS in view of an NCT carrier, such as described above with respect to one or more of the FIGS. 7-16.

In one or more representative embodiments, a method ("eleventh example method") implemented by a WTRU served by a NCT cell, where a MBSFN subframe of the NCT cell has a non-MBSFN region of a single normal CP symbol and an extended MBSFN region for the PMCH transmission, may include any of: receiving, by the WTRU, information in the non-MBSFN region including: (i) a binary indication indicating whether an upcoming MBSFN region is used for the PMCH transmission with an extended CP or for PDSCH transmission with a normal CP, and/or (ii) a bitmap indicator indicating an upcoming change to a control channel in the one symbol non-MBSFN region; and configuring, by the WTRU, operation of the WTRU according to the received information.

In one or more representative embodiments, a network resource (e.g., an eNode-B), which may include any of receiver, transmitter and processor, may be configured to perform a method complementary to at least one of the preceding embodiments directed to the eleventh example method. In one or more representative embodiments, a system may be configured to perform a method as in, and/or a method complementary to, at least one of the preceding embodiments directed to the eleventh example method. In one or more representative embodiments, a tangible computer readable storage medium may have stored thereon computer executable instructions for performing a method as in, and/or a method complementary to, at least one of the preceding embodiments directed to the eleventh example method.

In one or more representative embodiments, a WTRU served by a NCT cell may include any of receiver, transmitter and processor. A MBSFN subframe of the NCT cell may have a non-MBSFN region of a single normal CP symbol and an extended MBSFN region for the PMCH transmission. At least processor may be configured to: receive information in the non-MBSFN region including: (i) a binary indication indicating whether an upcoming MBSFN region is used for the PMCH transmission with an extended CP or for PDSCH transmission with a normal CP, and/or (ii) a bitmap indicator indicating an upcoming change to a control channel in the one symbol non-MBSFN region; and/or configure operation of the WTRU according to the received information.

The above-mentioned features with respect to the eleventh example method (and corresponding apparatuses) may be combined with one or more features described above with respect to and/or in connection with MBMS in view of an NCT carrier, such as described above with respect to one or more of the FIGS. 7-16.

In one or more representative embodiments, a method ("twelfth example method") implemented by a WTRU served by a NCT cell, a MBSFN subframe of the NCT cell having an extended MBSFN region for an entire subframe for the PMCH transmission, the method may include any of: receiving, by the WTRU, the PMCH in normal CP mode; establishing a first set of MBSFN reference patterns different from a set of MBSFN reference patterns used for transmission in an extended CP mode; and decoding the PMCH using the first set of MBSFN reference patterns.

In one or more representative embodiments, a network resource (e.g., an eNode-B), which may include any of receiver, transmitter and processor, may be configured to perform a method complementary to at least one of the preceding embodiments directed to the twelfth example method. In one or more representative embodiments, a system may be configured to perform a method as in, and/or a method complementary to, at least one of the preceding embodiments directed to the twelfth example method. In one or more representative embodiments, a tangible computer readable storage medium may have stored thereon computer executable instructions for performing a method as in, and/or a method complementary to, at least one of the preceding embodiments directed to the twelfth example method.

In one or more representative embodiments, a WTRU served by a NCT cell may include any of receiver, transmitter and processor. A MBSFN subframe of the NCT cell may have an extended MBSFN region for an entire subframe for the PMCH transmission. At least the processor may be configured to: receive the PMCH in normal CP mode; establish a first set of MBSFN reference patterns different from a set of MBSFN reference patterns used for transmission in an extended CP mode; and/or decode the PMCH using the first set of MBSFN reference patterns.

The above-mentioned features with respect to the twelfth example method (and corresponding apparatuses) may be combined with one or more features described above with respect to and/or in connection with MBMS in view of an NCT carrier, such as described above with respect to one or more of the FIGS. 7-16.

In one or more representative embodiments, a method ("thirteenth example method") implemented by a WTRU served by a NCT cell, where an ePBCH may be sent by the NCT cell and may include basic information for WTRU control, the method may include any of: receiving, by the WTRU, the ePBCH; and demodulating, by the WTRU, the ePBCH based on a DMRS.

In one or more representative embodiments, the demodulating may be further based on any of: (1) a primary synchronization signal (PSS); (2) a secondary synchronization signal (SSS); and/or (3) a cell-specific reference signal (CRS).

In one or more representative embodiments, the demodulating of the ePBCH may be based on a single or multiple DMRS and the method may further include: determining, by the WTRU, a DMRS port for the ePBCH demodulation according to one of: (1) a predefined DMRS port; or (2) a function of a cell ID, a PSS index and/or an SSS. index; and (3) a blind detection of the DMRS port out of a predefined set of DMRS ports.

In one or more representative embodiments, the demodulating of the ePBCH may be based on a plurality of DMRS ports, and the method may further include: selecting, by the WTRU, one of the plurality of DMRS ports; associating available sets of resource elements to the selected one of the DMRS ports; and demodulating the ePBCH in the resource elements associated with the selected one of the DMRS ports using the selected one of the DMRS ports.

In one or more representative embodiments, the method may further include any of: receiving, by the WTRU, the ePBCH in one or more RBs of a plurality of subframes; and determining, by the WTRU, at least a portion of system frame numbers (SFNs) based on: (1) subframe locations of the ePBCH; (2) locations of the RBs that carry the ePBCH; (3) scrambling used for ePBCH contexts; and/or (4) cyclic redundancy checks (CRCs).

In one or more representative embodiments, the ePBCH may be mapped to one or more resource blocks at any of: (1) a predefined subframe or predefined subframes within a radio frame, (2) a subframe or subframes where positions in the radio frame are a function of cell ID; (3) a subframe or subframes where the positions in the radio frame are a function of a mode of operation; or (4) a subframe or subframes where the positions in the radio frame are a function of frame number or system frame number (SFN). In one or more representative embodiments the location of the RBs carrying the ePBCH may continuously change. In one or more representative embodiments, the ePBCH of a specific subframe may be located in any of: (1) the RBs in a center region; (2) a number of adjacent or distributed RBs; (3) across a predefined bandwidth; (4) the RBs determined as a function of Cell ID; and/or (5) the RBs determined by a blind detection.

In one or more representative embodiments, a network resource (e.g., an eNode-B), which may include any of receiver, transmitter and processor, may be configured to perform a method complementary to at least one of the preceding embodiments directed to the thirteenth example method. In one or more representative embodiments, a system may be configured to perform a method as in, and/or a method complementary to, at least one of the preceding embodiments directed to the thirteenth example method. In one or more representative embodiments, a tangible computer readable storage medium may have stored thereon computer executable instructions for performing a method as in, and/or a method complementary to, at least one of the preceding embodiments directed to the thirteenth example method.

In one or more representative embodiments, a WTRU served by a NCT cell may include any of receiver, transmitter and processor. An ePBCH may be sent by the NCT cell including basic information for WTRU control. At least the processor may be configured to receive the ePBCH; and/or demodulate the ePBCH based on a DMRS.

In one or more representative embodiments, the processor may be configured to demodulate based on any of: (1) a primary synchronization signal (PSS); (2) a secondary synchronization signal (SSS); and/or (3) a cell-specific reference signal (CRS). In one or more representative embodiments, the processor may be configured to demodulate the ePBCH based on a single or multiple DMRS and/or determine a DMRS port for the ePBCH demodulation according to one of: (1) a predefined DMRS port; or (2) a function of a cell ID, a PSS index and/or an SSS index; and (3) a blind detection of the DMRS port out of a predefined set of DMRS ports.

In one or more representative embodiments, the processor may be configured to select one of the plurality of DMRS ports; associate available sets of resource elements to the selected one of the DMRS ports; and/or demodulate the ePBCH in the resource elements associated with the selected one of the DMRS ports using the selected one of the DMRS ports.

In one or more representative embodiments, the receiver and/or the processor may be configured to receive the ePBCH in one or more RBs of a plurality of subframes; and/or determine at least a portion of system frame numbers (SFNs) based on: (1) subframe locations of the ePBCH; (2) locations of the RBs that carry the ePBCH; (3) scrambling used for ePBCH contexts; and/or (4) cyclic redundancy checks (CRCs).

In one or more representative embodiments, the ePBCH may be mapped to one or more resource blocks at any of: (1) a predefined subframe or predefined subframes within a radio frame, (2) a subframe or subframes where positions in the radio frame are a function of cell ID; (3) a subframe or subframes where the positions in the radio frame are a function of a mode of operation; or (4) a subframe or subframes where the positions in the radio frame are a function of frame number or system frame number (SFN). In one or more representative embodiments the location of the RBs carrying the ePBCH may continuously change. In one or more representative embodiments, the ePBCH of a specific subframe may be located in any of: (1) the RBs in a center region; (2) a number of adjacent or distributed RBs; (3) across a predefined bandwidth; (4) the RBs determined as a function of Cell ID; and/or (5) the RBs determined by a blind detection.

In one or more representative embodiments, one or more network resources may be configured to configure adjacent cells to transmit the ePBCH in different subframe and/or RB locations (e.g., to reduce inter-cell interference).

The above-mentioned features with respect to the thirteenth example method (and corresponding apparatuses) may be combined with one or more features described above with respect to and/or in connection with ePBCH, such as described above with respect to one or more of the FIGS. 17-27.

In one or more representative embodiments, a method ("fourteenth example method") may include: configuring adjacent cells to transmit the ePBCH in different subframe and/or RB locations (e.g., to reduce inter-cell interference). In one or more representative embodiments, the method may further include any of: determining (1) subframe locations for the ePBCH; (2) the different locations in the RBs that carry the ePBCH; (3) scrambling used for ePBCH contexts;

and/or (4) cyclic redundancy checks (CRCs); generating the ePBCH based on the determinations; and send the ePBCH in the RBs.

In one or more representative embodiments, one or more network resources (each of which may include any of receiver, transmitter and processor) may be configured to perform a method complementary to at least one of the preceding embodiments directed to the fourteenth example method. In one or more representative embodiments, a system may be configured to perform a method as in, and/or a method complementary to, at least one of the preceding embodiments directed to the fourteenth example method. In one or more representative embodiments, a tangible computer readable storage medium may have stored thereon computer executable instructions for performing a method as in, and/or a method complementary to, at least one of the preceding embodiments directed to the fourteenth example method.

In one or more representative embodiments, one or more network resources; each of which may include any of receiver, transmitter and processor, and at least the processor of at least one of the network resources may be configured to configure adjacent cells to transmit the ePBCH in different subframe and/or RB locations. In one or more representative embodiments, at least the processor of at least one of the network resources may be configured to determine (1) subframe locations for the ePBCH; (2) the different locations in the RBs that carry the ePBCH; (3) scrambling used for ePBCH contexts; and/or (4) cyclic redundancy checks (CRCs); generate the ePBCH based on the determinations; and sending the ePBCH in the RBs.

The above-mentioned features with respect to the fourteenth example method (and corresponding apparatuses) may be combined with one or more features described above with respect to and/or in connection with ePBCH, such as described above with respect to one or more of the FIGS. 17-27.

In one or more representative embodiments, a method ("fifteenth example method") implemented by a network resource to steer ePBCH information towards two one more particular locations within a coverage area associated with a cell, may include: beamforming, by the network resource, ePBCH information by: transmitting the ePBCH information on a first DMRS port, and transmitting the same ePBCH information on a second DMRS port.

In one or more representative embodiments, the two or more particular locations may be remote from one another. In one or more representative embodiments, the first and second DMRS ports may be antenna ports 7 and 8.

In one or more representative embodiments, the beamforming may include any of: selecting a precoder matrix in accordance with a first one of the two or more locations, and precoding the ePBCH information using the selected precoder matrix; and the transmitting of the ePBCH information on the first DMRS port includes transmitting the precoded ePBCH information.

In one or more representative embodiments, the beamforming may include any of selecting a further precoder matrix in accordance with a second one of the two or more locations, and precoding the same ePBCH information using the selected further precoder matrix; and the transmitting of the same ePBCH information on the second DMRS port includes transmitting the precoded same ePBCH information. In one or more representative embodiments, the selecting of the precoder matrix and the further precoder matrix may include selecting the precoder matrix and the further precoder matrix which are optimized for the particular two or more locations.

In one or more representative embodiments, a WTRU may be configured to perform a method complementary to at least one of the preceding embodiments directed to the fifteenth example method. In one or more representative embodiments, a system may be configured to perform a method as in, and/or a method complementary to, at least one of the preceding embodiments directed to the fifteenth example method. In one or more representative embodiments, a tangible computer readable storage medium may have stored thereon computer executable instructions for performing a method as in, and/or a method complementary to, at least one of the preceding embodiments directed to the fifteenth example method.

In one or more representative embodiments, a WTRU may include any of a transmitter, receiver and a processor, and the receiver and/or processor may be configured to receive ePBCH information steered, by a network resource, towards two one more particular locations within a coverage area using beamforming, wherein the same ePBCH information is available on any of first and second DMRS ports.

In one or more representative embodiments, the two or more particular locations may be remote from one another. In one or more representative embodiments, the first and second DMRS ports may be antenna ports 7 and 8.

In one or more representative embodiments, the ePBCH information on the first DMRS port may be precoded using a precoder matrix in accordance with a first one of the two or more locations. In one or more representative embodiments, the ePBCH information on the second DMRS port may be precoded using a further precoder matrix in accordance with a second one of the two or more locations. In one or more representative embodiments, the precoder matrix and the further precoder matrix may include may be optimized for the particular two or more locations.

The above-mentioned features with respect to the fifteenth example method (and corresponding apparatuses) may be combined with one or more features described above with respect to and/or in connection with ePBCH, such as described above with respect to one or more of the FIGS. 17-27.

In one or more representative embodiments, a method ("sixteenth example method") implemented in a WTRU may include any of: receiving, by the WTRU, ePBCH information from any of: a first antenna port and/or a second antenna port; selecting one or both of: the ePBCH information received from the first antenna port and/or the second antenna port; and decoding the ePBCH information.

In one or more representative embodiments, the decoding of the ePBCH information may include decoding only a stronger one of the received signals of the ePBCH information from the first and second antenna ports. In one or more representative embodiments, the decoding of the ePBCH information includes joint detection of the received ePBCH information from the first and second antenna ports.

In one or more representative embodiments, a network resource may be configured to perform a method complementary to at least one of the preceding embodiments directed to the sixteenth example method. In one or more representative embodiments, a system may be configured to perform a method as in, and/or a method complementary to, at least one of the preceding embodiments directed to the sixteenth example method. In one or more representative embodiments, a tangible computer readable storage medium may have stored thereon computer executable instructions for performing a method as in, and/or a method complementary to, at least one of the preceding embodiments directed to the sixteenth example method.

The above-mentioned features with respect to the sixteenth example method (and corresponding apparatuses) may be combined with one or more features described above with respect to and/or in connection with ePBCH, such as described above with respect to one or more of the FIGS. 17-27.

In one or more representative embodiments, a method ("seventeenth example method") implemented by a network resource to configure one or more WTRUs that are within a coverage area of a cell associated with the network resource, may include any of: transmitting, by the network resource, a first set of ePBCH-related information on a first DMRS port; and transmitting, by the network resource, a second set of ePBCH-related information on a second DMRS port.

In one or more representative embodiments, the first set of ePBCH-related information on the first DMRS port may include a first set of attributes associated with a first type of WTRU and/or the second set of ePBCH-related information on the second DMRS port may include a second set of attributes associated with a second, different type of WTRU. In one or more representative embodiments, the first set of ePBCH-related information may support a bandwidth which is wider than a bandwidth supported by the second set of ePBCH-related information.

In one or more representative embodiments, a WTRU may be configured to perform a method complementary to at least one of the preceding embodiments directed to the seventeenth example method. In one or more representative embodiments, a system may be configured to perform a method as in, and/or a method complementary to, at least one of the preceding embodiments directed to the seventeenth example method. In one or more representative embodiments, a tangible computer readable storage medium may have stored thereon computer executable instructions for performing a method as in, and/or a method complementary to, at least one of the preceding embodiments directed to the seventeenth example method.

In one or more representative embodiments, a WTRU that may be within a coverage area of a cell associated with a network resource, may include a receiver, transmitter and a processor, and the receiver and/or processor may be configured to receive, from the network resource, a first set of ePBCH-related information on a first DMRS port and a second set of ePBCH-related information on a second DMRS port. In one or more representative embodiments, the first set of ePBCH-related information on the first DMRS port may include a first set of attributes associated with a first type of WTRU and/or the second set of ePBCH-related information on the second DMRS port may include a second set of attributes associated with a second, different type of WTRU. In one or more representative embodiments, the first set of ePBCH-related information may support a bandwidth which is wider than a bandwidth supported by the second set of ePBCH-related information.

The above-mentioned features with respect to the seventeenth example method (and corresponding apparatuses) may be combined with one or more features described above with respect to and/or in connection with ePBCH, such as described above with respect to one or more of the FIGS. 17-27.

In one or more representative embodiments, a method ("eighteenth example method") implemented by a WTRU may include any of: receiving, by the WTRU from a network resource, first and second sets of ePBCH-related information on first and second DMRS ports, respectively; decoding, by the WTRU, the first and second sets of ePBCH-related information; selecting, by the WTRU, one of the first or second sets of ePBCH-related information; and configuring the WTRU for operation in accordance with the selected one of the first or second sets of ePBCH-related information.

In one or more representative embodiments, if the WTRU is of a first type, then the selecting of the first or second sets of ePBCH-related information may include selecting the first set of ePBCH-related information, and/or, if the WTRU is of a second type, then the selecting of the first or second sets of ePBCH-related information may include selecting the second set of ePBCH-related information. In one or more representative embodiments, the WTRU of the first type may be and/or include a WTRU having a first bandwidth capability. In one or more representative embodiments, the WTRU of the second type may be and/or include a WTRU having a second, higher bandwidth capability.

In one or more representative embodiments, a network resource may be configured to perform a method complementary to at least one of the preceding embodiments directed to the eighteenth example method. In one or more representative embodiments, a system may be configured to perform a method as in, and/or a method complementary to, at least one of the preceding embodiments directed to the eighteenth example method. In one or more representative embodiments, a tangible computer readable storage medium may have stored thereon computer executable instructions for performing a method as in, and/or a method complementary to, at least one of the preceding embodiments directed to the eighteenth example method.

In one or more representative embodiments, a network resource that may be configured to configure WTRUs that may be within a coverage area of a cell associated with the network resource, may include a receiver, transmitter and a processor, and the transmitter and/or processor may be configured to transmit a first set of ePBCH-related information on a first DMRS port and a second set of ePBCH-related information on a second DMRS port. In one or more representative embodiments, the first set of ePBCH-related information on the first DMRS port may include a first set of attributes associated with a first type of WTRU and/or the second set of ePBCH-related information on the second DMRS port may include a second set of attributes associated with a second, different type of WTRU. In one or more representative embodiments, the first set of ePBCH-related information may support a bandwidth which is wider than a bandwidth supported by the second set of ePBCH-related information.

The above-mentioned features with respect to the eighteenth example method (and corresponding apparatuses) may be combined with one or more features described above with respect to and/or in connection with ePBCH, such as described above with respect to one or more of the FIGS. 17-27.

In one or more representative embodiments, a method ("nineteenth example method") implemented by a network resource to configure one or more WTRUs within overlapping coverage areas of a plurality of cells associated with the network resource, may include any of: transmitting, by the network resource for a first one of the plurality of cells, ePBCH-related information on a first DMRS port; and transmitting, by the network resource for a second one of the plurality of cells, ePBCH-related information on a second DMRS port.

In one or more representative embodiments, the ePBCH-related information associated with the first and second ones of the plurality of cells may include an identical set of primary and secondary synchronization signals.

In one or more representative embodiments, a WTRU may be configured to perform a method complementary to at least one of the preceding embodiments directed to the nineteenth example method. In one or more representative embodiments, a system may be configured to perform a method as in, and/or a method complementary to, at least one of the preceding embodiments directed to the nineteenth example method. In one or more representative embodiments, a tangible computer readable storage medium may have stored thereon computer executable instructions for performing a method as in, and/or a method complementary to, at least one of the preceding embodiments directed to the nineteenth example method.

In one or more representative embodiments, a WTRU that may be within a coverage area of a cell associated with the network resource, may include a receiver, transmitter and a processor, and the receiver and/or processor may be configured to receive a first set of ePBCH-related information on a first DMRS port and a second set of ePBCH-related information on a second DMRS port. In one or more representative embodiments, the first set of ePBCH-related information on the first DMRS port may include a first set of attributes associated with a first type of WTRU and/or the second set of ePBCH-related information on the second DMRS port may include a second set of attributes associated with a second, different type of WTRU. In one or more representative embodiments, the first set of ePBCH-related information may support a bandwidth which is wider than a bandwidth supported by the second set of ePBCH-related information.

The above-mentioned features with respect to the nineteenth example method (and corresponding apparatuses) may be combined with one or more features described above with respect to and/or in connection with ePBCH, such as described above with respect to one or more of the FIGS. 17-27.

In one or more representative embodiments, a method ("twentieth example method") implemented by a WTRU, may include any of: receiving, by the WTRU from a network resource for first and second ones of the plurality of cells, ePBCH-related information on first and second DMRS ports, respectively; detecting, by the WTRU, the ePBCH-related information of the first and second ones of the plurality of cells; and connecting, by the WTRU, to one of the first or second ones of the plurality of cells based on a type of the WTRU. In one or more representative embodiments, the method further include determining, based on the received information, cell identities of the first and second ones of the plurality of cells.

In one or more representative embodiments, a network resource may be configured to perform a method complementary to at least one of the preceding embodiments directed to the twentieth example method. In one or more representative embodiments, a system may be configured to perform a method as in, and/or a method complementary to, at least one of the preceding embodiments directed to the twentieth example method. In one or more representative embodiments, a tangible computer readable storage medium may have stored thereon computer executable instructions for performing a method as in, and/or a method complementary to, at least one of the preceding embodiments directed to the twentieth example method.

The above-mentioned features with respect to the twentieth example method (and corresponding apparatuses) may be combined with one or more features described above with respect to and/or in connection with ePBCH, such as described above with respect to one or more of the FIGS. 17-27.

In one or more representative embodiments, a method ("twenty-first example method") implemented by a network resource to configure one or more WTRUs within overlapping coverage areas of a plurality of cells associated with the network resource, wherein the plurality of cells have overlapping resource blocks (RBs), may include any of: generating and/or establishing, for first and second cells of the plurality of cells, first and second ePBCH-related information, wherein the first and second ePBCH-related information have a set of synchronization signals in common; transmitting, by the network resource, the first and second ePBCH-related information in the overlapping RBs.

In one or more representative embodiments, the first and second ePBCH-related information may be transmitted in respective first and second subsets of resource elements in the overlapping RBs. In one or more representative embodiments, the set of synchronization signals may be and/or include any of a set of primary synchronization signals and secondary synchronization signals. In one or more representative embodiments, the first and second ePBCH-related information may be transmitted on respective first and second DMRS ports. In one or more representative embodiments, the first and second cells have respective first and second transmission bandwidths, and wherein the first transmission bandwidth encompasses the second transmission bandwidth in whole or in part.

In one or more representative embodiments, the overlapping coverage areas of the plurality of cells comprises: a first coverage area of the first cell and a second coverage area of the second cell, and wherein the first and second coverage areas partially overlap. In one or more representative embodiments, the overlapping coverage areas of the plurality of cells comprises: a first coverage area of the first cell and a second coverage area of the second cell, and wherein the first coverage area completely overlaps the second coverage area or the second coverage area completely overlays the first coverage area.

In one or more representative embodiments, a WTRU may be configured to perform a method complementary to at least one of the preceding embodiments directed to the twenty-first example method. In one or more representative embodiments, a system may be configured to perform a method as in, and/or a method complementary to, at least one of the preceding embodiments directed to the twenty-first example method. In one or more representative embodiments, a tangible computer readable storage medium may have stored thereon computer executable instructions for performing a method as in, and/or a method complementary to, at least one of the preceding embodiments directed to the twenty-first example method.

The above-mentioned features with respect to the twenty-first example method (and corresponding apparatuses) may be combined with one or more features described above with respect to and/or in connection with ePBCH, such as described above with respect to one or more of the FIGS. 17-27.

In one or more representative embodiments, a method ("twenty-second example method") implemented by a WTRU within overlapping coverage areas of a plurality of cells associated with the network resource, wherein first and second cells of the plurality of cells have overlapping resource blocks (RBs), may include any of: receiving a set of synchronization signals from any of first and second ePBCH-related information of first and second cells received in the overlapping RBs, wherein the set of synchronization signals is common to both of the first and second ePBCH-related information; and determining a cell identifier of the first cell based, at least in part, on the set of synchronization signals.

In one or more representative embodiments, the method may include determining a cell identifier of the second cell based, at least in part, on the determined cell identifier of the first cell. In one or more representative embodiments, the method may include determining a cell identifier of the second cell based on one or more factors, including any of first and second ePBCH-related information.

In one or more representative embodiments, the method may include receiving one or both of the first and second ePBCH-related information. In one or more representative embodiments, the first and second ePBCH-related information may be received in respective first and second subsets of resource elements in the overlapping RBs.

In one or more representative embodiments, the set of synchronization signals may be and/or include any of a set of primary synchronization signals and secondary synchronization signals.

In one or more representative embodiments, the first and second ePBCH-related information may be received on respective first and second DMRS ports. In one or more representative embodiments, the first and second cells may have respective first and second transmission bandwidths. In one or more representative embodiments, the first transmission bandwidth may encompass the second transmission bandwidth in whole or in part.

In one or more representative embodiments, the method may include determining which of the first and second cells to use based, at least in part, the respective first and second bandwidths. In one or more representative embodiments, the method may include determining which of the first and second cells to use based, at least in part, on any of (i) the respective first and second bandwidths, (ii) a WTRU class, and (iii) a WTRU category.

In one or more representative embodiments, the overlapping coverage areas of the plurality of cells may include: a first coverage area of the first cell and a second coverage area of the second cell, and wherein the first and second coverage areas partially overlap. In one or more representative embodiments, the overlapping coverage areas of the plurality of cells may include: a first coverage area of the first cell and a second coverage area of the second cell, and wherein the first coverage area completely overlaps the second coverage area or the second coverage area completely overlays the first coverage area.

In one or more representative embodiments, a network resource may be configured to perform a method complementary to at least one of the preceding embodiments directed to the twenty-second example method. In one or more representative embodiments, a system may be configured to perform a method as in, and/or a method complementary to, at least one of the preceding embodiments directed to the twenty-second example method. In one or more representative embodiments, a tangible computer readable storage medium may have stored thereon computer executable instructions for performing a method as in, and/or a method complementary to, at least one of the preceding embodiments directed to the twenty-second example method.

The above-mentioned features with respect to the twenty-second example method (and corresponding apparatuses) may be combined with one or more features described above with respect to and/or in connection with ePBCH, such as described above with respect to one or more of the FIGS. 17-27.

In one or more representative embodiments, a method ("twenty-third example method") implemented by a WTRU, may include: decoding an ePBCH in a subframe where subframe location is variable within a radio frame. In one or more representative embodiments, variability of the subframe location may be based, at least in part, on a cell identifier. In one or more representative embodiments, the location is identified by a subframe number, and wherein the subframe number is a function at least one of (i) a system frame number, (ii) a cell identifier and (iii) duplex type.

In one or more representative embodiments, a WTRU may be configured to perform a method complementary to at least one of the preceding embodiments directed to the twenty-third example method. In one or more representative embodiments, a system may be configured to perform a method as in, and/or a method complementary to, at least one of the preceding embodiments directed to the twenty-third example method. In one or more representative embodiments, a tangible computer readable storage medium may have stored thereon computer executable instructions for performing a method as in, and/or a method complementary to, at least one of the preceding embodiments directed to the twenty-third example method.

The above-mentioned features with respect to the twenty-third example method (and corresponding apparatuses) may be combined with one or more features described above with respect to and/or in connection with ePBCH, such as described above with respect to one or more of the FIGS. 17-27.

In one or more representative embodiments, a method ("twenty-fourth example method") implemented by a WTRU in a vicinity of a dormant cell, may include any of: receiving, by the WTRU from a dormant cell, a signal; receiving, by the WTRU from a serving cell, a trigger to initiate measurement of one or more dormant cells; and measuring, by the WTRU, the signal.

In one or more representative embodiments, the signal may be an aperiodic signal or a one-time signal; and the measuring of the signal may include measuring timing of the aperiodic signal, a band of the aperiodic signal; a sequence used for the aperiodic signal and/or an orthogonal cover code.

In one or more representative embodiments, the method may further include: receiving, by the WTRU, a bit field indicating to the WTRU a set of resources to be used for a subsequent measurement report.

In one or more representative embodiments, the method may further include: determining, by the WTRU, whether the signal satisfies one or more criteria; and sending, by the WTRU to a serving cell, a measurement report when the one or more criteria are satisfied.

In one or more representative embodiments, the measurement report may include an indicator for indicating whether the WTRU is able to detect the signal in the configured resources.

In one or more representative embodiments, a network resource may be configured to perform a method complementary to at least one of the preceding embodiments directed to the twenty-third example method. In one or more representative embodiments, a system may be configured to perform a method as in, and/or a method complementary to, at least one of the preceding embodiments directed to the twenty-third example method. In one or more representative embodiments, a tangible computer readable storage medium may have stored thereon computer executable instructions for performing a method as in, and/or a method complementary to, at least one of the preceding embodiments directed to the twenty-third example method. The above-mentioned features with respect to the twenty-third example method (and corresponding apparatuses) may be combined with one or more features described above with respect to and/or in connection with dormant/active cells, such as described above with respect to one or more of the FIGS. 28-31.

In one or more representative embodiments, a method ("twenty-fifth example method") implemented by an access point for a dormant cell, may include any of: establishing one or more aperiodic signal configurations for the dormant cell; configuring, by the dormant cell, resources to be used for communicating a dormant-state aperiodic signal of the dormant cell; inform, by the dormant cell, one or more neighboring cells, cell clusters and/or a macro cell of the configured resources to be used for communicating the dormant-state aperiodic signal; receiving, by the dormant cell, a request to trigger the dormant-state aperiodic signal; and sending, by the dormant cell in response to the received request, the dormant-state aperiodic signal using the configured resources.

In one or more representative embodiments, the receiving of the request to trigger the dormant-state aperiodic signal may include receiving, from a neighboring cell via an X2 interface, the request to trigger the dormant-state aperiodic signal.

In one or more representative embodiments, the request to trigger the dormant-state aperiodic signal may include the neighboring cells desired aperiodic signaling configuration and the method may further include sending, by the dormant cell, an acknowledgement signal via the X2 interface to the neighboring cell indicating that the dormant cell is to use the desired aperiodic signaling configuration.

In one or more representative embodiments, the receiving of the request to trigger the dormant-state aperiodic signal may include receiving, from a wireless transmit/receive unit (WTRU) via a physical random access channel (PRACH) transmission, the request to trigger the dormant-state aperiodic signal.

In one or more representative embodiments, a network resource may be configured to perform a method complementary to at least one of the preceding embodiments directed to the twenty-fifth example method. In one or more representative embodiments, a system may be configured to perform a method as in, and/or a method complementary to, at least one of the preceding embodiments directed to the twenty-fifth example method. In one or more representative embodiments, a tangible computer readable storage medium may have stored thereon computer executable instructions for performing a method as in, and/or a method complementary to, at least one of the preceding embodiments directed to the twenty-fifth example method. The above-mentioned features with respect to the twenty-fifth example method (and corresponding apparatuses) may be combined with one or more features described above with respect to and/or in connection with dormant/active cells, such as described above with respect to one or more of the FIGS. 28-31.

In one or more representative embodiments, a method ("twenty-sixth example method") implemented by a WTRU may include any of: monitoring, by the WTRU, for one or more dormant-state signals; measuring, by the WTRU, at least one criteria of each dormant-state signal; comparing, for each dormant-state signal, the at least one criteria to a threshold, as a comparison result; determining, by the WTRU, whether to send a measurement report based on the comparison results; and sending, by the WTRU, the measurement report.

In one or more representative embodiments, the method may include receiving, by the WTRU, a handoff command to handoff the WTRU to one of the dormant cells in the vicinity after sending the measurement report.

In one or more representative embodiments, the one or more dormant-state signals may be aperiodic signals and the method may include initiating, by the WTRU, a physical random access channel (PRACH) transmission, as a request to trigger the one or more dormant-state signals from dormant cells in a vicinity of the WTRU.

In one or more representative embodiments, the monitoring for the one or more dormant-state signals may include any of: blindly searching for the one or more dormant-state signals; and detecting the one or more dormant state signals based on the blind search.

In one or more representative embodiments, the measuring of the at least one criteria of each dormant-state signal may include determine any of: (1) a subframe location of the dormant-state signal; (2) time location of the dormant-state signal; and/or (3) a band of the dormant-state signal, the subframe location, time location and band being functions of subframe resources or physical random access channel (PRACH) resources used for a PRACH trigger transmission.

In one or more representative embodiments, the sending of the measurement report may include transmitting an indication of the measured criteria to a serving cell.

In one or more representative embodiments, the indication of the measured criteria may include any of: (1) one or more measured criteria levels; (2) an indication that one or more measured criteria satisfy a threshold; (3) a type and/or context of the measured dormant-state signals; and/or (4) a location of measured dormant-state signals.

In one or more representative embodiments, the one or more dormant-state signals may be periodic signals; and the measuring of the at least one criteria of each periodic dormant-state signal may include configuring, by the WTRU, measurement resources to measure the at least one criteria of each periodic dormant-state signal associated with a respective dormant cell in the vicinity of the WTRU.

In one or more representative embodiments, the measurement resources may include any of: (1) a timing of the periodic signal (e.g., in terms of SFN, subframe, time slot and/or OFDM symbol); (2) a periodicity of the periodic signal (3) an initial offset of the periodic signal; (3) a time slot of the periodic signal; (4) an OFDM symbol of the periodic signal; (5) a band of the periodic signal; (6) one or more sequences used for the periodic signal; and/or (7) an orthogonal cover code.

In one or more representative embodiments, the monitoring for one or more dormant-state signals may include monitoring multiple dormant cells, as a cluster, that transmit a common periodic signal using a common resource configuration; the measuring of the at least one criteria of each dormant-state signal may include measuring a cluster-specific periodic signal; and the comparing of the at least one criteria to a threshold may include comparing the signal strength to the threshold, as the comparison result such that if the signal strength is greater than the threshold, the measurement report is sent to the serving cell to indicate the comparison result.

In one or more representative embodiments, a network resource may be configured to perform a method complementary to at least one of the preceding embodiments directed to the twenty-sixth example method. In one or more representative embodiments, a system may be configured to perform a method as in, and/or a method complementary to, at least one of the preceding embodiments directed to the twenty-sixth example method. In one or more representative embodiments, a tangible computer readable storage medium may have stored thereon computer executable instructions for performing a method as in, and/or a method complementary to, at least one of the preceding embodiments directed to the twenty-sixth example method. The above-mentioned features with respect to the twenty-sixth example method (and corresponding apparatuses) may be combined with one or more features described above with respect to and/or in connection with dormant/active cells, such as described above with respect to one or more of the FIGS. 28-31.

In one or more representative embodiments, a method ("twenty-seventh example method") implemented by a serving cell serving at least one WTRU, may include any of: receiving, by the serving cell from the WTRU, a measurement report indicating that a measured criteria satisfies a threshold; and informing, by the serving cell to one or more dormant cells within a cluster that at least one of the dormant cells is to switch to an active state.

In one or more representative embodiments, the method may include any of: receiving, by the serving cell, a second measurement report responsive to an aperiodic dormant-state signal being measured by the WTRU; and handing off, by the serving cell based on the second measurement report, the WTRU to a respective one of the dormant cells switched to the active state. In one or more representative embodiments, the informing that at least one of the dormant cells is to switch to the active state may include sending a message via one or more X2 interfaces to inform the at least one of the dormant cells to switch to the active state.

In one or more representative embodiments, a WTRU may be configured to perform a method complementary to at least one of the preceding embodiments directed to the twenty-seventh example method. In one or more representative embodiments, a system may be configured to perform a method as in, and/or a method complementary to, at least one of the preceding embodiments directed to the twenty-seventh example method. In one or more representative embodiments, a tangible computer readable storage medium may have stored thereon computer executable instructions for performing a method as in, and/or a method complementary to, at least one of the preceding embodiments directed to the twenty-seventh example method. The above-mentioned features with respect to the twenty-seventh example method (and corresponding apparatuses) may be combined with one or more features described above with respect to and/or in connection with dormant/active cells, such as described above with respect to one or more of the FIGS. 28-31.

In one or more representative embodiments, a method ("twenty-eighth example method") implemented by a serving cell serving at least one WTRU, may include any of: receiving, by the serving cell from the WTRU, a measurement report indicating interference levels from one or more neighboring active cells; determining, by the serving cell, that one or more of the WTRUs served by the serving cell are suffering due to interference caused by a respective one of the neighboring active cells, as an interfering neighboring active cell; and sending, by the serving cell to the interfering neighboring active cell, an indication of the interference caused by the interfering neighboring active cell.

In one or more representative embodiments, the indication of the interference may include a request for the interfering neighboring active cells to switch to a dormant state. In one or more representative embodiments, the indication of the interference may include a set of resources that have significant interference and/or a set of resources where the serving cell is going to schedule the WTRUs served by the serving cell. In one or more representative embodiments, the indication of the interference may include information to handoff one or more of the WTRUs served by the serving cell to the interfering neighboring active cell. In one or more representative embodiments the indication of the interference may include information to handoff WTRUs served by the interfering neighboring active cell to the serving cell.

In one or more representative embodiments, a WTRU may be configured to perform a method complementary to at least one of the preceding embodiments directed to the twenty-eighth example method. In one or more representative embodiments, a system may be configured to perform a method as in, and/or a method complementary to, at least one of the preceding embodiments directed to the twenty-eighth example method. In one or more representative embodiments, a tangible computer readable storage medium may have stored thereon computer executable instructions for performing a method as in, and/or a method complementary to, at least one of the preceding embodiments directed to the twenty-eighth example method. The above-mentioned features with respect to the twenty-eighth example method (and corresponding apparatuses) may be combined with one or more features described above with respect to and/or in connection with dormant/active cells, such as described above with respect to one or more of the FIGS. 28-31.

In one or more representative embodiments, a method ("twenty-ninth example method") implemented by a network resource associated with a dormant cell, may include any of: receiving, by the network resource of the dormant cell from a WTRU, a PRACH transmission; and determining an identity of a first cell from the received PRACH transmission. In one or more representative embodiments, the received PRACH transmission may include an attribute of the WTRU, and wherein determining an identity of a first cell may include: determining the identity based, at least in part, on the attribute of the WTRU.

In one or more representative embodiments, the method may include sending, by the network resource of the dormant cell via an X2 interface to a network resource of the first cell, an indication that the network resource of the dormant cell received the PRACH transmission.

In one or more representative embodiments, the method may include determining, by the network resource of the dormant cell, attributes of the WTRU, wherein the sending of the indication that the network resource of the dormant cell received the PRACH transmission may include (or further include) sending the determined attributes of the WTRU. In one or more representative embodiments, the determined attributes of the WTRU include any of: (1) a pathloss of the WTRU to the dormant cell; (2) a transmission power of the WTRU for the received PRACH transmission; and/or (3) PRACH resource used by the WTRU.

In one or more representative embodiments, the method may include autonomously, or after reception of an indication to become active, activating the dormant cell by one of: turning on transmission of control information or turning on discovery signals.

In one or more representative embodiments, the method may include any of: receiving, by the network resource of the dormant cell from the first cell, attribute information of the WTRU; and transmitting, by the network resource of the dormant cell to the WTRU, a dormant cell response based on the received attribute information.

In one or more representative embodiments, a WTRU may be configured to perform a method complementary to at least one of the preceding embodiments directed to the twenty-ninth example method. In one or more representative embodiments, a system may be configured to perform a method as in, and/or a method complementary to, at least one of the preceding embodiments directed to the twenty-ninth example method. In one or more representative embodiments, a tangible computer readable storage medium may have stored thereon computer executable instructions for performing a method as in, and/or a method complementary to, at least one of the preceding embodiments directed to the twenty-ninth example method. The above-mentioned features with respect to the twenty-ninth example method (and corresponding apparatuses) may be combined with one or more features described above with respect to and/or in connection with dormant/active cells, such as described above with respect to one or more of the FIGS. 28-31.

In one or more representative embodiments, a method ("thirtieth example method") implemented by a network resource associated with a first cell for managing one of more dormant cell, may include any of: receiving, by the network resource of the first cell from one or more dormant cells via one or more interfaces, one or more indications that a particular one or ones of the dormant cells received PRACH transmissions from a WTRU; determining which one or ones of the one or more dormant cells that received the PRACH transmissions are to become active; and sending, by the network resource of the first cell to the determined one or ones of the dormant cells at least an indication to become active.

In one or more representative embodiments, a WTRU may be configured to perform a method complementary to at least one of the preceding embodiments directed to the thirtieth example method. In one or more representative embodiments, a system may be configured to perform a method as in, and/or a method complementary to, at least one of the preceding embodiments directed to the thirtieth example method. In one or more representative embodiments, a tangible computer readable storage medium may have stored thereon computer executable instructions for performing a method as in, and/or a method complementary to, at least one of the preceding embodiments directed to the thirtieth example method. The above-mentioned features with respect to the thirtieth example method (and corresponding apparatuses) may be combined with one or more features described above with respect to and/or in connection with dormant/active cells, such as described above with respect to one or more of the FIGS. 28-31.

In one or more representative embodiments, a method ("thirty-first example method") implemented by a WTRU for dormant cell discovery may include any of: sending, by the WTRU, a PRACH transmission; responsive to the sending, setting a timer; and if a random access response (RAR) has not been received at an expiration of the timer, sending, by the WTRU to a network resource, an indication that no dormant cell has been discovered. In one or more representative embodiments, the method may include, if the RAR has not been received at the expiration of the timer, resending the PRACH transmission at an increased power level on preconfigured resources.

In one or more representative embodiments, a network resource may be configured to perform a method complementary to at least one of the preceding embodiments directed to the thirty-first example method. In one or more representative embodiments, a system may be configured to perform a method as in, and/or a method complementary to, at least one of the preceding embodiments directed to the thirty-first example method. In one or more representative embodiments, a tangible computer readable storage medium may have stored thereon computer executable instructions for performing a method as in, and/or a method complementary to, at least one of the preceding embodiments directed to the thirty-first example method. The above-mentioned features with respect to the thirty-first example method (and corresponding apparatuses) may be combined with one or more features described above with respect to and/or in connection with dormant/active cells, such as described above with respect to one or more of the FIGS. 28-31.

In one or more representative embodiments, a method ("thirty-second example method") implemented by a WTRU for dormant cell discovery may include any of: establishing, based on a pre-configuration and/or information from a first cell, configuration information to enable the WTRU to decode a random access response (RAR) to a PRACH transmission; sending, by the WTRU, a PRACH transmission; responsive to the sending, setting a timer; and receiving and decoding the RAR.

In one or more representative embodiments, the information from the first cell may includes any of: (1) a RA-RNTI; (2) a PDCCH configuration; (3) a CRS configuration; (4) a downlink assignment of the RAR; and/or (5) ePDCCH resources on which to expect a DCI for the downlink assignment of the RAR. In one or more representative embodiments, the pre-configuration may include at least a pre-configured set of WTRU-specific reference symbols assigned to the WTRU. In one or more representative embodiments, the RAR may include any of: (1) an index of a random-access preamble sequence that was detected and for which the RAR is valid; (2) a calculated timing correction; (3) a scheduling grant indicating resources to be used by the WTRU; (4) a TC-RNTI; (5) a reception power and/or a pathloss of the PRACH transmission; and/or (5) a frequency and/or timing offset.

In one or more representative embodiments, the receiving of the RAR may include obtaining the RAR from the dormant cell directly or via the first cell. In one or more representative embodiments, the RAR may be obtained via the first cell, the method may include (or further include) indicating, in the RAR and/or a handover command that includes the RAR to the WTRU, reference symbols granted on which to perform conventional measurements.

In one or more representative embodiments, the method may include transmitting, by the WTRU to the first cell, information indicating a status of the dormant cell search based on a scheduling grant established by the first cell and indicating uplink resources to be used to report the dormant cell search.

In one or more representative embodiments, the method may include transmitting, along with the status of the dormant cell search, other information including any of: an identity of a dormant cell and/or measurements associated with the dormant cell, responsive to the measurements satisfying a pre-configured criterion.

In one or more representative embodiments, the method may include any of: responsive to reception by the WTRU of a plurality of RARs, performing measurements on each of the RAR; and selecting a subset of associated dormant cells for reporting to the first cell.

In one or more representative embodiments, the method may include reporting, by the WTRU to the first cell, that one or more collisions of RARs occurred.

In one or more representative embodiments, a network resource may be configured to perform a method complementary to at least one of the preceding embodiments directed to the thirty-second example method. In one or more representative embodiments, a system may be configured to perform a method as in, and/or a method complementary to, at least one of the preceding embodiments directed to the thirty-second example method. In one or more representative embodiments, a tangible computer readable storage medium may have stored thereon computer executable instructions for performing a method as in, and/or a method complementary to, at least one of the preceding embodiments directed to the thirty-second example method. The above-mentioned features with respect to the thirty-second example method (and corresponding apparatuses) may be combined with one or more features described above with respect to and/or in connection with dormant/active cells, such as described above with respect to one or more of the FIGS. 28-31.

CONCLUSION

Variations of the methods, apparatuses and systems described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 11, ¶ 6, and any claim without the word "means" is not so intended.

What is claimed is:

1. A method implemented by a wireless transmit/receive unit (WTRU) supporting connectivity using first and second radio access technologies (RATs), the method comprising:
receiving a first transmission in a first subframe on a first carrier using the first RAT and a second transmission in a second subframe on a second carrier using the second RAT, wherein:
the first and second carriers utilize different physical layer protocols and a common number of orthogonal frequency division multiplexing (OFDM) symbols per subframe,
the first transmission includes an enhanced physical broadcast channel (ePBCH) transmission and one or more demodulation reference signals (DMRSs) for the ePBCH transmission, the second transmission includes a physical broadcast channel (PBCH) transmission and one or more cell-specific reference signals (CRSs), and no CRSs are present in the first transmission;

responsive to the first transmission being received in the first subframe on the first carrier using the first RAT, demodulating the ePBCH transmission using the one or more DMRSs; and responsive to the second transmission being received in the second subframe on the second carrier using the second RAT, demodulating the PBCH transmission using the one or more CRSs.

2. The method of claim 1, wherein the common number of OFDM is 14 OFDM symbols, and wherein the ePBCH transmission and the one or more DMRSs for the ePBCH transmission are received using different resource elements that occur in at least one of the 14 OFDM symbols.

3. The method of claim 1, further comprising:

determining from among a plurality of resource elements (REs) in the first subframe which of the plurality of REs correspond to the one or more DMRSs for the ePBCH transmission.

4. The method of claim 1, further comprising:

determining from among a plurality of resource elements (REs) in the first subframe which of the plurality of REs correspond to the one or more DMRSs for the ePBCH transmission based at least in part on a cell identifier of a first cell using the first RAT.

5. The method of claim 1, further comprising:

determining from among a plurality of resource elements (REs) in the first subframe which of the plurality of REs correspond to the one or more DMRSs for the ePBCH transmission; and determining which of the plurality of REs correspond to the ePBCH transmission based on the REs determined to correspond to the one or more DMRSs for the ePBCH transmission.

6. The method of claim 1, wherein a plurality of resource elements reserved for the DMRSs for the ePBCH are a function of a cell identifier of a first cell using the first RAT, and wherein the ePBCH transmission is received using resource elements which are not reserved for the DMRSs for the ePBCH.

7. The method of claim 1, wherein the first carrier supports a first frequency range, wherein the second carrier supports a second frequency range, and wherein the first frequency range is different from the second frequency range.

8. The method of claim 1, wherein the demodulated ePBCH transmission indicates information different from information carried by a conventional PBCH transmission.

9. The method of claim 1, wherein the first subframe is a non-CRS subframe, and the second subframe is a non-NCT subframe.

10. A wireless transmit/receive unit (WTRU) supporting connectivity using first and second radio access technologies (RATs), the WTRU comprising circuitry, including a processor and a memory, configured to:

receive a first transmission in a first subframe on a first carrier using the first RAT and a second transmission in a second subframe on a second carrier using the second RAT, wherein:

the first and second carriers utilize different physical layer protocols and a common number of orthogonal frequency division multiplexing (OFDM) symbols per subframe, the first transmission includes an enhanced physical broadcast channel (ePBCH) transmission and one or more demodulation reference signals (DMRSs) for the ePBCH transmission, the second transmission includes a physical broadcast channel (PBCH) transmission and one or more cell-specific reference signals (CRSs), and no CRSs are present in the first transmission;

responsive to the first transmission being received in the first subframe on the first carrier using the first RAT, demodulate the ePBCH transmission using the one or more DMRSs, and responsive to the second transmission being received in the second subframe on the second carrier using the second RAT, demodulate the PBCH transmission using the one or more CRSs.

11. The WTRU of claim 10, wherein the common number of OFDM symbols is 14 OFDM symbols, and wherein the circuitry is configured to receive the ePBCH transmission and the one or more DMRSs for the ePBCH transmission using different resource elements that occur in at least one of the 14 OFDM symbols.

12. The WTRU of claim 10, wherein the circuitry is configured to:

determine from among a plurality of resource elements (REs) in the first subframe which of the plurality of REs correspond to the one or more DMRSs for the ePBCH transmission.

13. The WTRU of claim 10, wherein the circuitry is configured to:

determine from among the plurality of resource elements (REs) in the first subframe which of the plurality of REs correspond to the one or more DMRSs for the ePBCH transmission is based at least in part on a cell identifier of a first cell using the first RAT.

14. The WTRU of claim 10, wherein the circuitry is configured to:

determine from among a plurality of resource elements (REs) in the first subframe which of the plurality of REs correspond to the one or more DMRSs for the ePBCH transmission; and determine which of the plurality of REs correspond to the ePBCH transmission based on the REs determined to correspond to the one or more DMRSs for the ePBCH transmission.

15. The WTRU of claim 10, wherein a plurality of resource elements reserved for the DMRSs for the ePBCH are a function of a cell identifier of a first cell using the first RAT, and wherein the ePBCH transmission is received using resource elements which are not reserved for the DMRSs for the ePBCH.

16. The WTRU of claim 10, wherein the first carrier supports a first frequency range, wherein the second carrier supports a second frequency range, and wherein the first frequency range is different from the second frequency range.

17. The WTRU of claim 10, wherein the demodulated ePBCH transmission indicates information from information carried by a conventional PBCH transmission.

* * * * *